(12) United States Patent
Rennex

(10) Patent No.: US 10,743,611 B2
(45) Date of Patent: Aug. 18, 2020

(54) SUBSTANTIAL ENERGY RETURN SHOE WITH OPTIMAL LOW-IMPACT SPRINGS, TUNED GEAR CHANGE, AND SMART KNEE BRACE

(71) Applicant: Brian Rennex, Bethesda, MD (US)

(72) Inventor: Brian Rennex, Bethesda, MD (US)

(73) Assignee: RradD Inc., Bethesda, MD (US)

( * ) Notice: Subject to any disclaimer, the term of this patent is extended or adjusted under 35 U.S.C. 154(b) by 27 days.

(21) Appl. No.: 15/566,734

(22) PCT Filed: Apr. 15, 2016

(86) PCT No.: PCT/US2016/000036
§ 371 (c)(1),
(2) Date: Oct. 16, 2017

(87) PCT Pub. No.: WO2016/167847
PCT Pub. Date: Oct. 20, 2016

(65) Prior Publication Data
US 2018/0220738 A1 Aug. 9, 2018

Related U.S. Application Data

(63) Continuation of application No. 14/545,274, filed on Apr. 16, 2015, now abandoned.

(51) Int. Cl.
*A43B 13/18* (2006.01)
*A43B 3/00* (2006.01)
(Continued)

(52) U.S. Cl.
CPC .......... *A43B 13/183* (2013.01); *A43B 3/0005* (2013.01); *A43B 3/0015* (2013.01);
(Continued)

(58) Field of Classification Search
CPC ... A43B 13/183; A43B 13/141; A43B 13/145; A43B 13/184; A43B 3/005
See application file for complete search history.

(56) References Cited

U.S. PATENT DOCUMENTS

| 1,256,124 A | 2/1918 | Geiling |
| 2,953,861 A * | 9/1960 | Horten .................. A63B 25/10 |
| | | 36/7.8 |

(Continued)

FOREIGN PATENT DOCUMENTS

| WO | 0221955 A1 | 3/2002 |
| WO | 2005011419 A2 | 2/2005 |
| WO | 2010033238 A1 | 3/2010 |

OTHER PUBLICATIONS (EP3282877) Substantial Energy Return Shoe With Optimal Low-Impact Springs, Tuned Gear Change, and Smart Knee Brace, European search report and Opinion dated Feb. 1, 2019.
(Continued)

*Primary Examiner* — Jila M Mohandesi
(74) *Attorney, Agent, or Firm* — Carlos R. Villamar; The Villamar Firm PLLC

(57) ABSTRACT

A futuristic shoe with true energy return based on enhanced heel-lift, optimized shoe springs (40% reduction in maximum foot impact), practical precise automatic electronic gear changers, novel powerful shoe impact chargers, improved pulley electronic actuators, novel low-impact much stronger springs (featuring the novel use materials such as Kevlar, Spectra Shield, and fiberglass), novel remarkably stronger, more flexible, and tougher structures, and multiple designs for enhanced heel-lift and to prevent excessive toe sink. These designs require linkages and two improved hinges—one with enhanced natural hinges and a second with tied cogged hinges. There is a rotating-arms enhanced optimal spring, which when combined with the
(Continued)

Parallelogram Heel-Pop Shoe
Side view at toe-off tied cogged hinges, results in optimal foldable arrays for deployment in outer space—and which gives a smart energy return knee brace. These novel capabilities promise a wide range of additional applications such as robotics, prosthetics, orthotics, springs, aerospace, automobiles, body armor, and earthquake retrofitting.

2 Claims, 49 Drawing Sheets

(51) Int. Cl.
 *A43B 13/14* (2006.01)
 *F16F 3/087* (2006.01)
 *F16F 3/02* (2006.01)
(52) U.S. Cl.
 CPC .......... *A43B 13/141* (2013.01); *A43B 13/145* (2013.01); *A43B 13/184* (2013.01); *F16F 3/0876* (2013.01); *F16F 3/02* (2013.01); *Y10S 901/01* (2013.01)

(56) References Cited

U.S. PATENT DOCUMENTS

| | | | | |
|---|---|---|---|---|
| 3,219,358 A * | 11/1965 | Hagner | ................ | A43B 13/184 280/11.14 |
| 4,133,086 A * | 1/1979 | Brennan | ................ | A43B 5/18 36/7.8 |
| 4,302,891 A * | 12/1981 | Gulli | ................ | A43B 5/18 36/7.8 |
| 4,492,374 A * | 1/1985 | Lekhtman | ................ | A63B 25/10 267/28 |
| 4,912,859 A * | 4/1990 | Ritts | ................ | A43B 13/184 36/7.8 |
| 5,143,679 A | 9/1992 | Weber et al. | | |
| 5,205,798 A * | 4/1993 | Lekhtman | ................ | A43B 13/18 482/121 |
| 5,437,110 A | 8/1995 | Goldston et al. | | |
| 5,464,380 A * | 11/1995 | Ikeda | ................ | A61F 5/0102 36/81 |
| 5,621,984 A * | 4/1997 | Hsieh | ................ | A43B 13/182 280/11.115 |
| 5,701,685 A * | 12/1997 | Pezza | ................ | A43B 13/18 36/27 |
| 5,797,198 A | 2/1998 | Pomerantz | | |
| 5,916,071 A * | 6/1999 | Lee | ................ | A43B 13/182 482/124 |
| 6,405,455 B1 | 6/2002 | Walsh | | |
| 6,684,531 B2 * | 2/2004 | Rennex | ................ | A43B 13/182 36/102 |
| 7,900,377 B1 * | 3/2011 | Perenich | ................ | A43B 13/181 36/102 |
| 7,905,033 B1 * | 3/2011 | Perenich | ................ | A43B 13/181 36/102 |
| 7,950,166 B1 | 5/2011 | Perenich | | |
| 2002/0024187 A1 * | 2/2002 | Gyr | ................ | A43B 13/141 280/14.22 |
| 2005/0005472 A1 * | 1/2005 | Perenich | ................ | A43B 13/141 36/27 |
| 2005/0262725 A1 * | 12/2005 | Rennex | ................ | A43B 13/14 36/7.8 |
| 2005/0268488 A1 * | 12/2005 | Hann | ................ | A43B 13/20 36/27 |
| 2006/0021262 A1 * | 2/2006 | Killion | ................ | A43B 7/38 36/136 |
| 2006/0213082 A1 | 9/2006 | Meschan | | |
| 2007/0271818 A1 * | 11/2007 | Rabushka | ............ | A43B 13/183 36/38 |
| 2009/0126233 A1 * | 5/2009 | Rastegar | ................ | A43B 7/02 36/132 |
| 2013/0125422 A1 | 5/2013 | Perenich | | |
| 2013/0192090 A1 * | 8/2013 | Smith, IV | ............ | A43B 13/182 36/103 |
| 2014/0068966 A1 * | 3/2014 | Chaffin | ................ | A43B 13/183 36/28 |
| 2015/0097374 A1 | 4/2015 | Lin et al. | | |

OTHER PUBLICATIONS (EP3282877) Substantial Energy Return Shoe With Optimal Low-Impact Springs, Tuned Gear Change, and Smart Knee Brace, Partial European search report and Opinion dated Oct. 25, 2018.

* cited by examiner

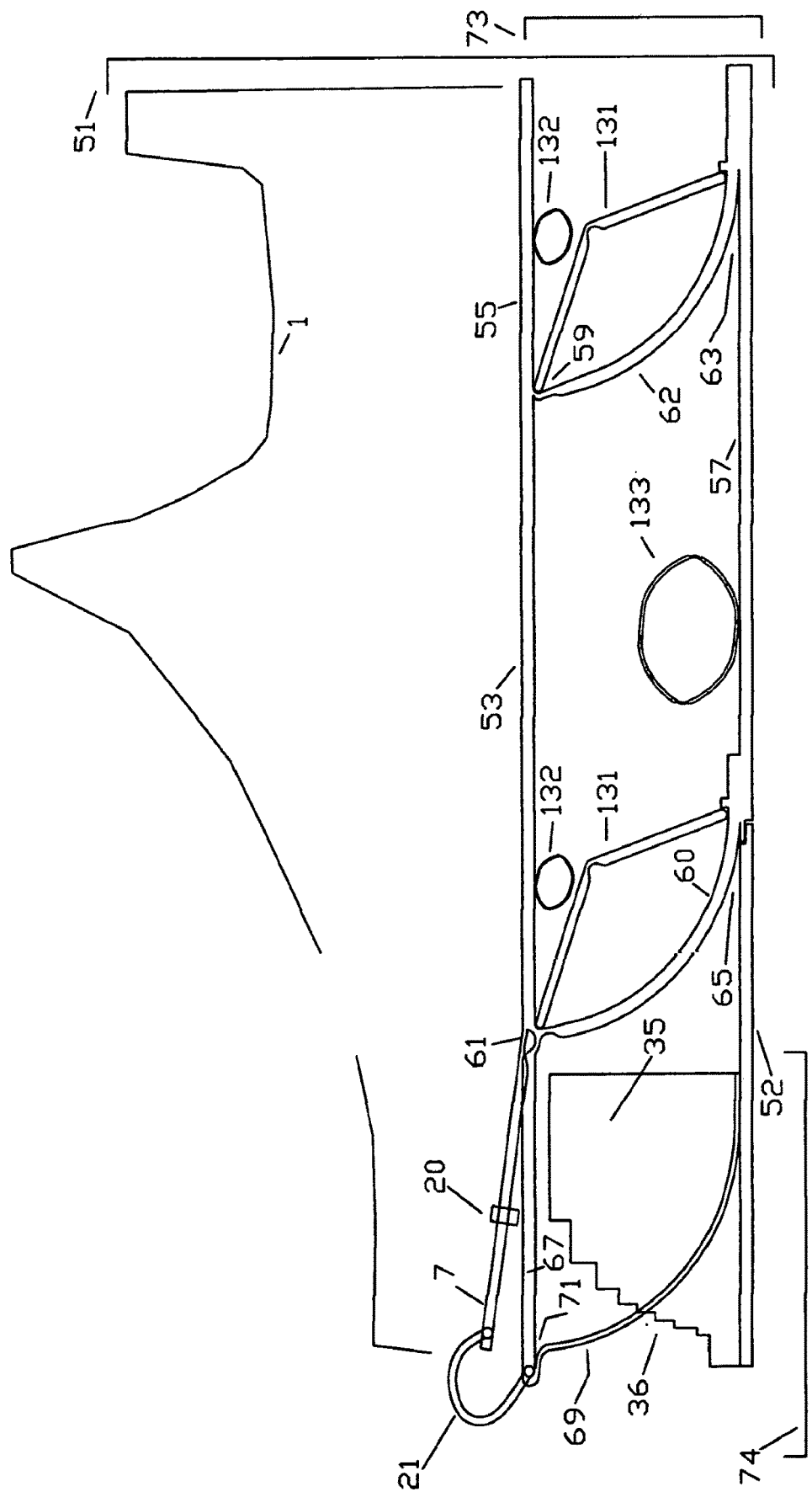
Figure 1. Linkage-Spread Curved-Spring Heel-Pop Shoe Schematic Side View at Heel Strike

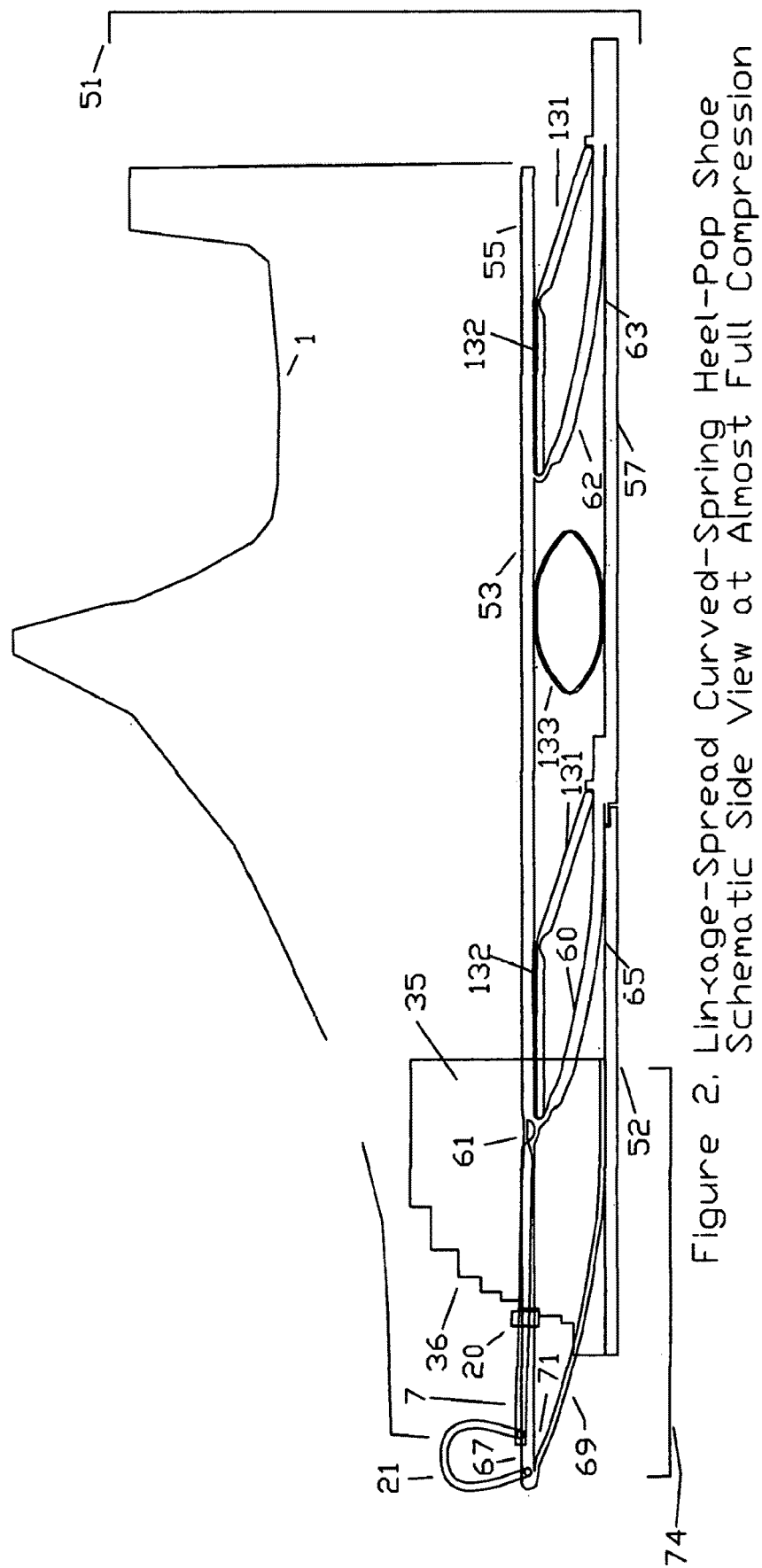
Figure 2. Linkage-Spread Curved-Spring Heel-Pop Shoe Schematic Side View at Almost Full Compression

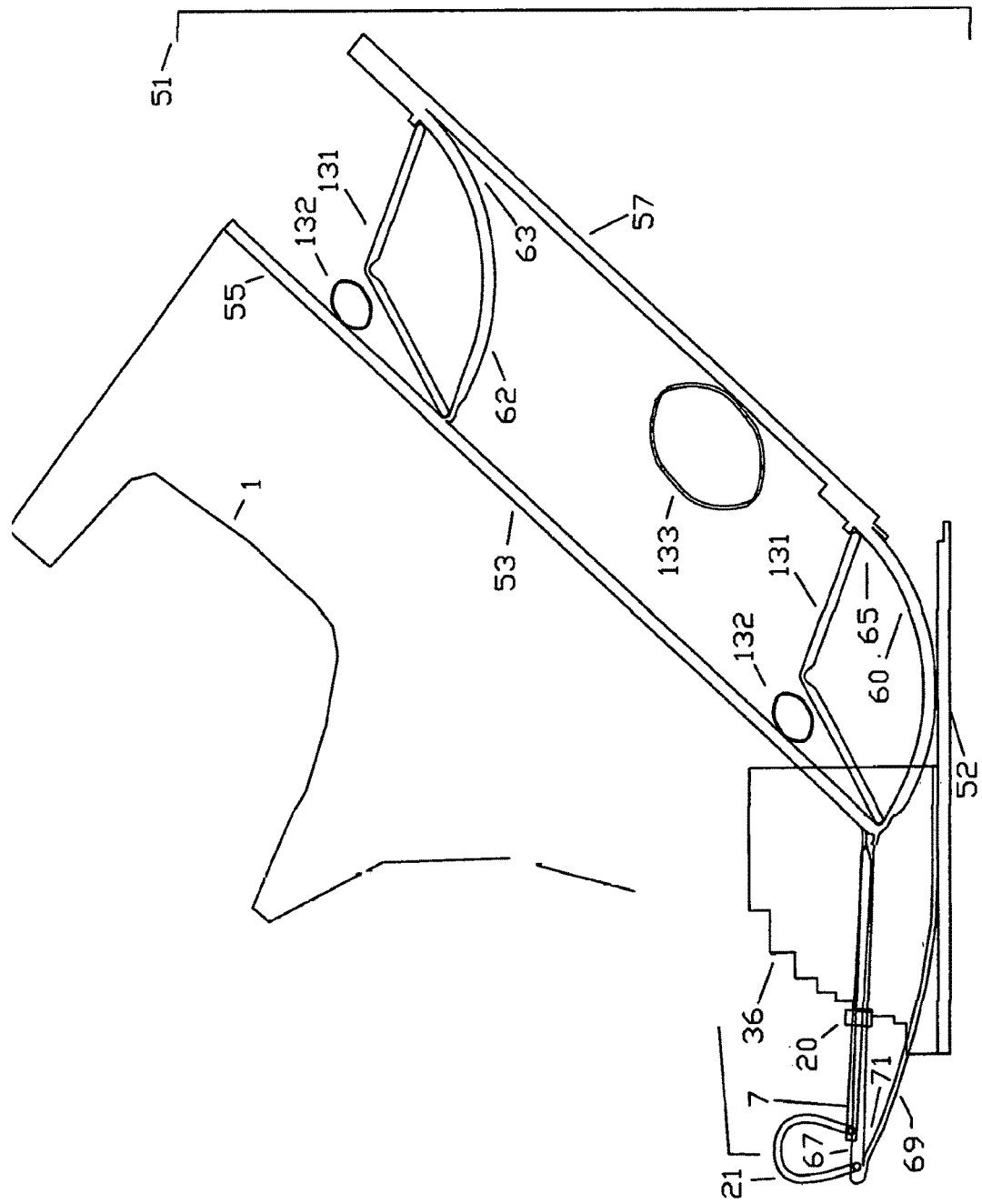
Figure 3. Linkage-Spread Curved-Spring Heel-Pop Shoe Schematic Side View at toe-off

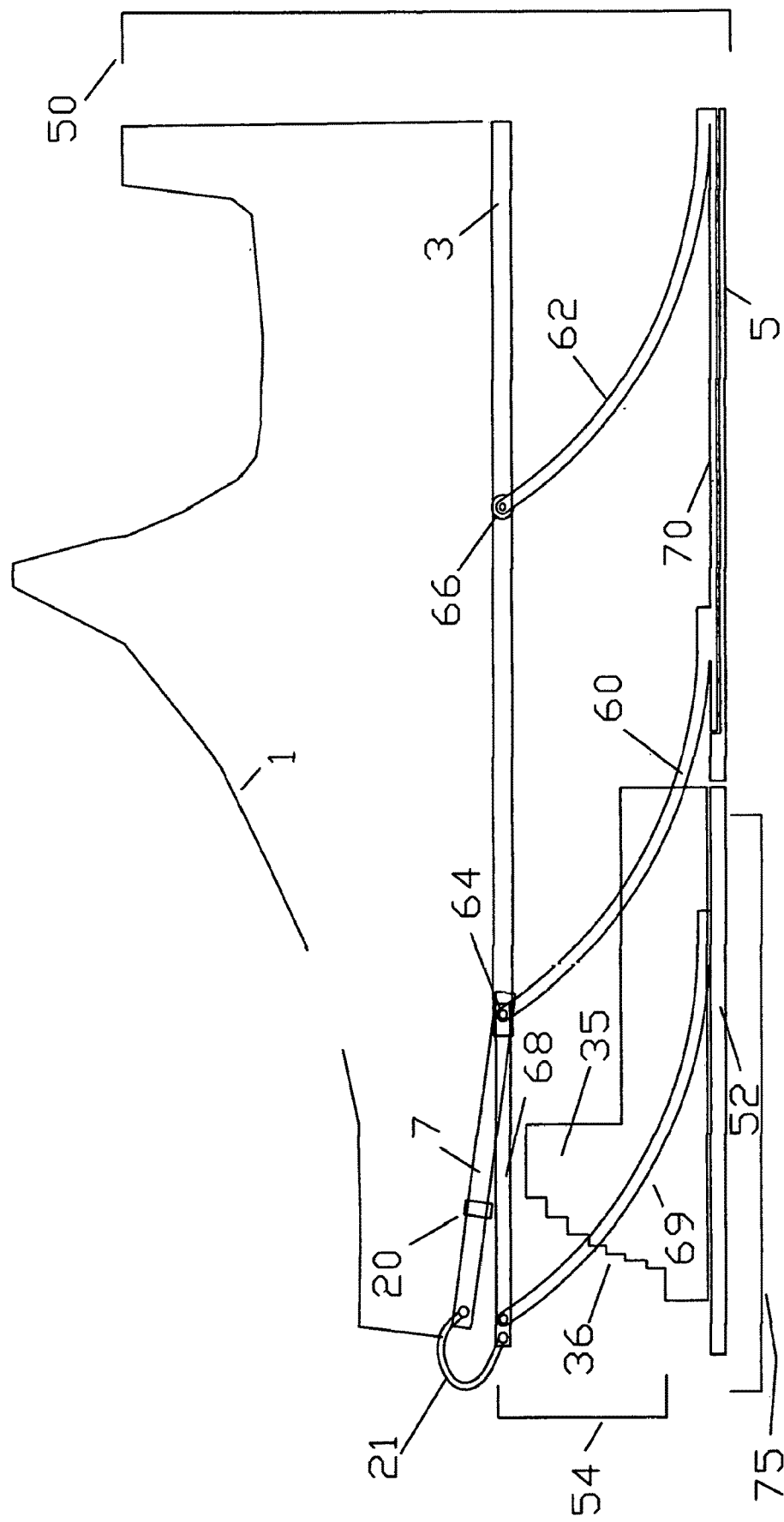
Figure 4. Curved-Spring Heel-Pop Shoe
Side view at heel strike

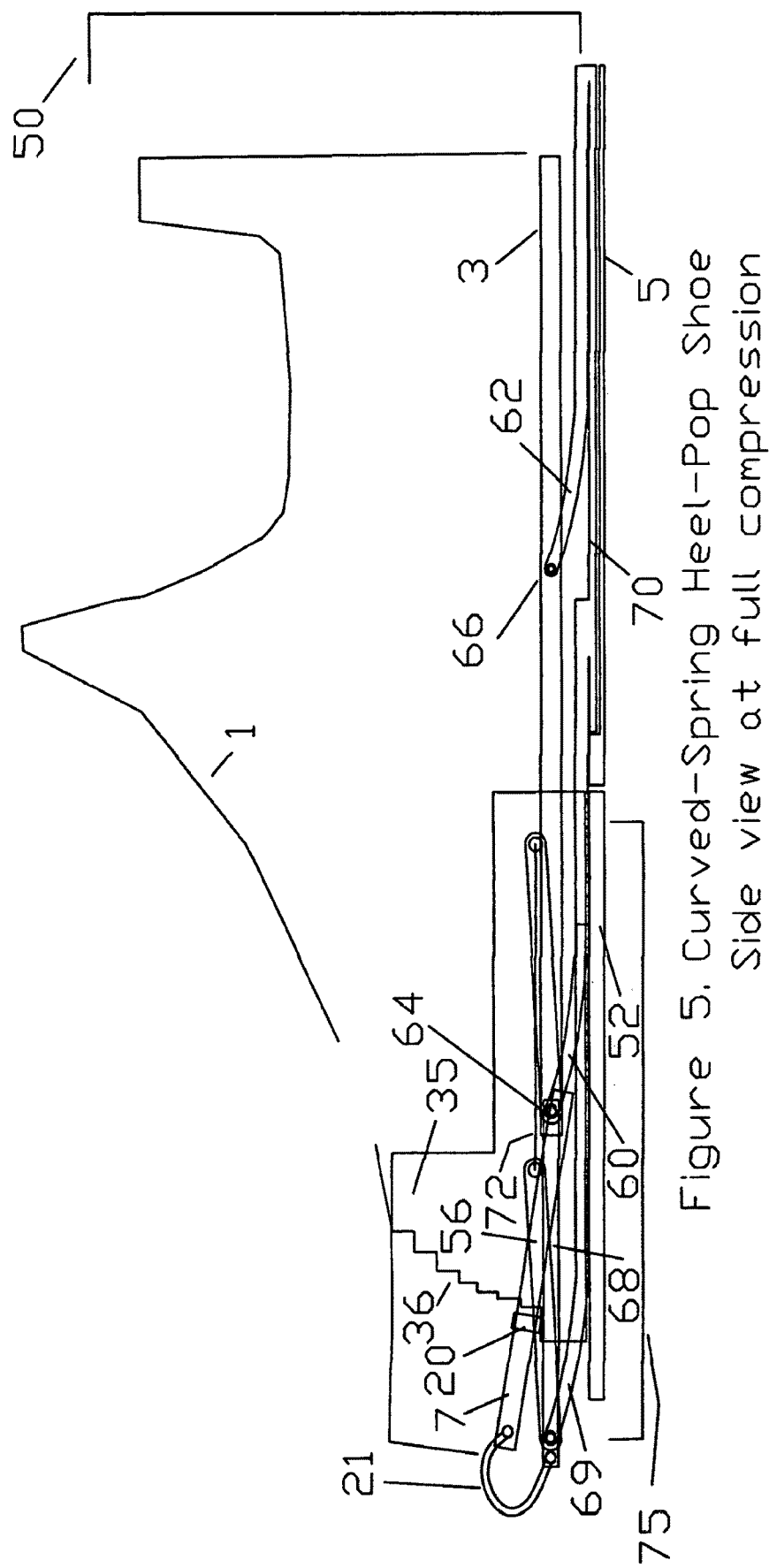

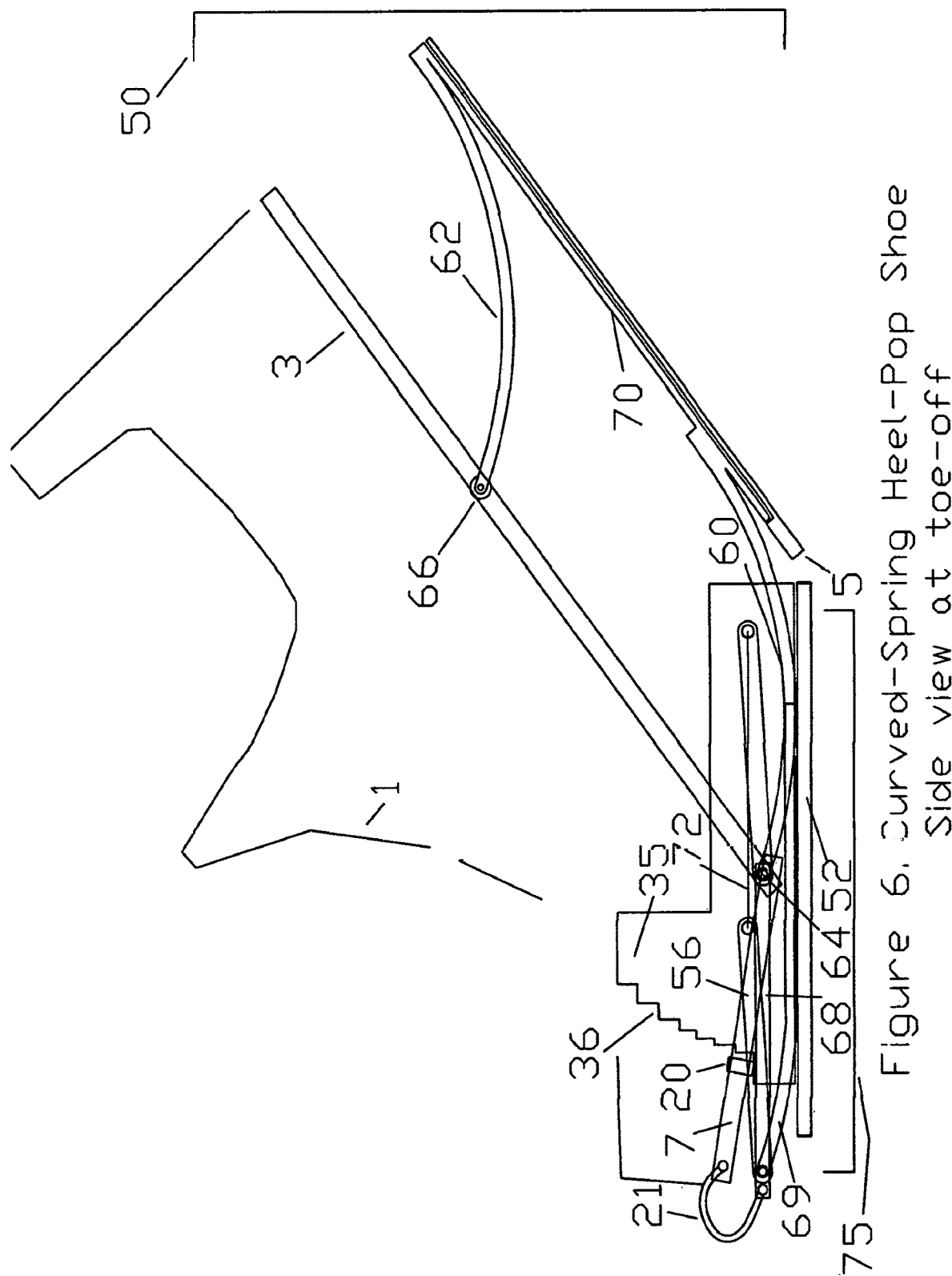
Figure 6. Curved-Spring Heel-Pop Shoe Side view at toe-off

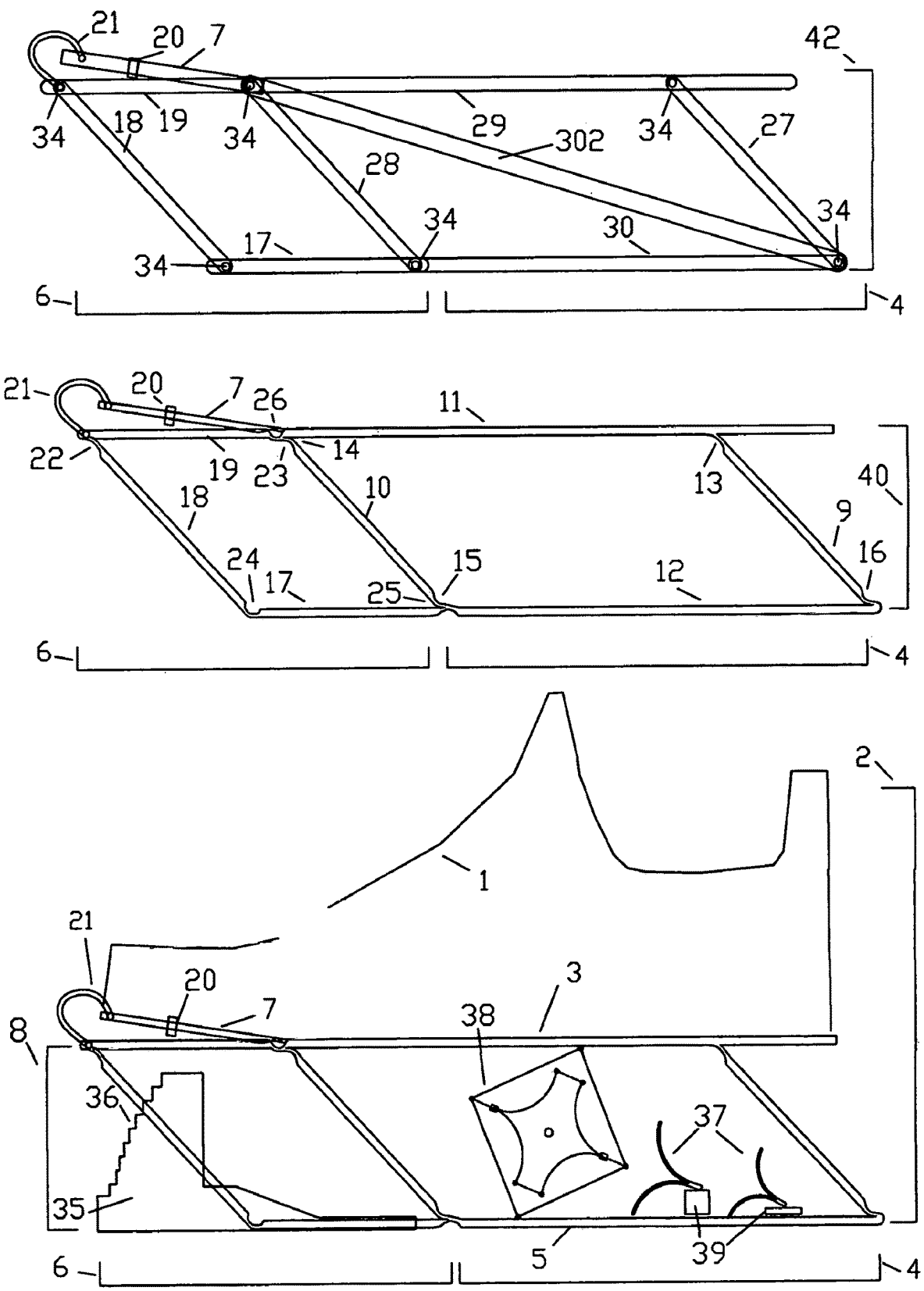
Figure 7. Parallelogram Heel-Pop Shoe
Side view at heel strike

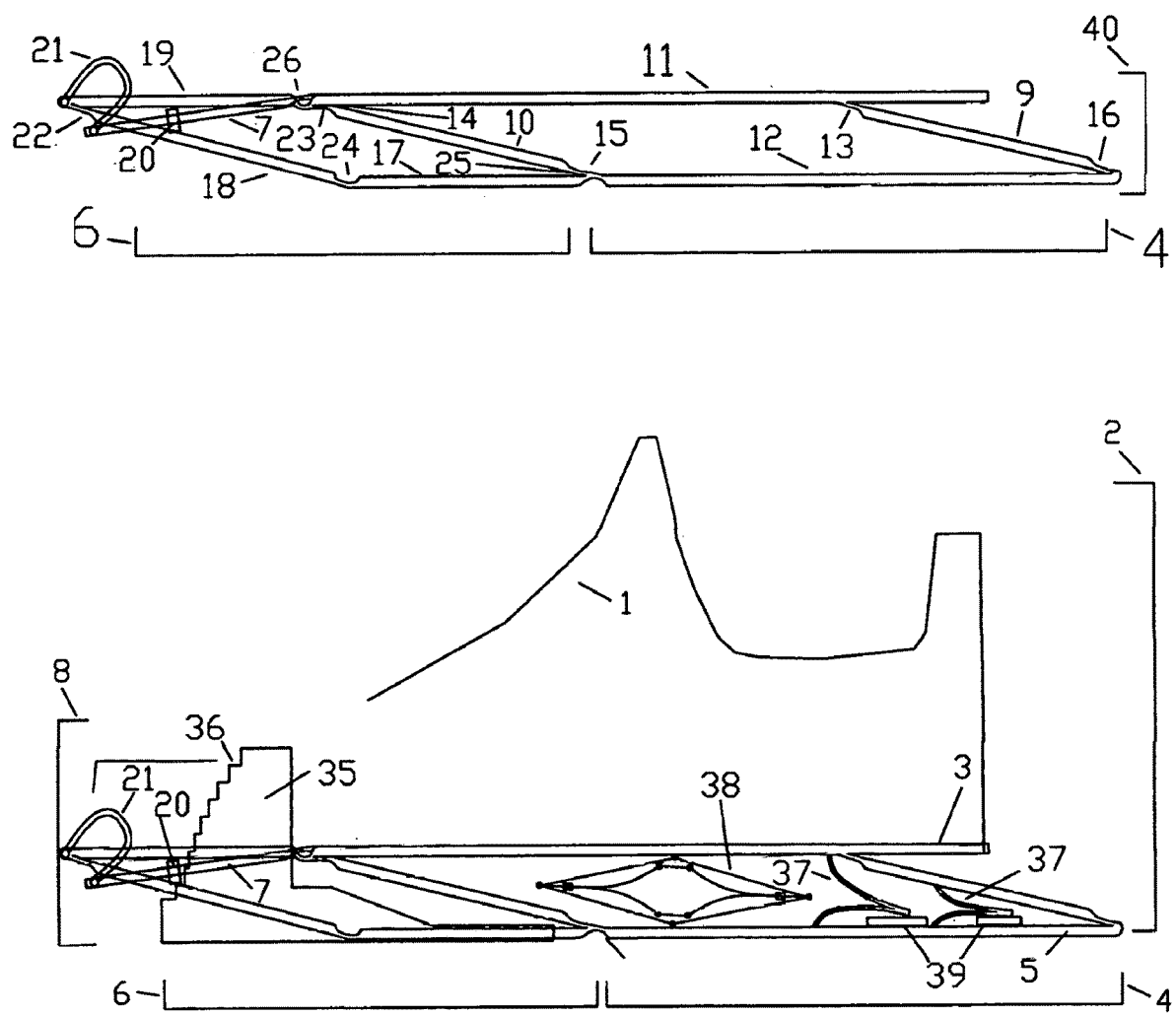
Figure 8. Parallelogram Heel-Pop Shoe
Side view at full compression

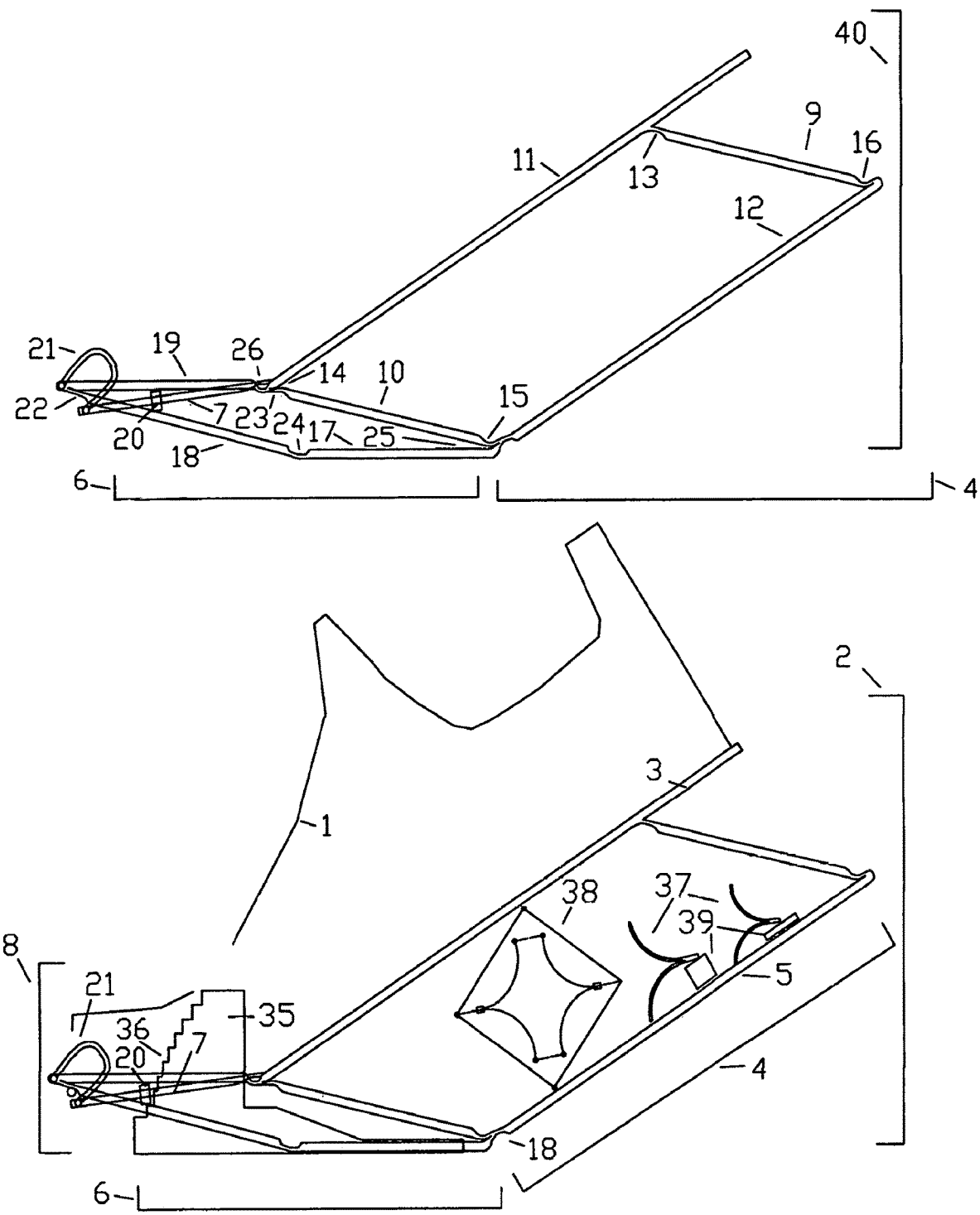
Figure 9. Parallelogram Heel-Pop Shoe
Side view at toe-off

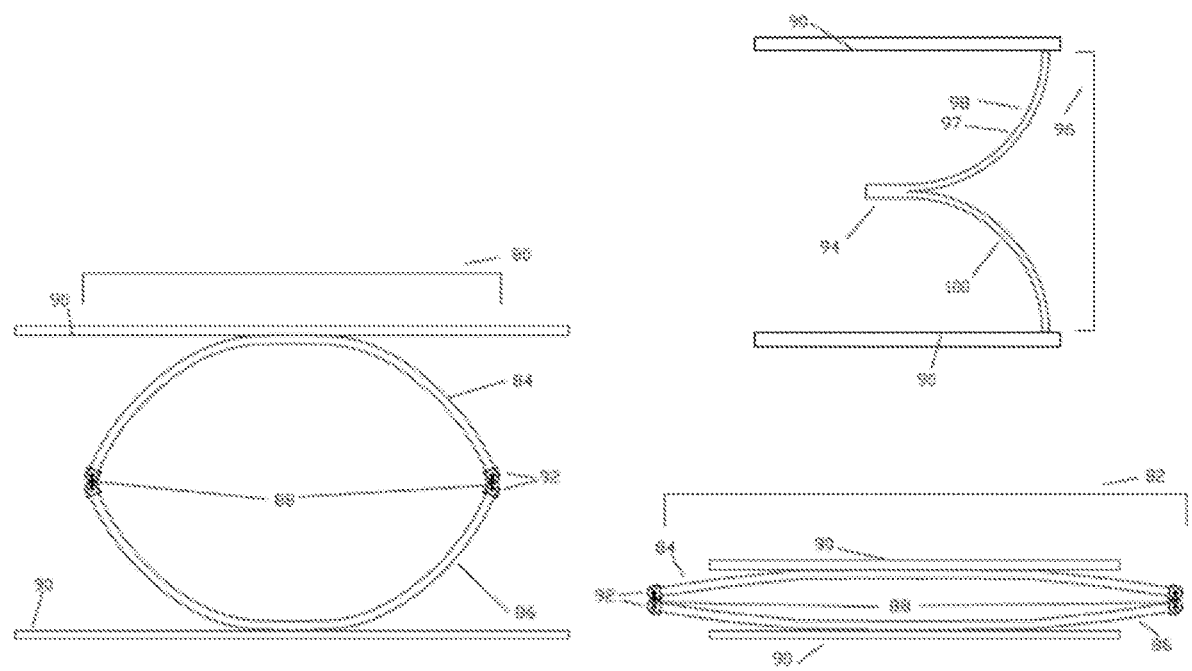
Figure 10. Mirrored Arch Spring and Curly V-Spring Schematic Side Views

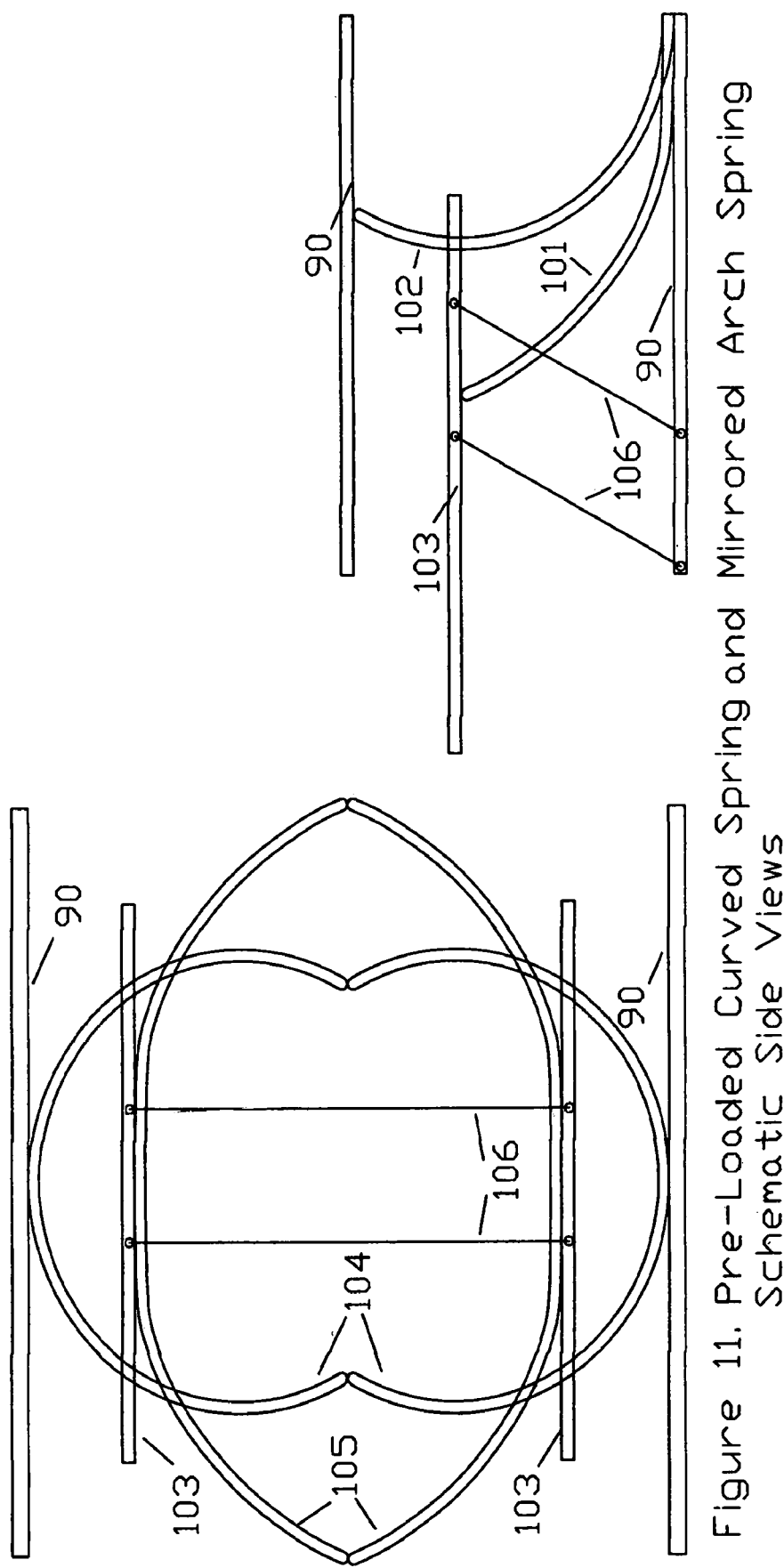
Figure 11. Pre-Loaded Curved Spring and Mirrored Arch Spring Schematic Side Views

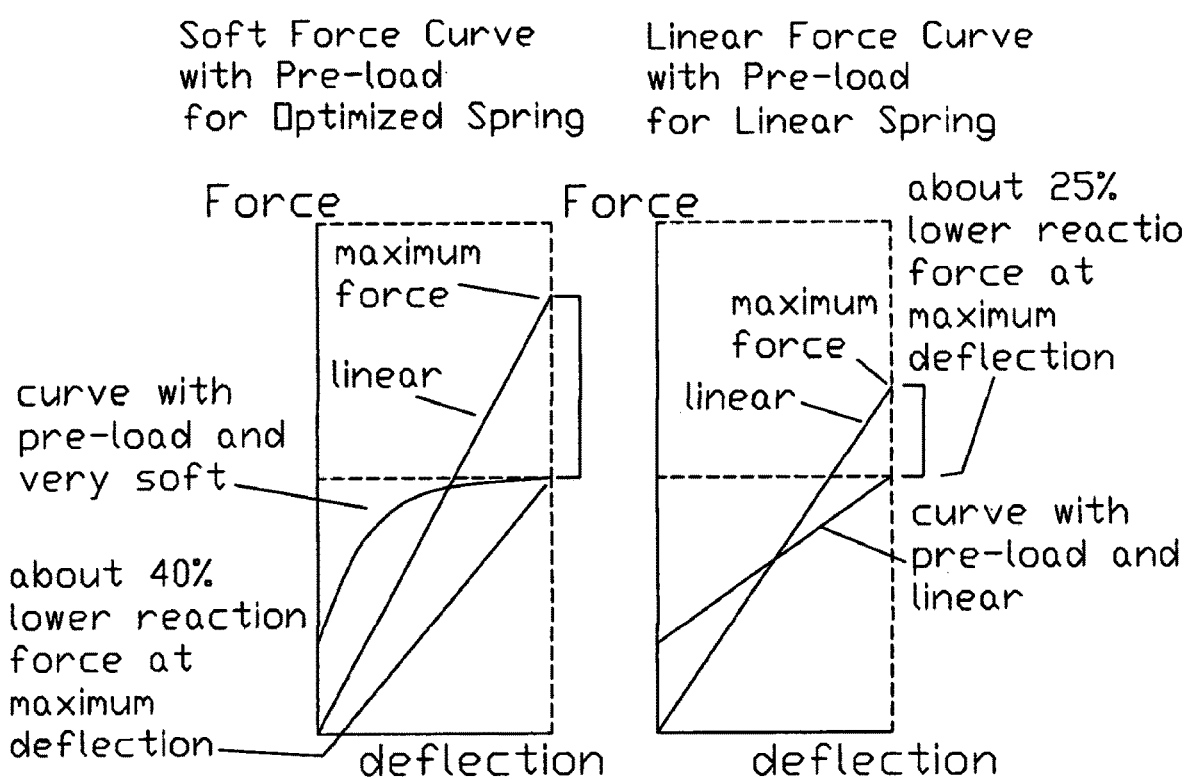
Figure 12. Study of Optimized Force Curves for Springs

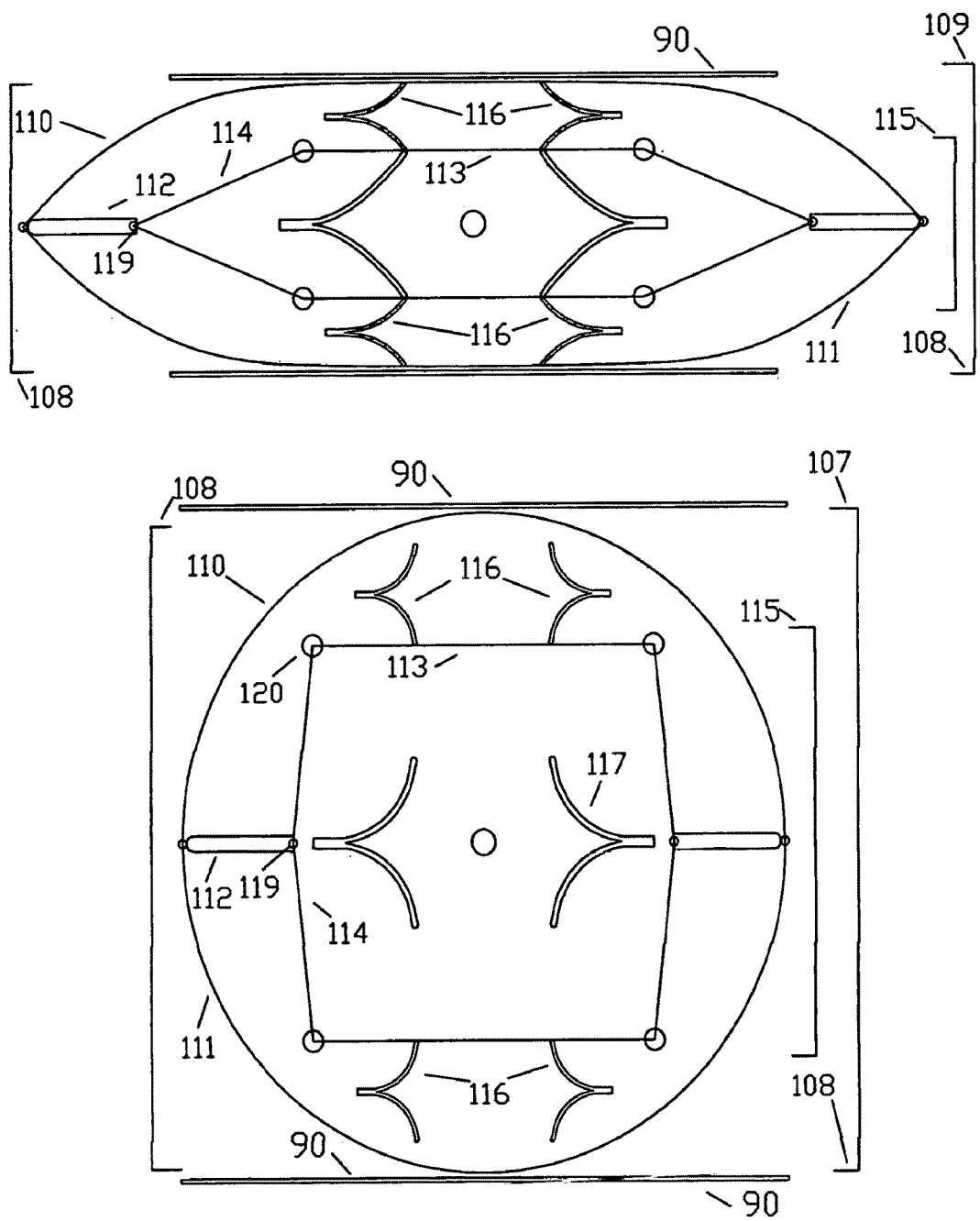
Figure 13. Internal Linkage Mirrored Arch Spring Schematic Side Views

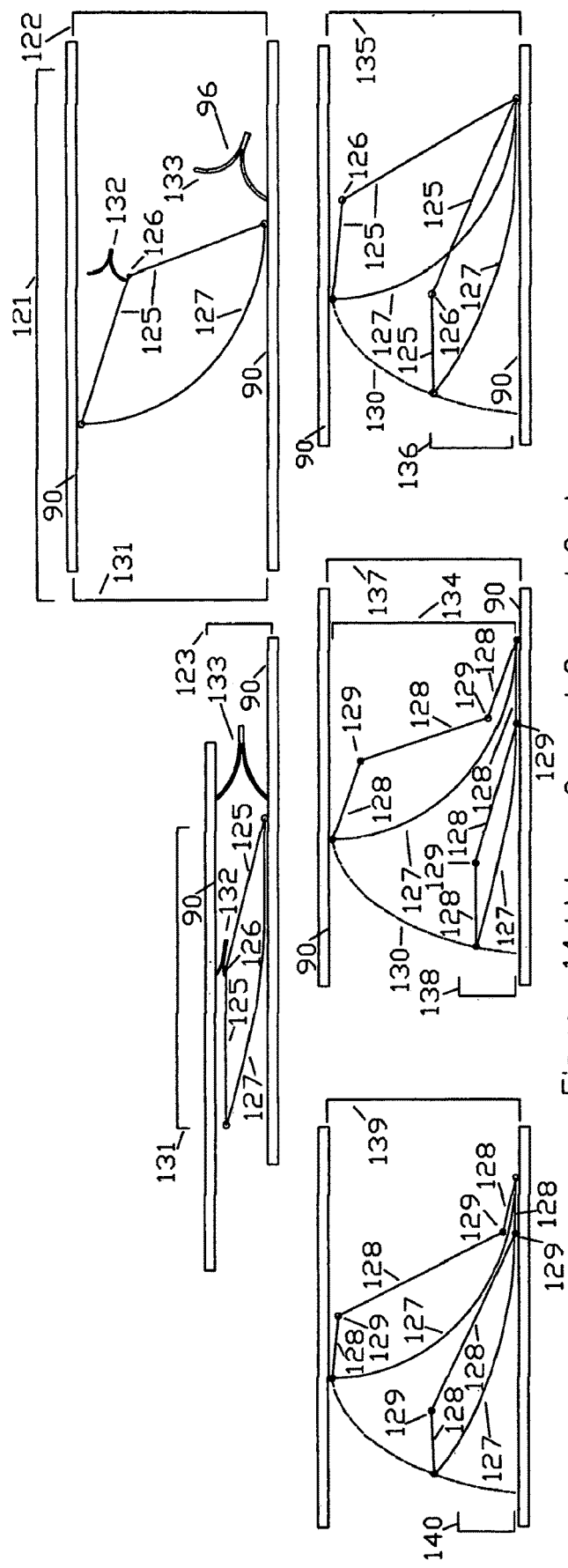
Figure 14. Linkage-Spread Curved Springs Schematic Side Views

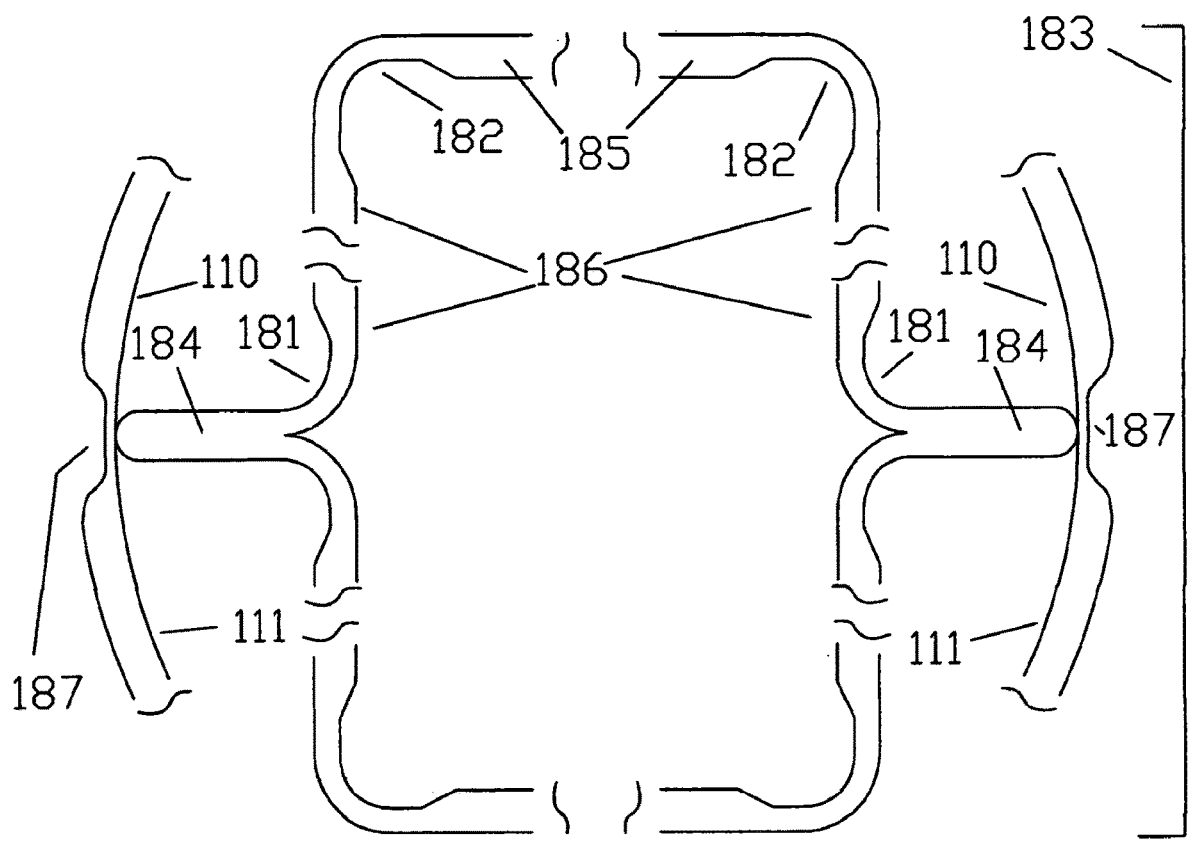
Figure 15. Monolithic Mirrored Spreader Linkage Schematic Side Views

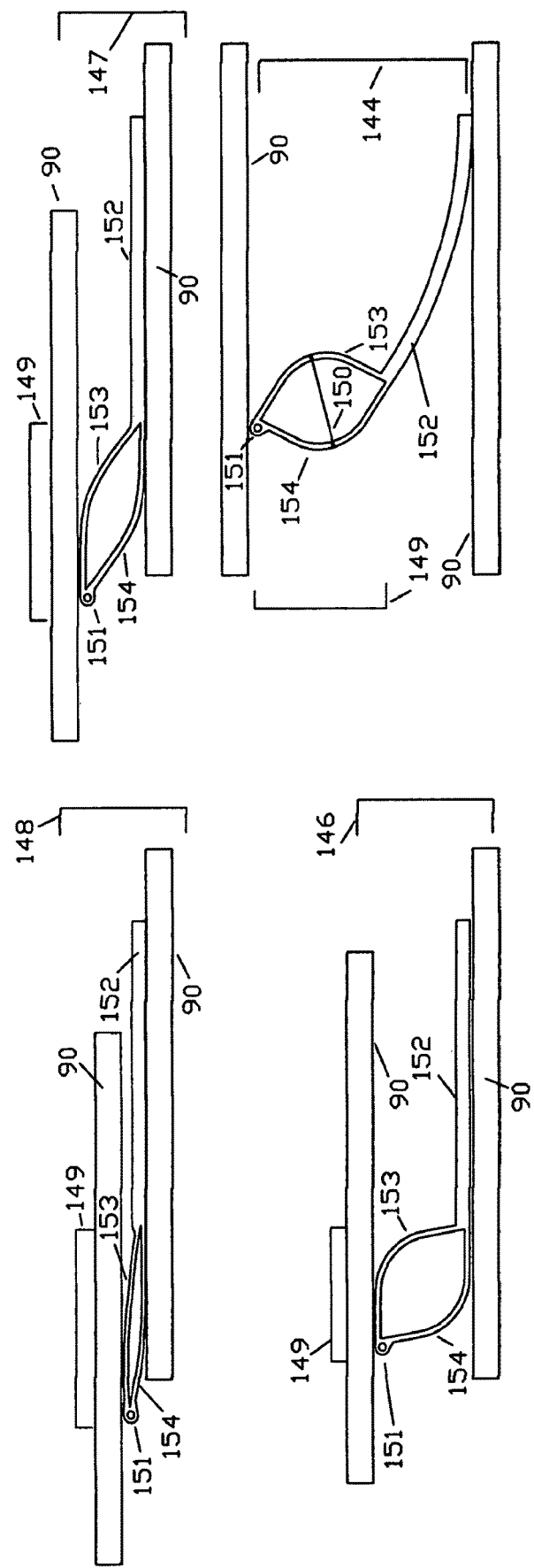
Figure 16. Kite-End Curved Spring Schematic Side Views

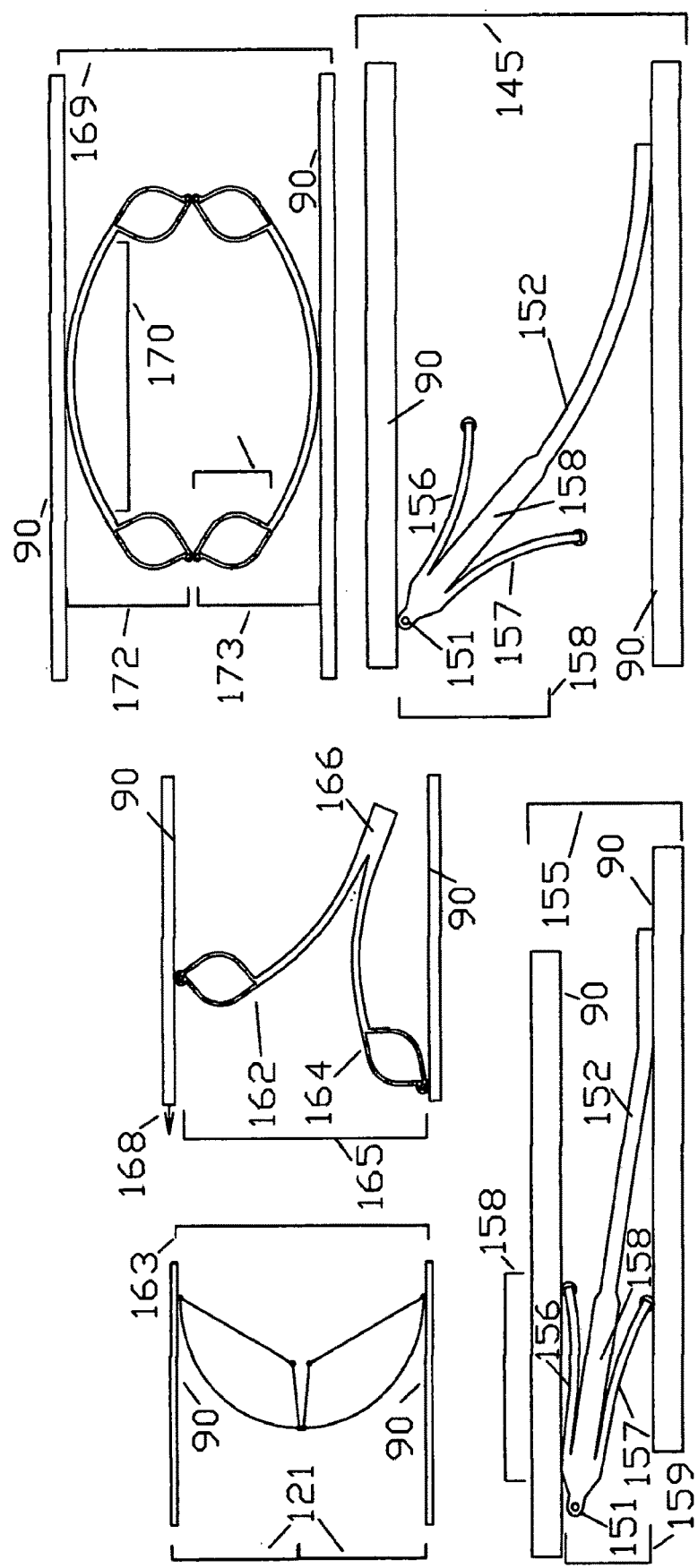
Figure 17. Configurations for Arrowhead, Kite-End, and Double-Link Spread Curved Springs Schematic Side Views

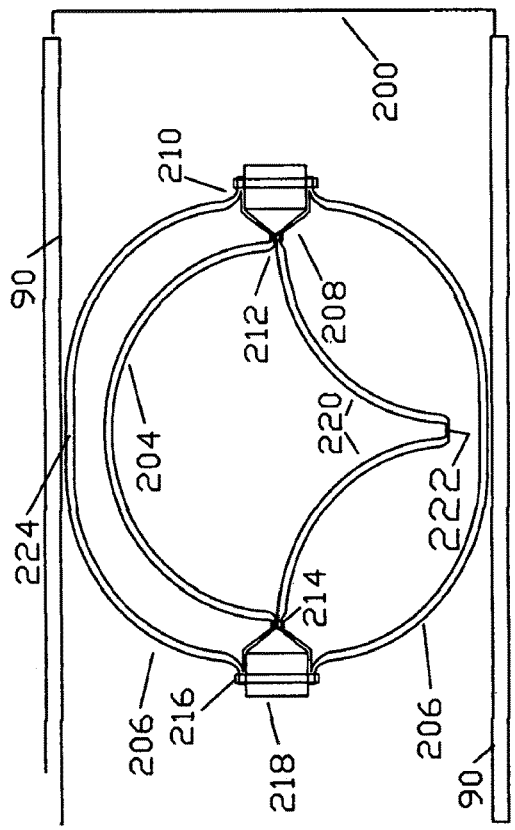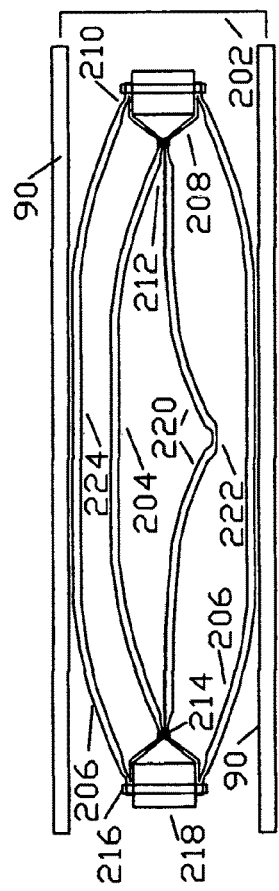
Figure 18. Monolithic Tensioned Mirrored Arch Spring Schematic Side View

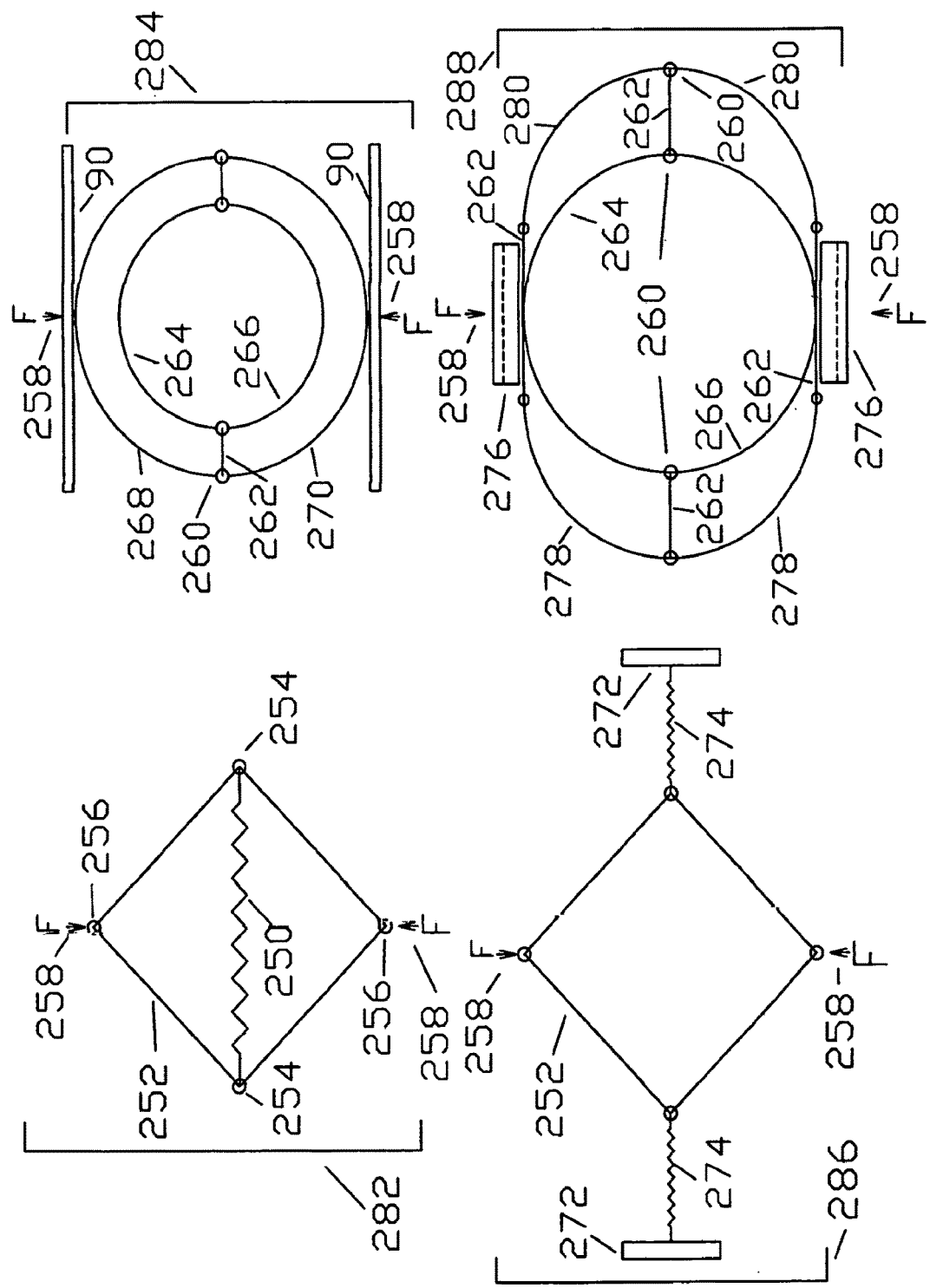
Figure 19. Torque-Lift Configurations Schematic Side Views

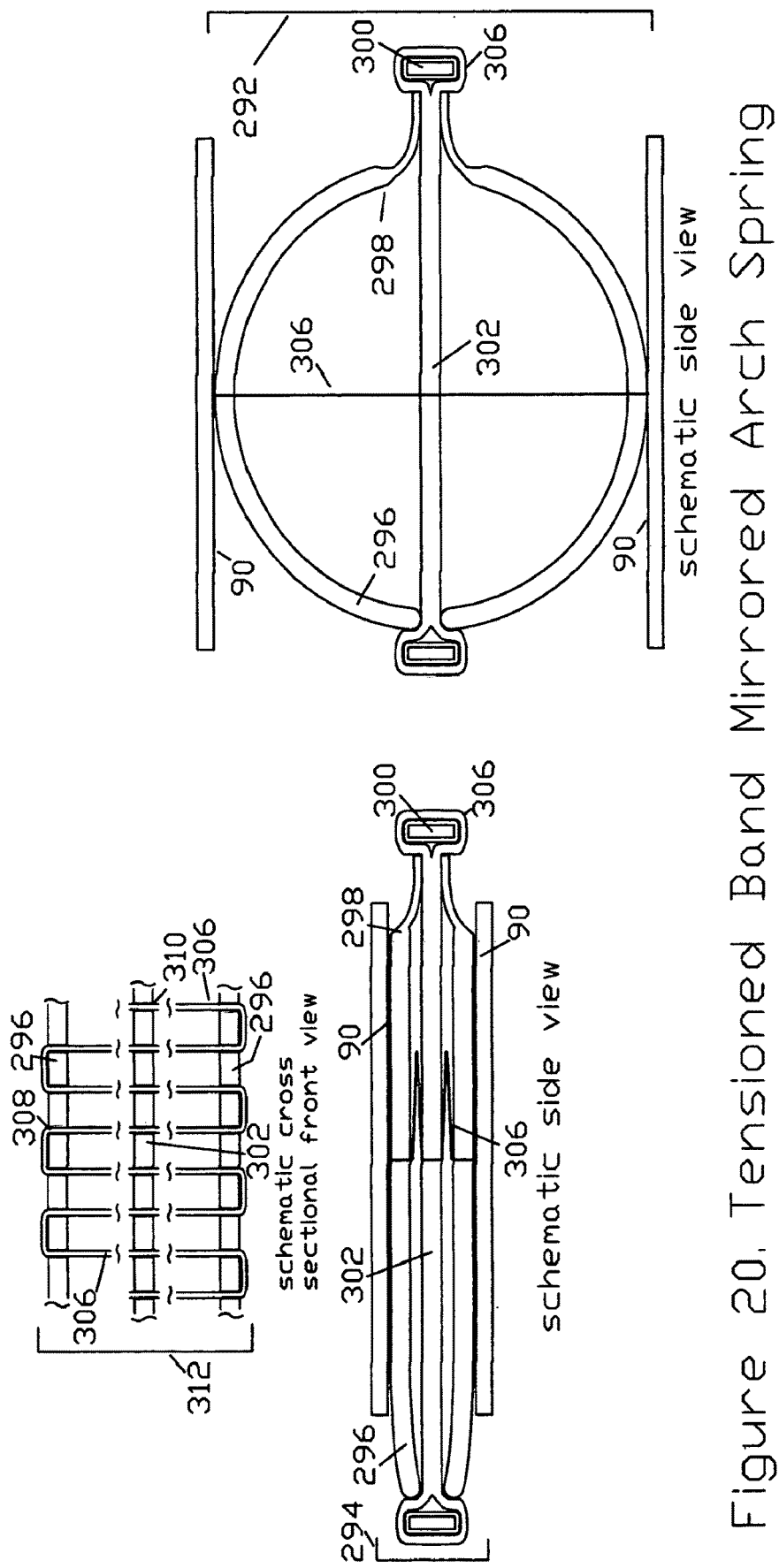
Figure 20. Tensioned Band Mirrored Arch Spring

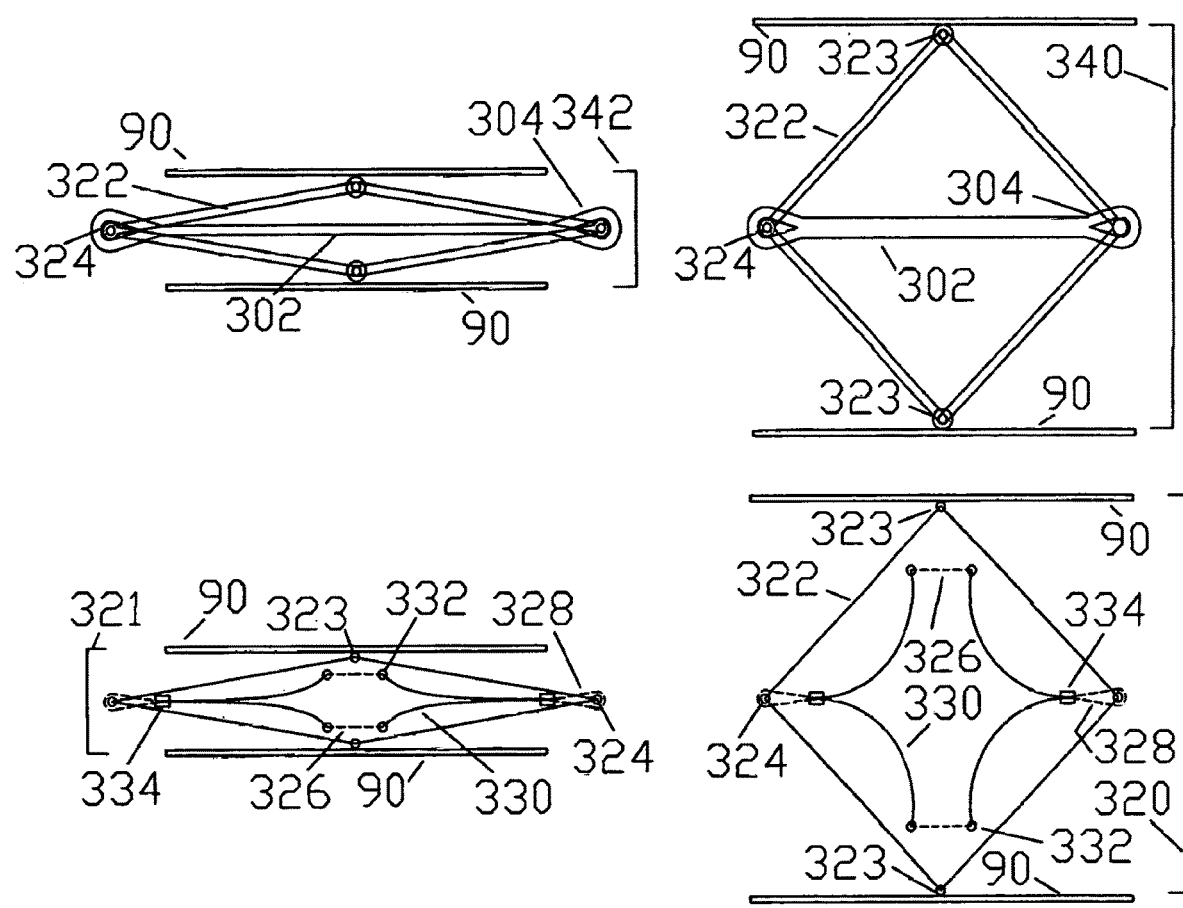
Figure 21. Tensioned Linkage Configurations Schematic Side Views

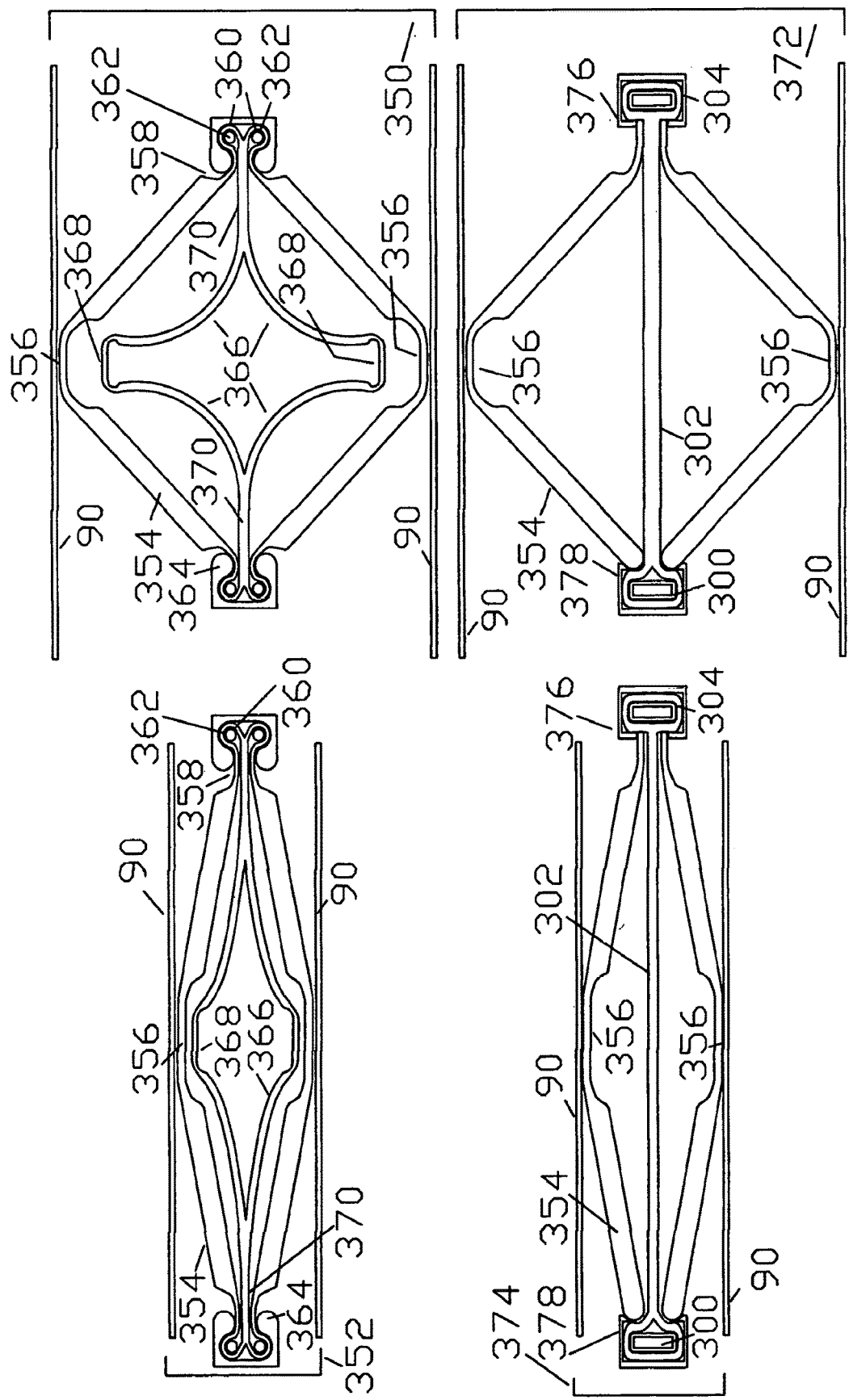
Figure 22. Monolithic Tensioned Linkage Configurations Schematic side Views

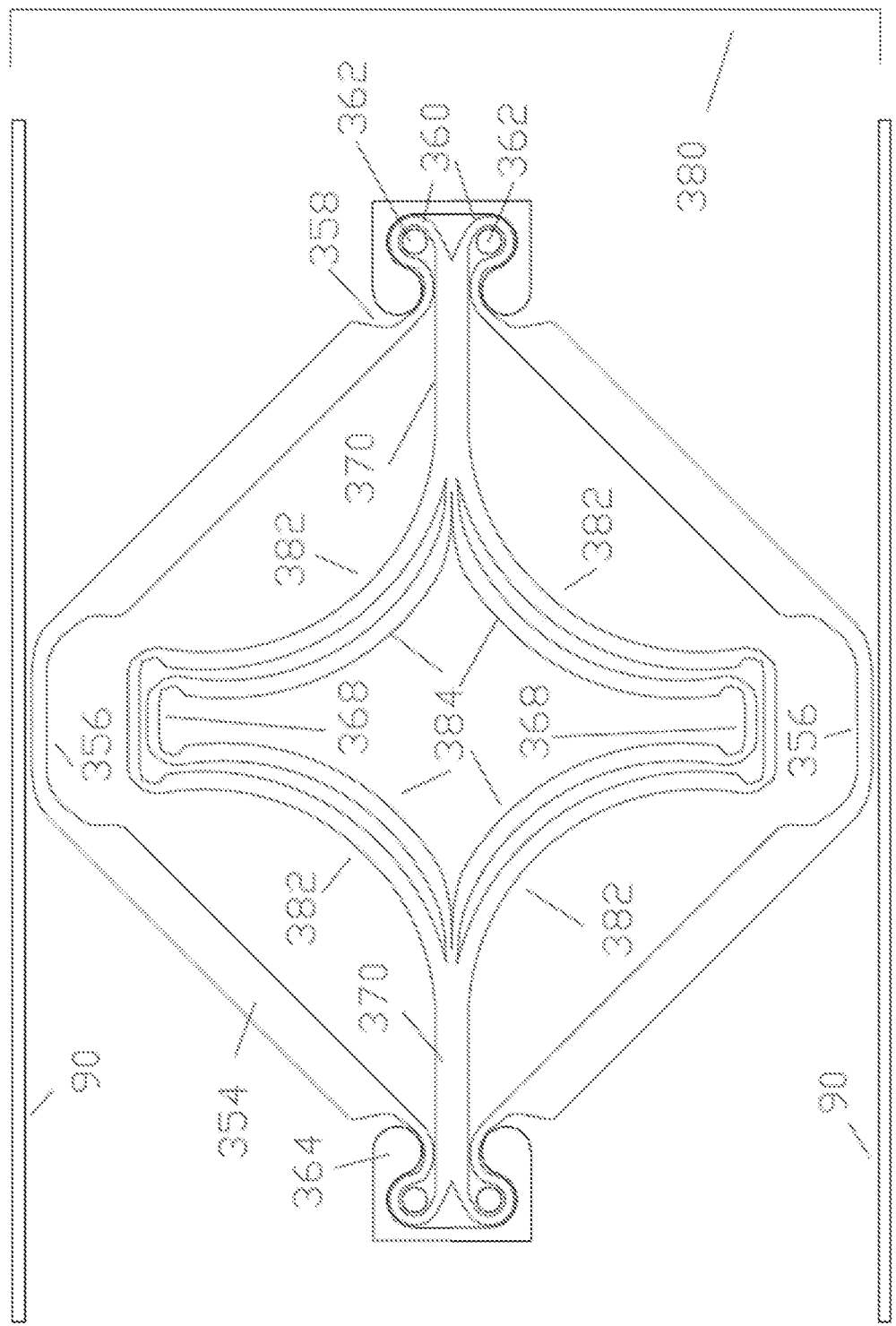
Figure 23. Monolithic Nested Tensioned Linkage Spring Schematic Side View

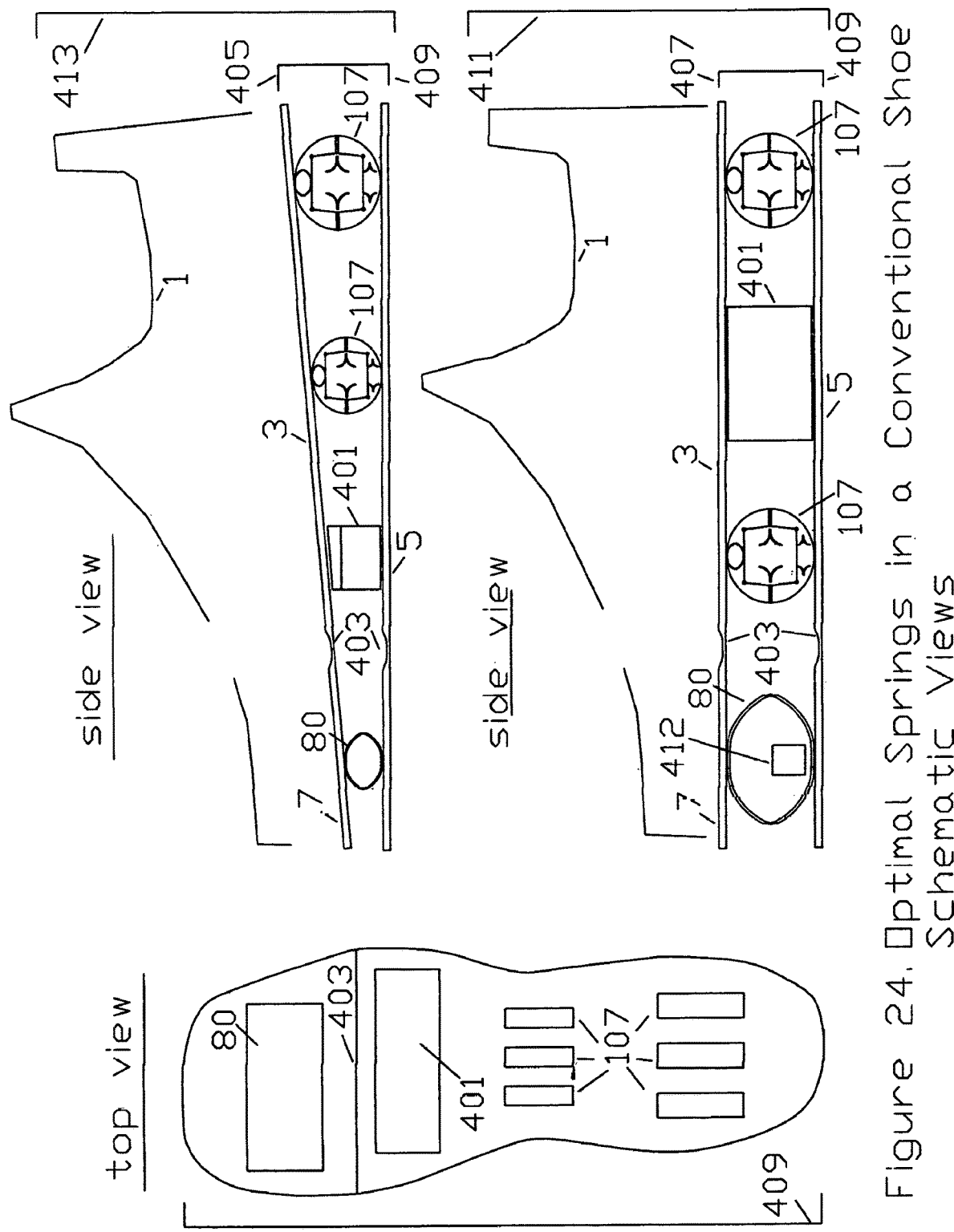
Figure 24. Optimal Springs in a Conventional Shoe Schematic Views

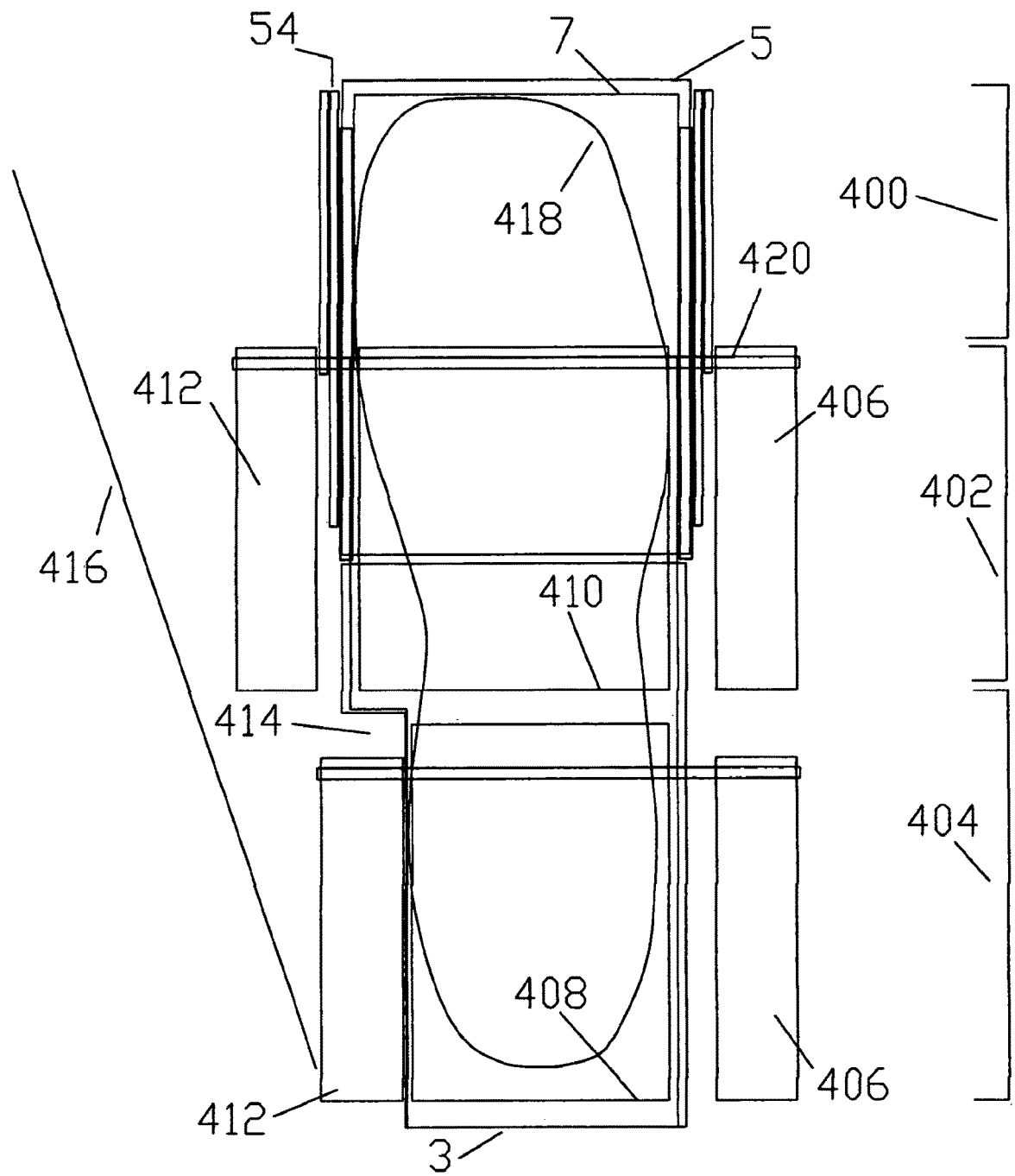
Figure 25. Possible Spring Locations for Shoe
Schematic Top View

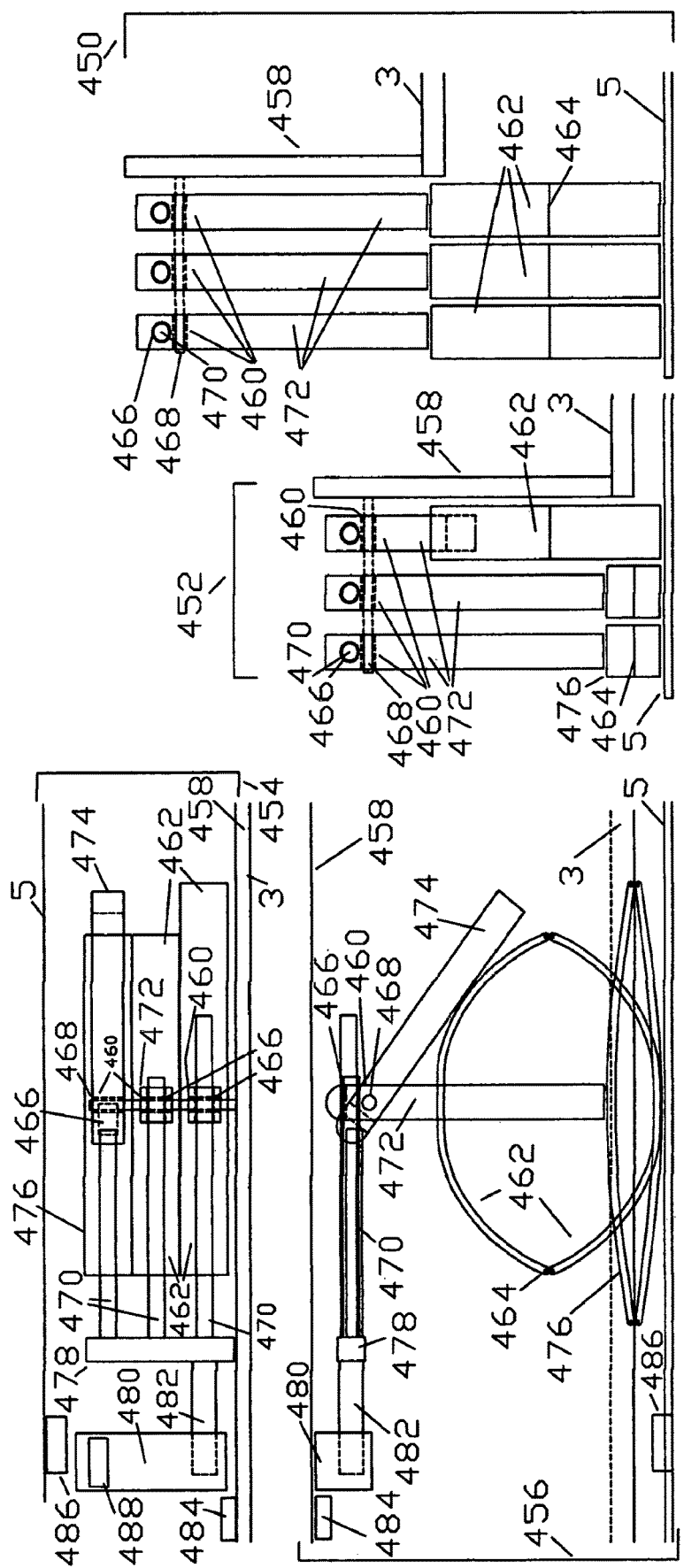

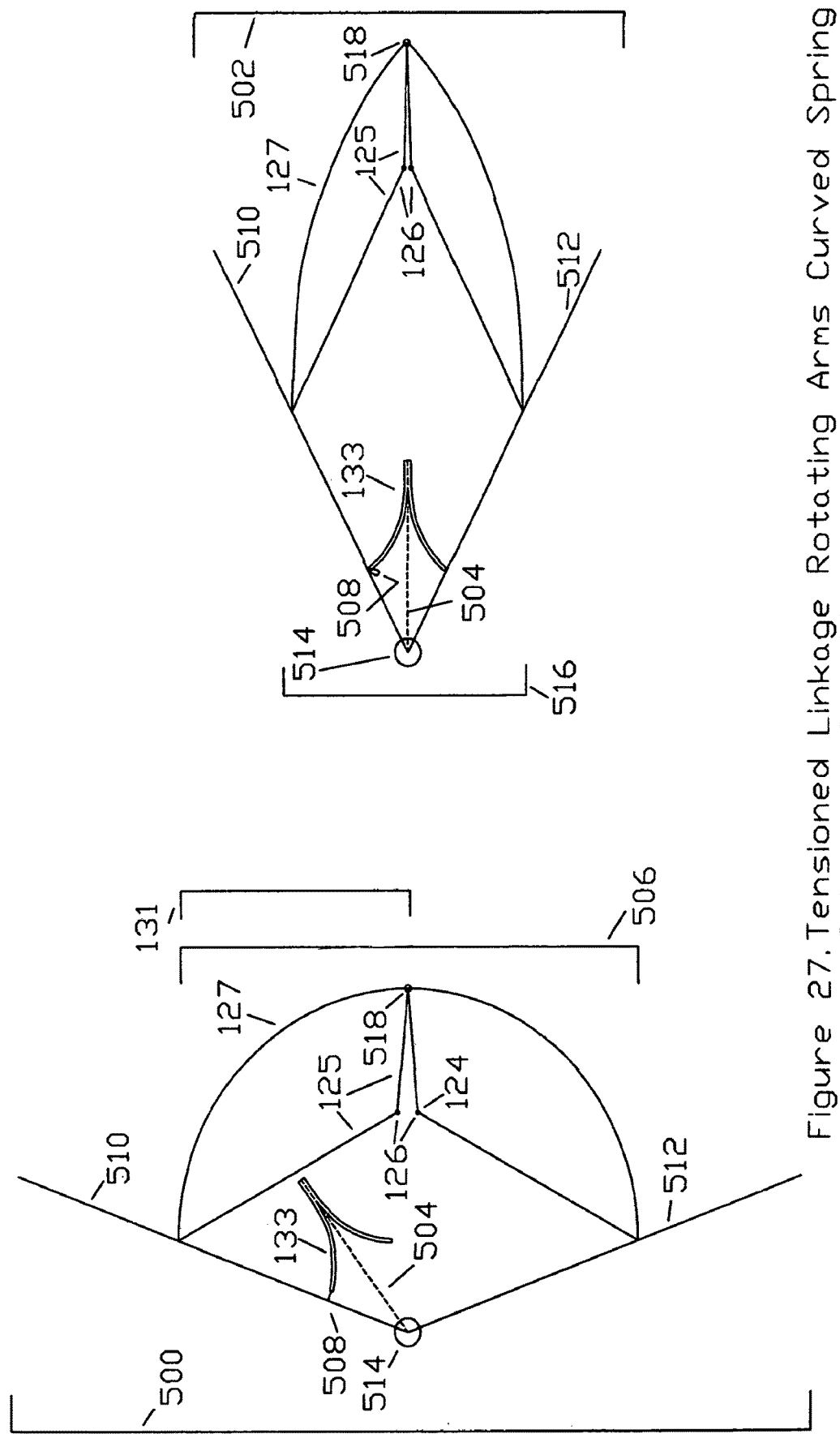
Figure 27. Tensioned Linkage Rotating Arms Curved Spring Schematic Side Views

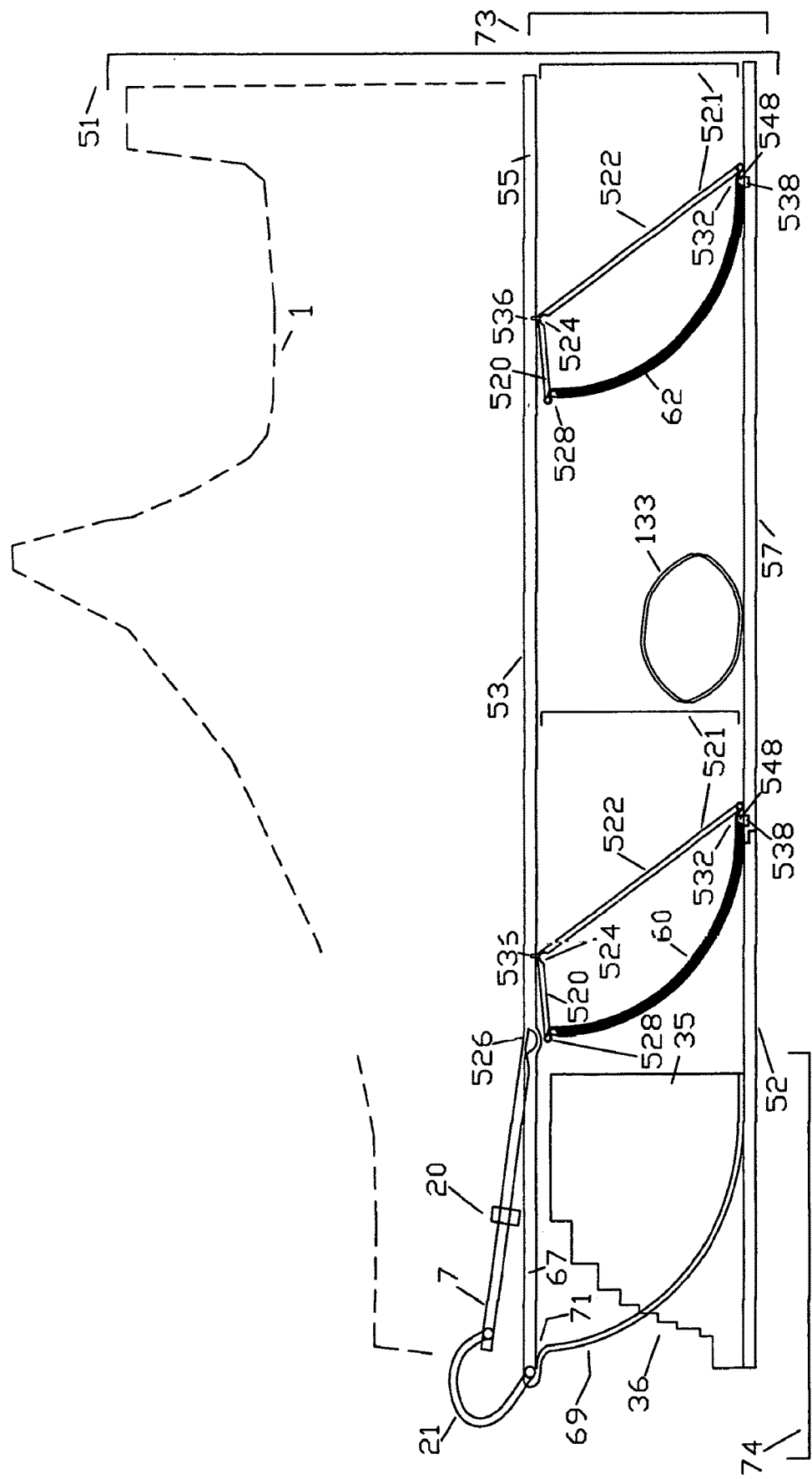
Figure 28. Linkage-Spread Curved-Spring Heel-Pop Shoe with Revised Linkage Schematic Side View at Heel Strike

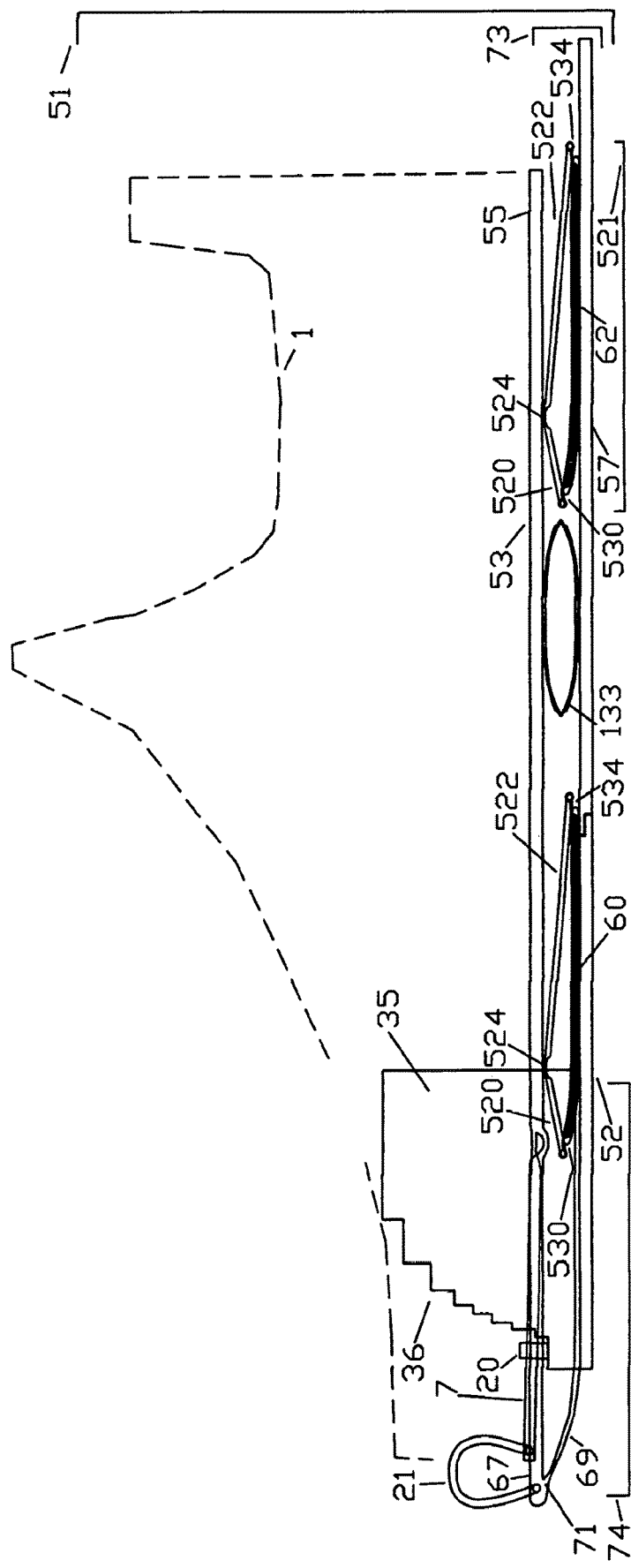
Figure 29. Linkage-Spread Curved-Spring Heel-Pop Shoe with Revised Linkage Schematic Side View at Almost Full Compression

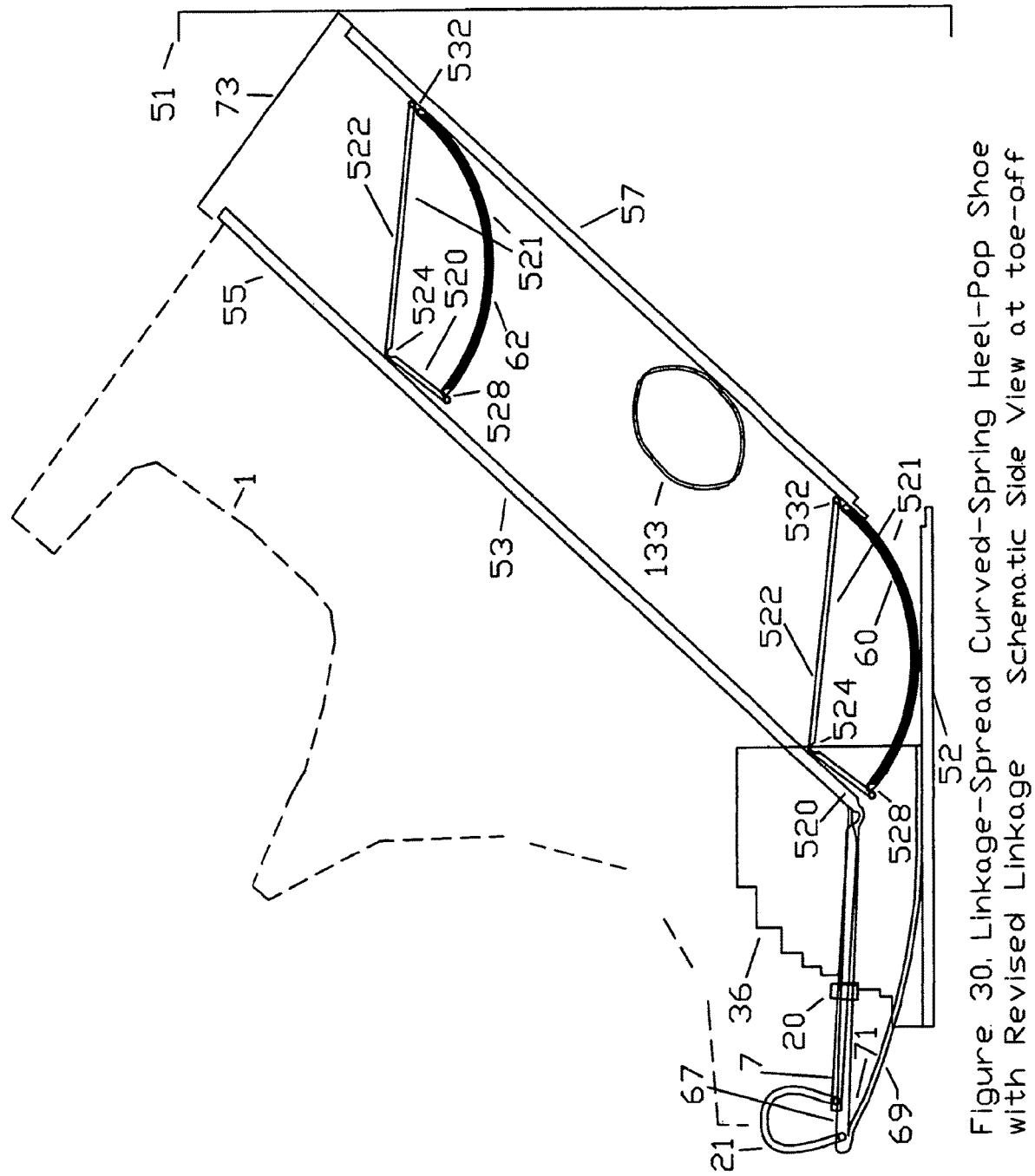
Figure 30. Linkage-Spread Curved-Spring Heel-Pop Shoe with Revised Linkage Schematic Side View at toe-off

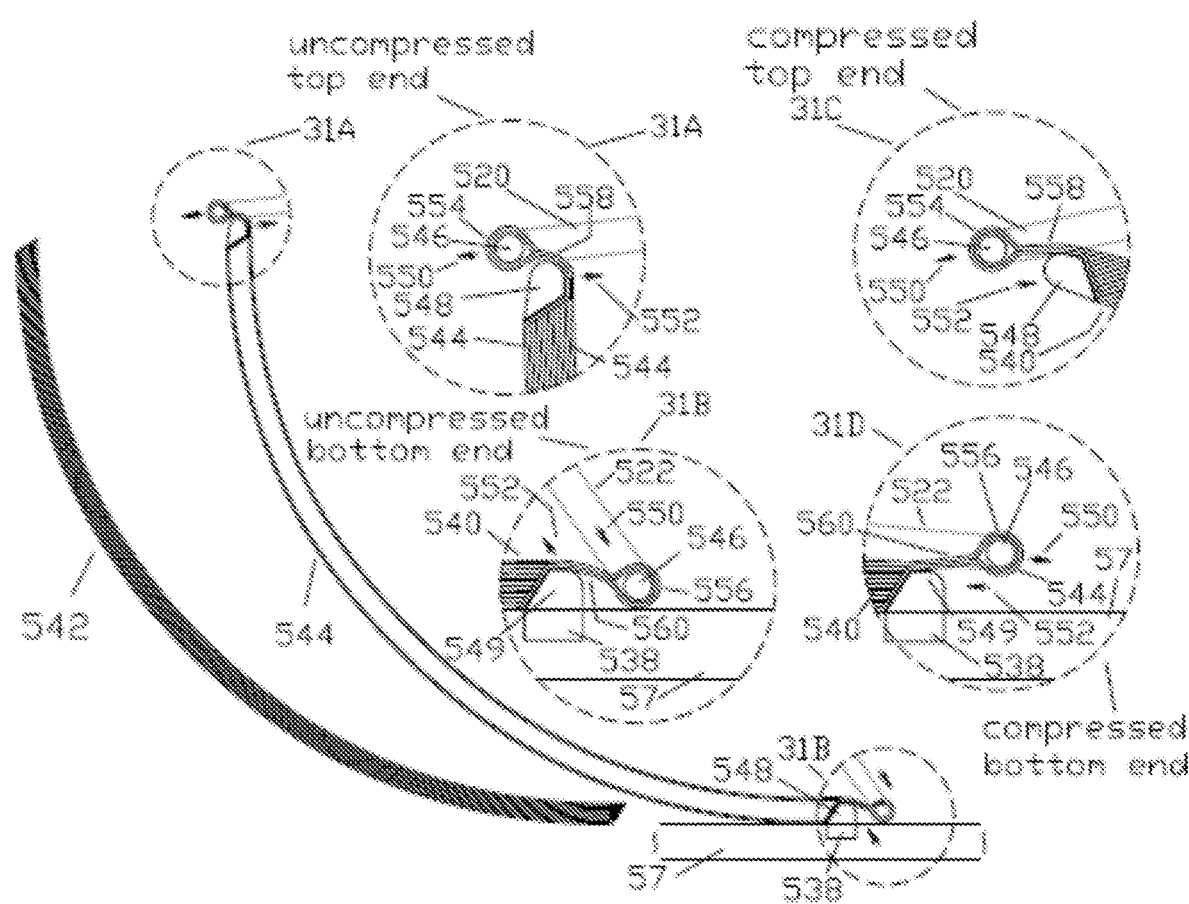
Figure 31. Details of Revised One-Sided Curved-Spring Linkage Schematic Side Views

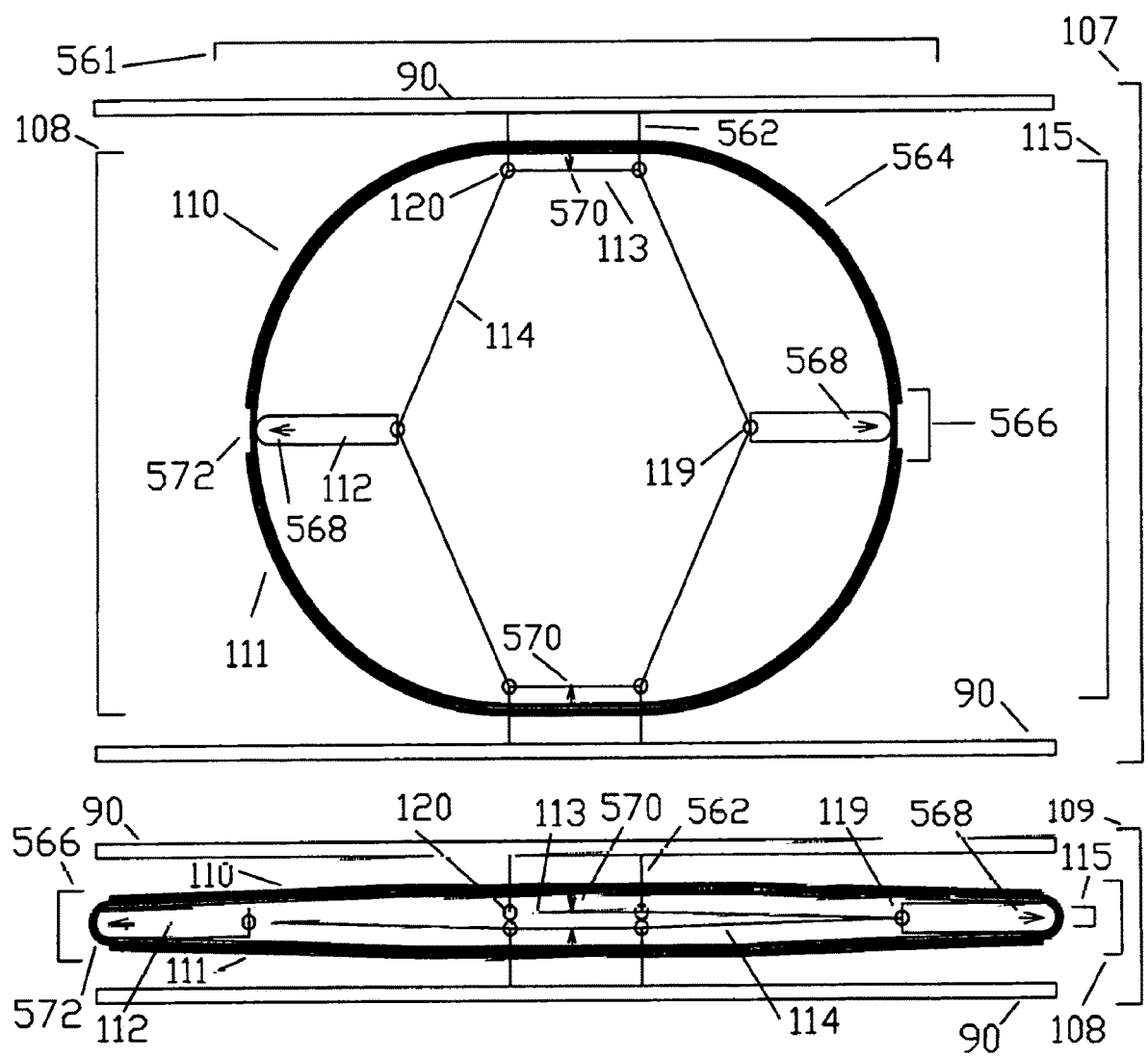
Figure 32. Revised Linkage-Spread Ring Spring Schematic SideViews

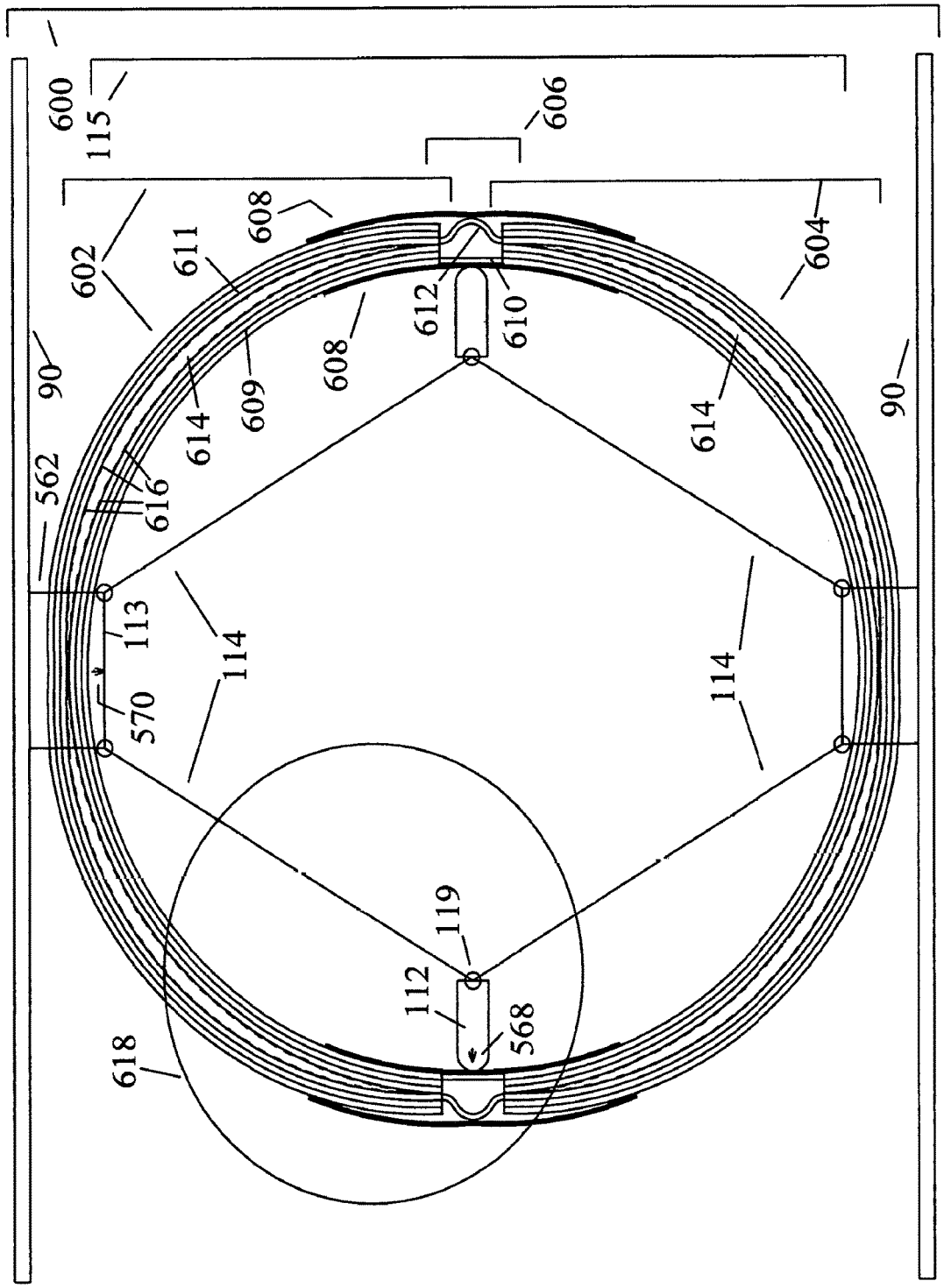
FIGURE 33. Merging Arms Internal Linkage Ring Spring Schematic Side View Uncompressed

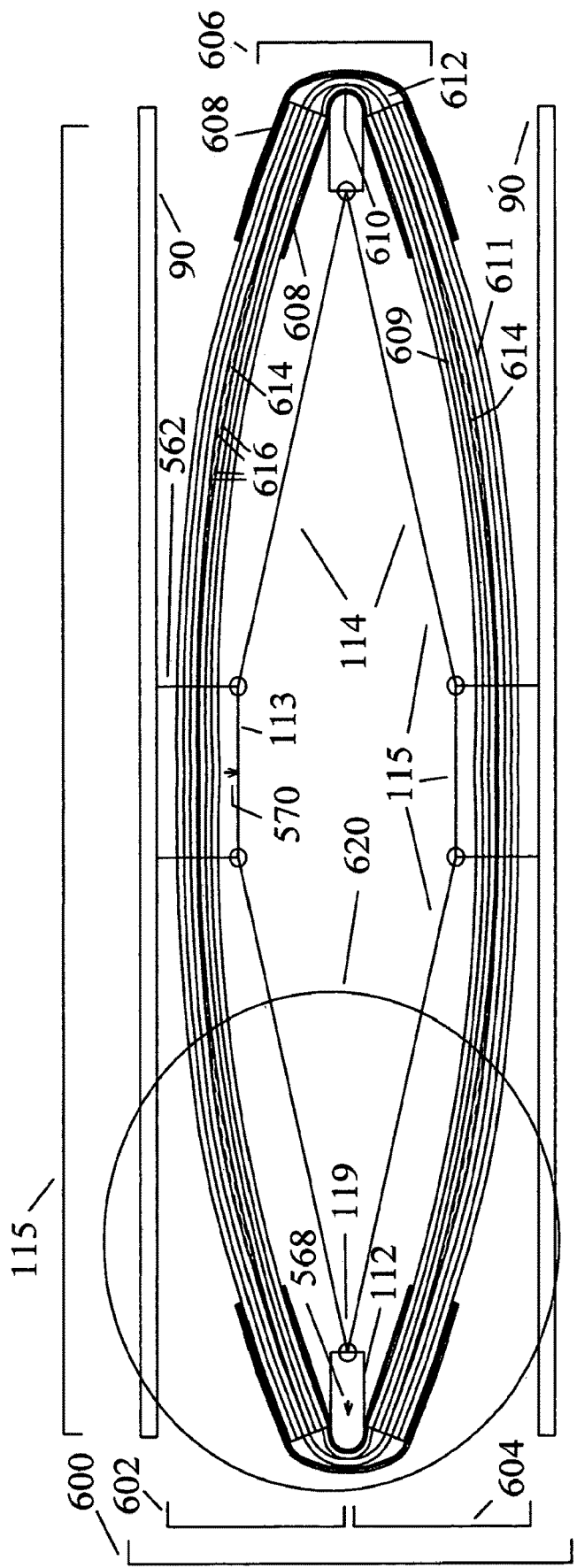
FIGURE 34. Merging Arms Internal Linkage Ring Spring Schematic Side View Compressed

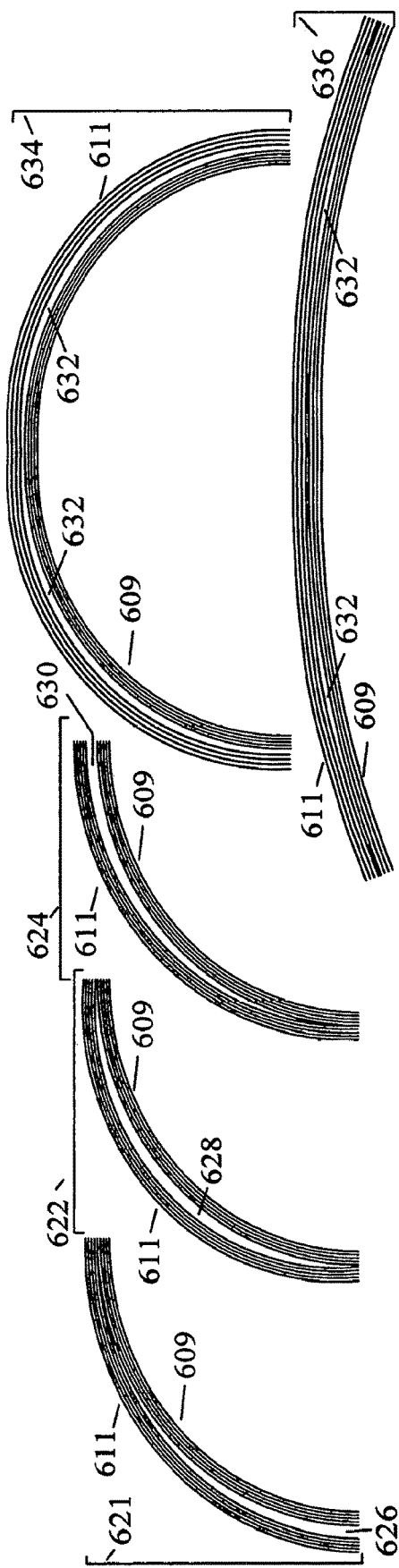
Figure 35C. Void Options for Merging Arms Schematic Side Views
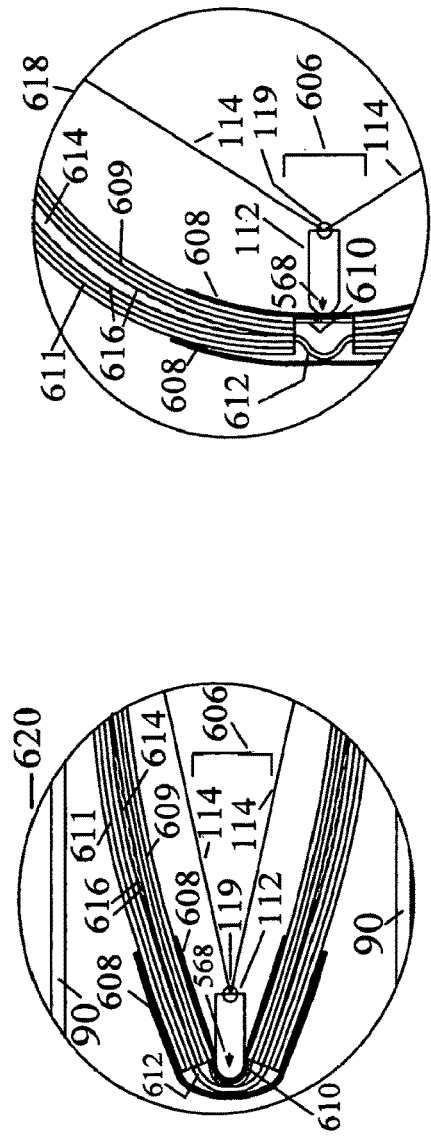
FIGURE 35A. Exploded View of Enhanced Natural Hinge Schematic Side View Uncompressed
FIGURE 35B. Exploded View of Enhanced Natural Hinge Schematic Side View Compressed

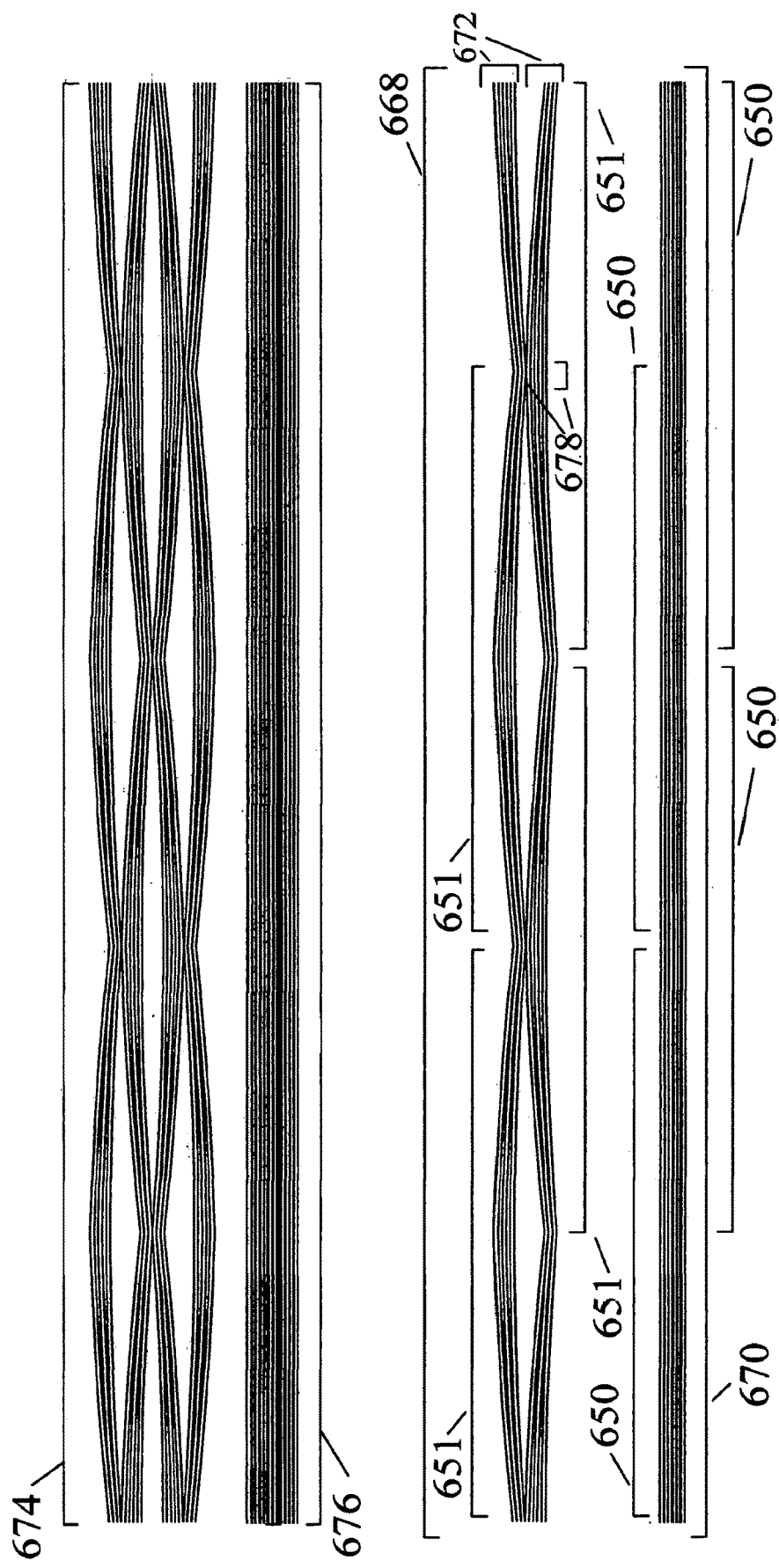
Figure 36. Mirrored Overlaid Continuous Merging Laminates Beam Schematic Side Views

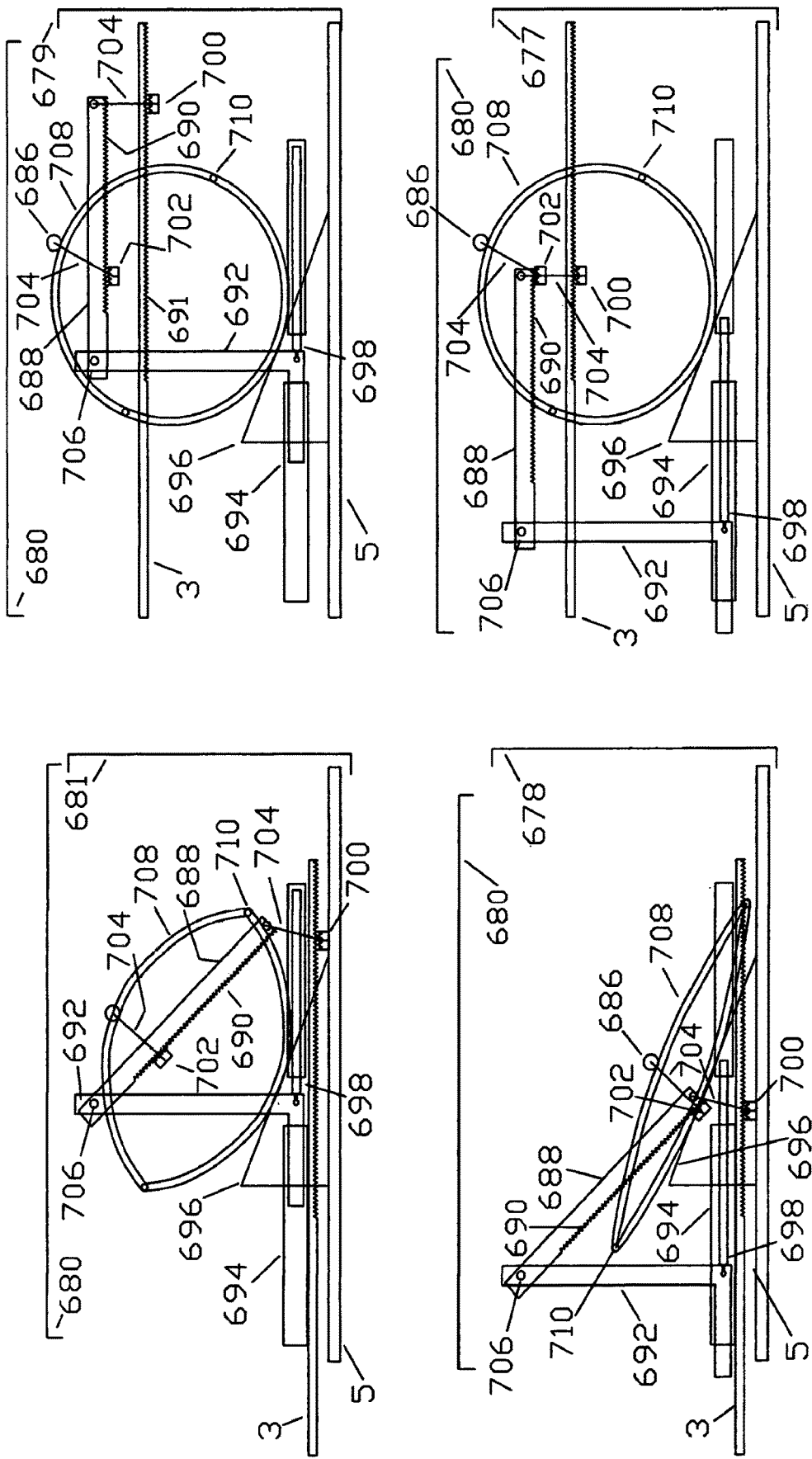
Figure 37. Precise Electro Auto Gear Changer Schematic Side View – Uncompressed and Compressed

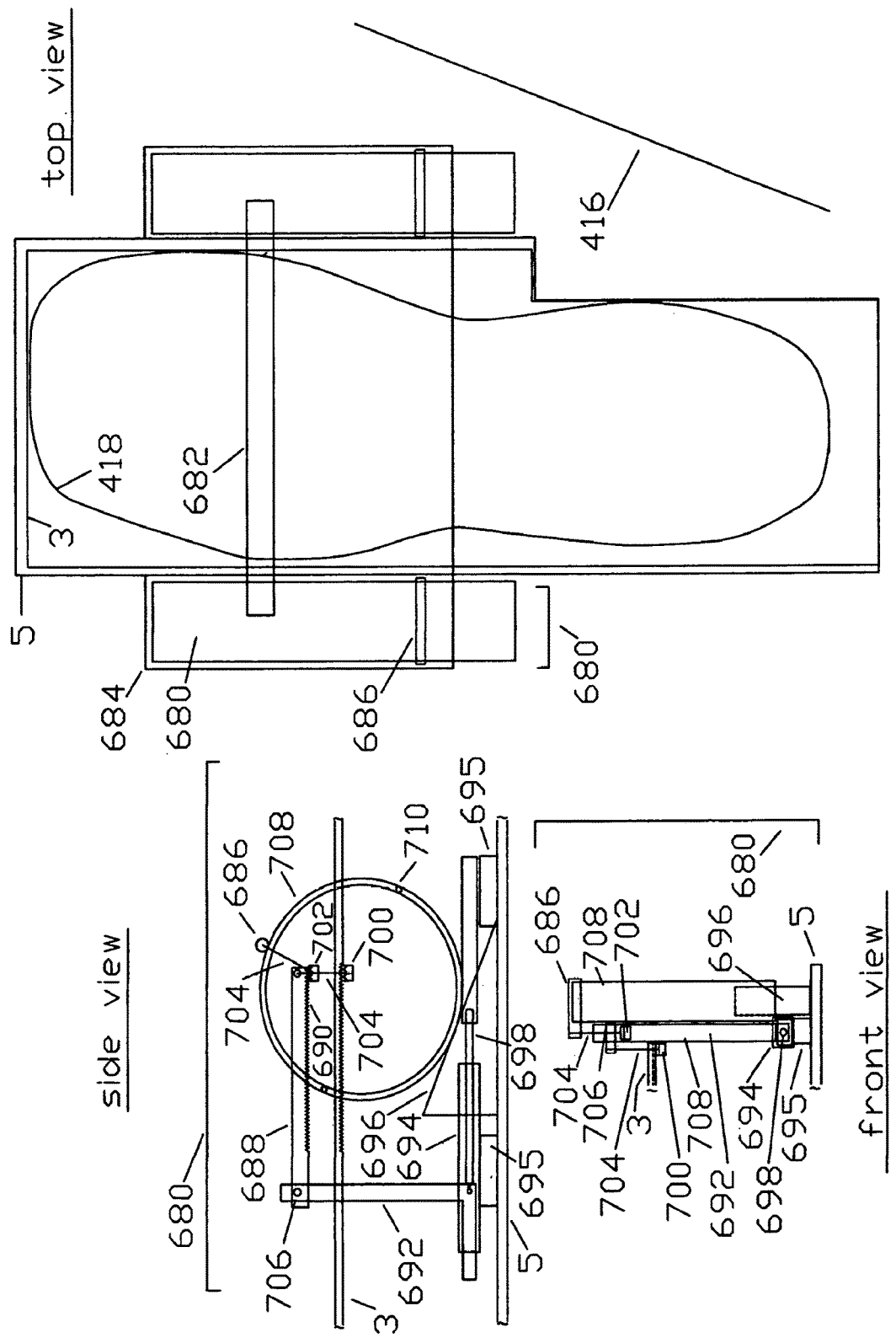
Figure 38. Precise Electro Auto Gear Changer Schematic Views

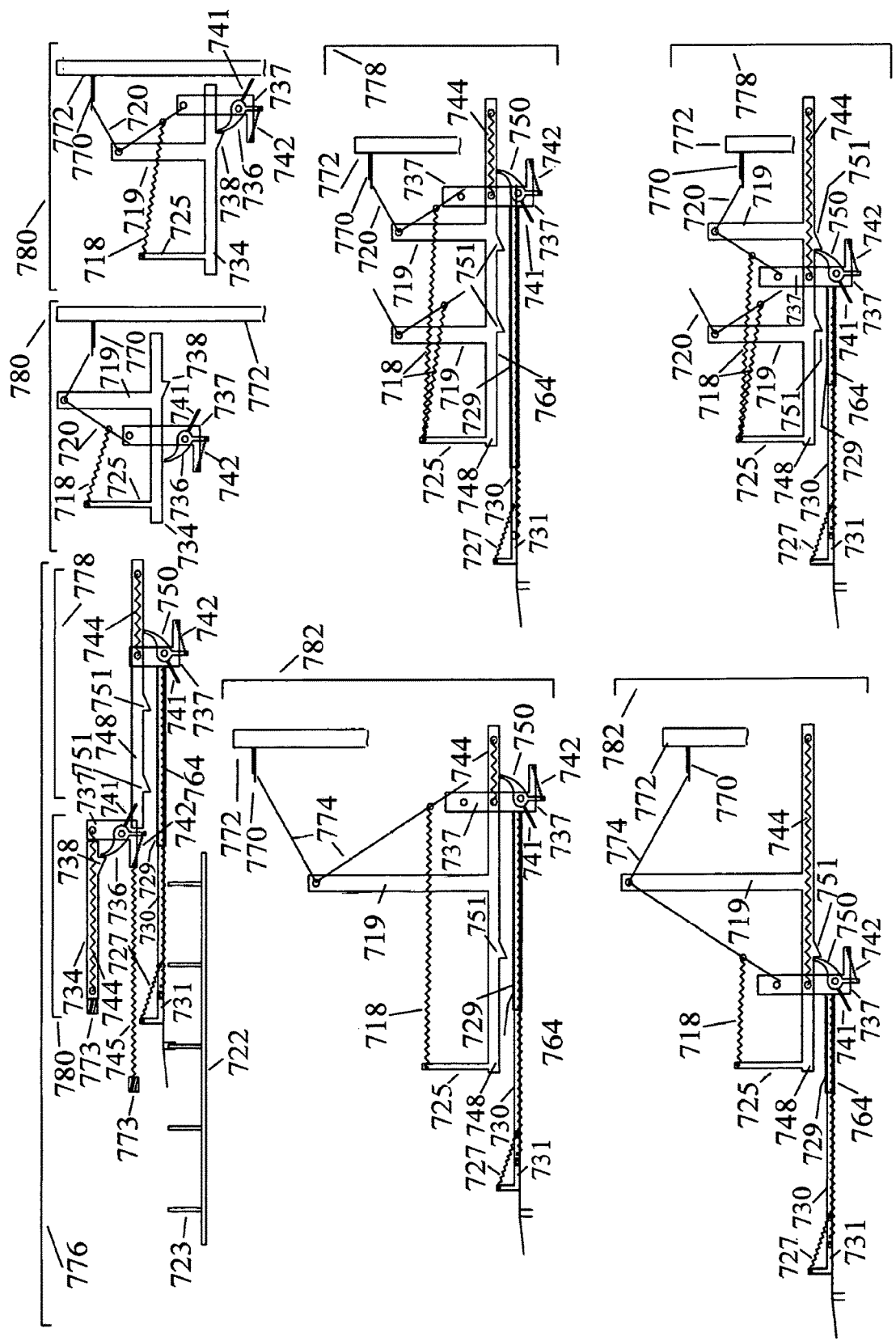
Figure 39. Mechanical Auto Gear Change Schematic Side Views

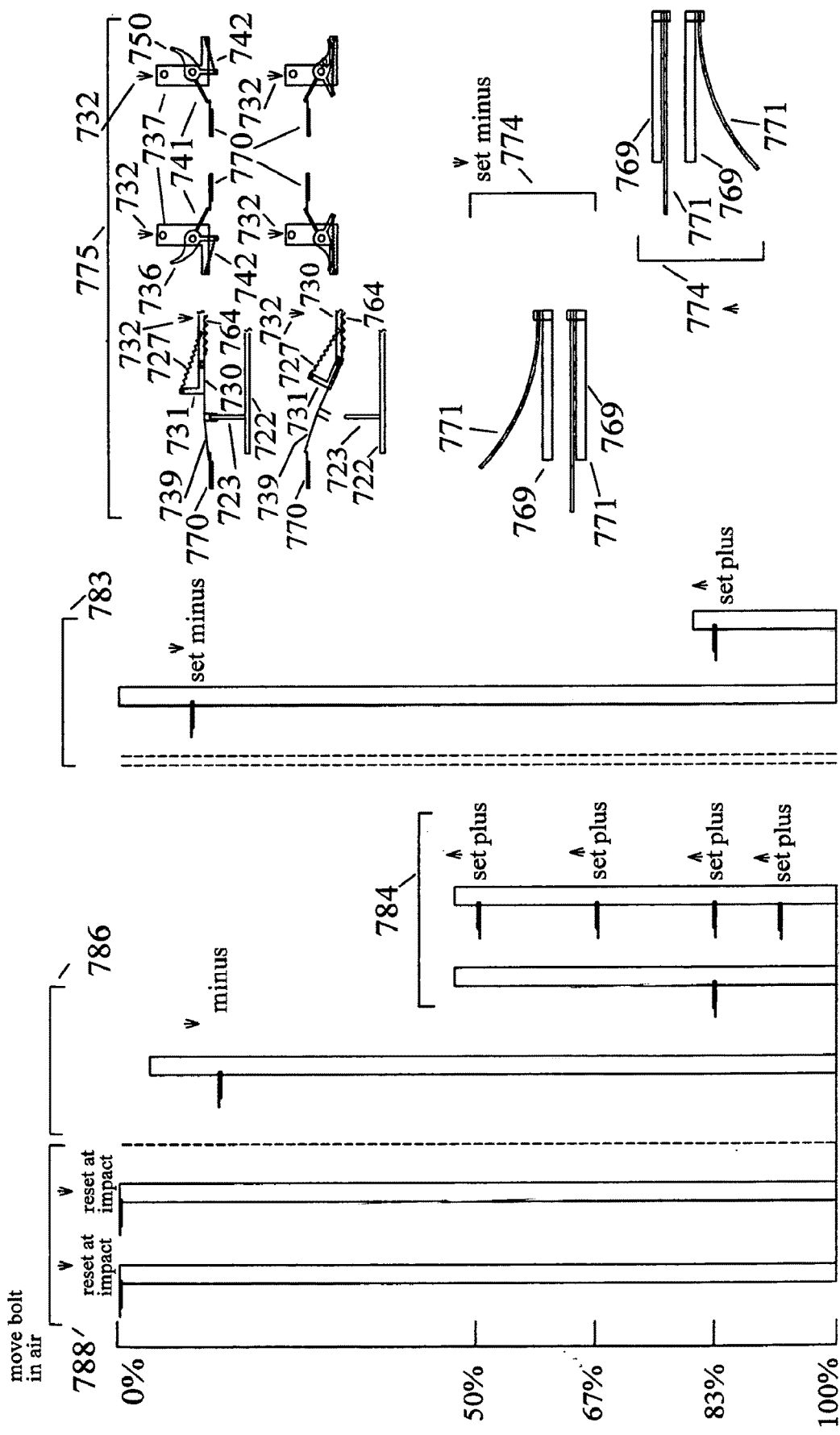
Figure 40. Mechanical Auto Gear Change - Set, Reset, Release Wand Configurations Schematic Side Views

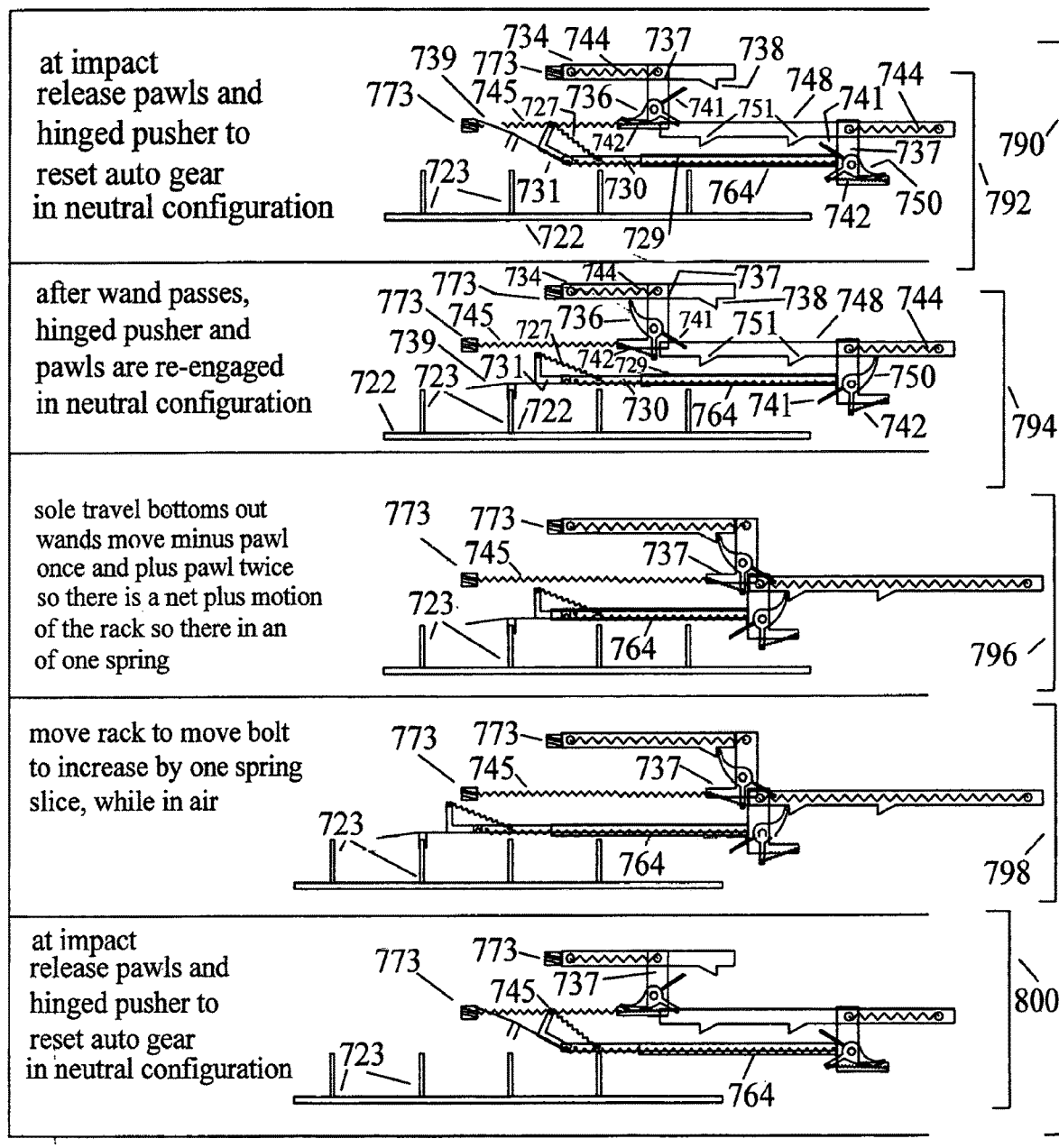
Figure 41. Mechanical Auto Gear Sequence - an example Schematic Side Views

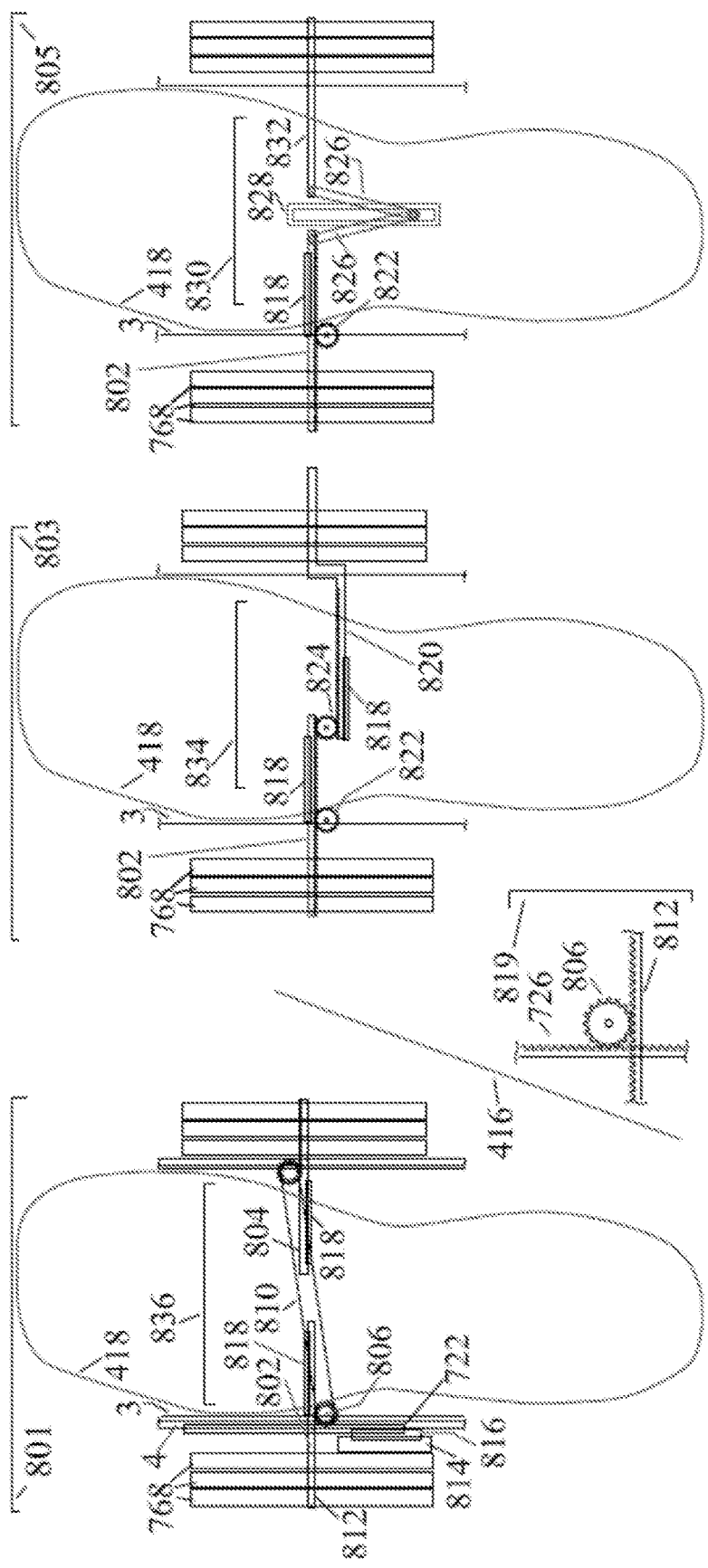
Figure 42. Various Designs to Slave the Inside Gear Change Assembly to the Outside Gear Change Assembly Schematic Top Views

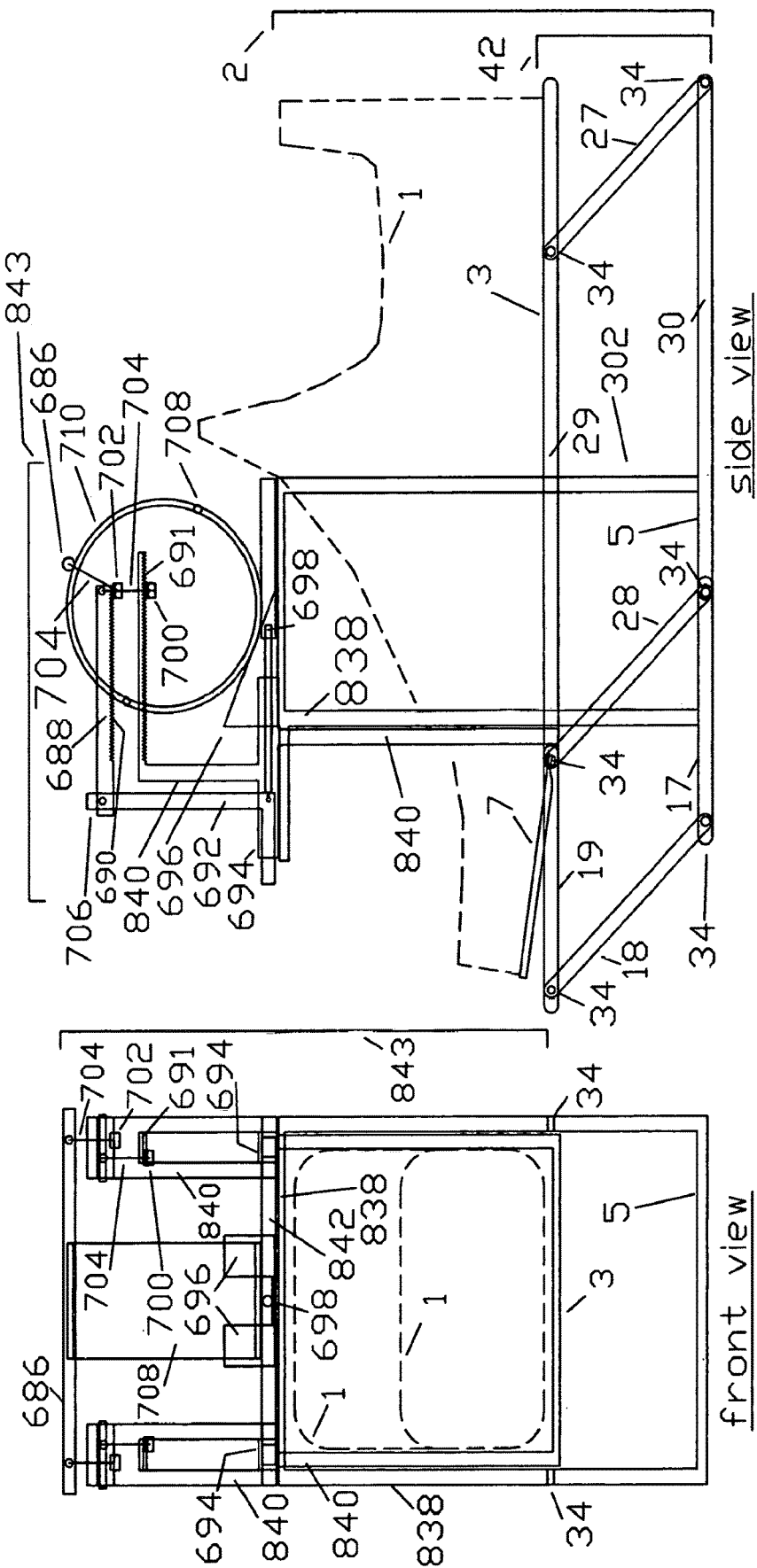
Figure 43. Above Foot Precise Electronic Automatic Gear Changer Schematic Views

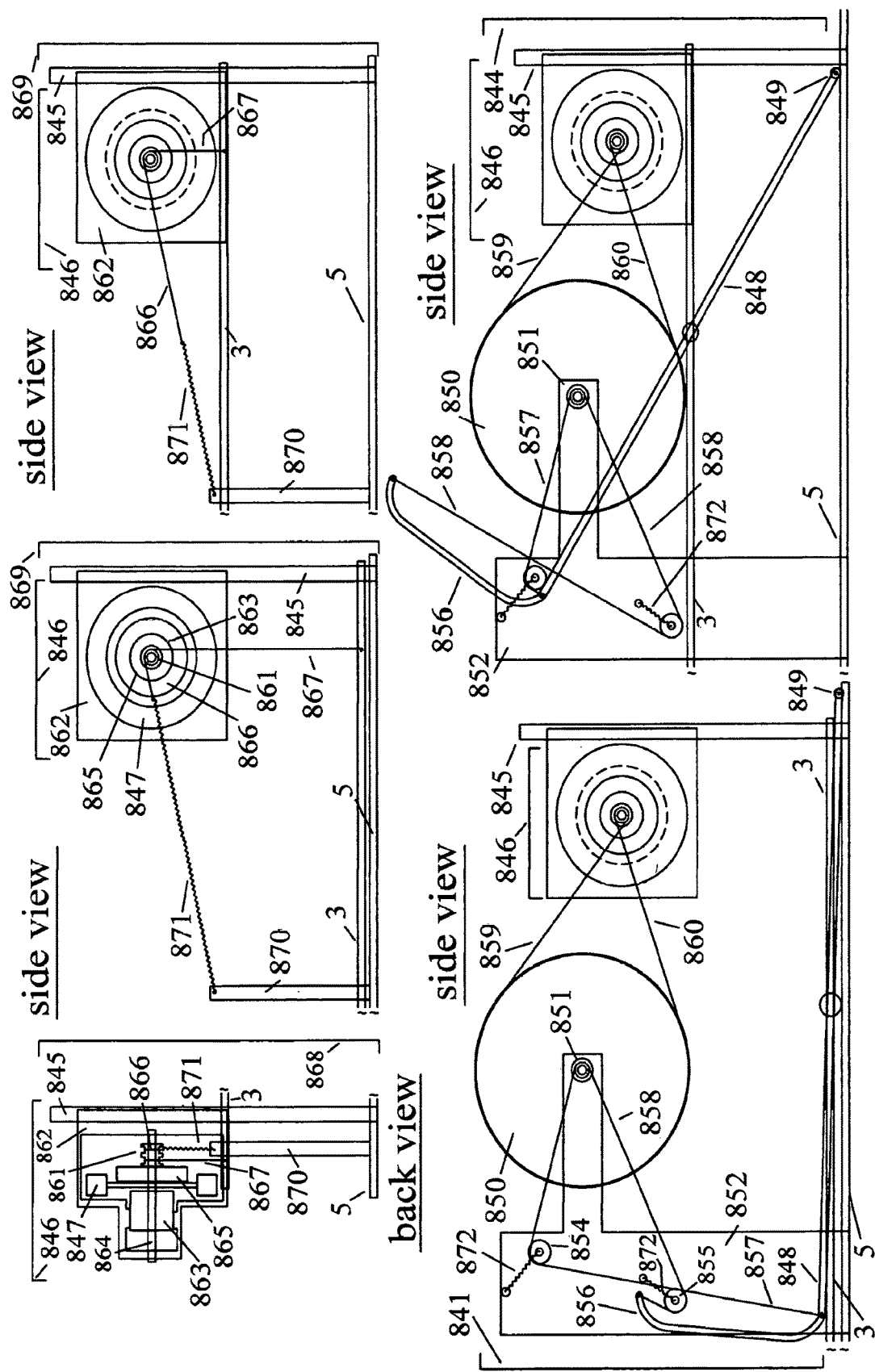
Fig 44. Integral Impact Charger Schematic Views

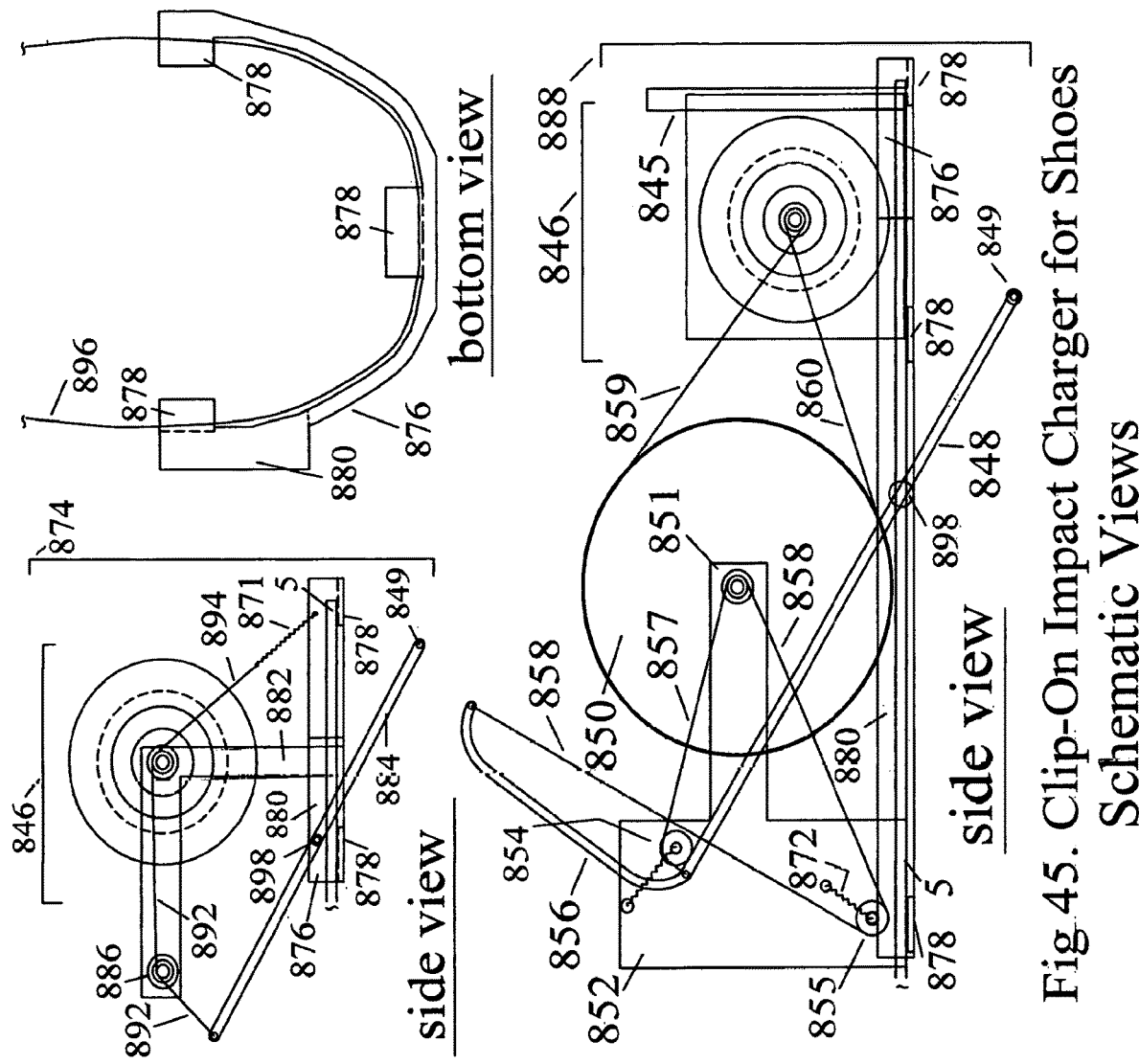
Fig. 45. Clip-On Impact Charger for Shoes Schematic Views

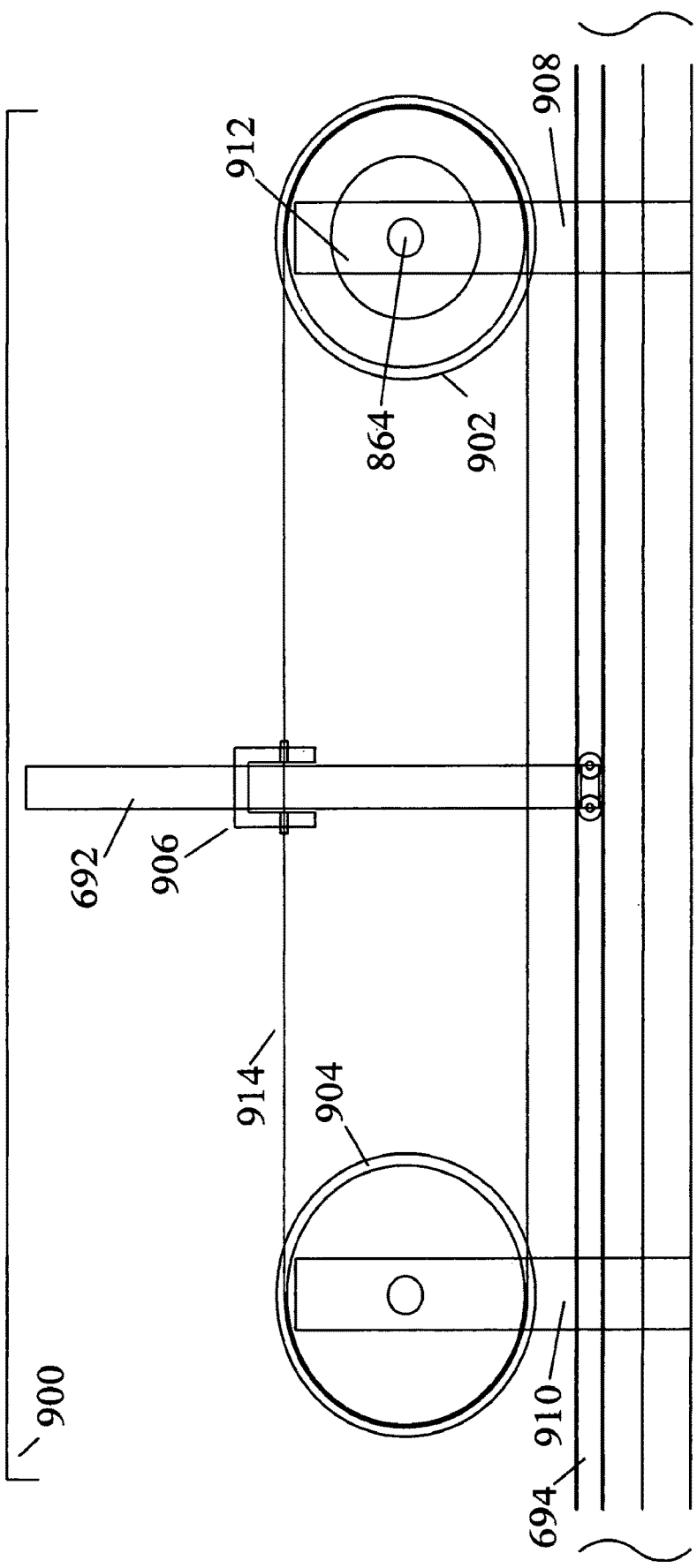
Figure 46. Pulley Actuator Schematic Side View

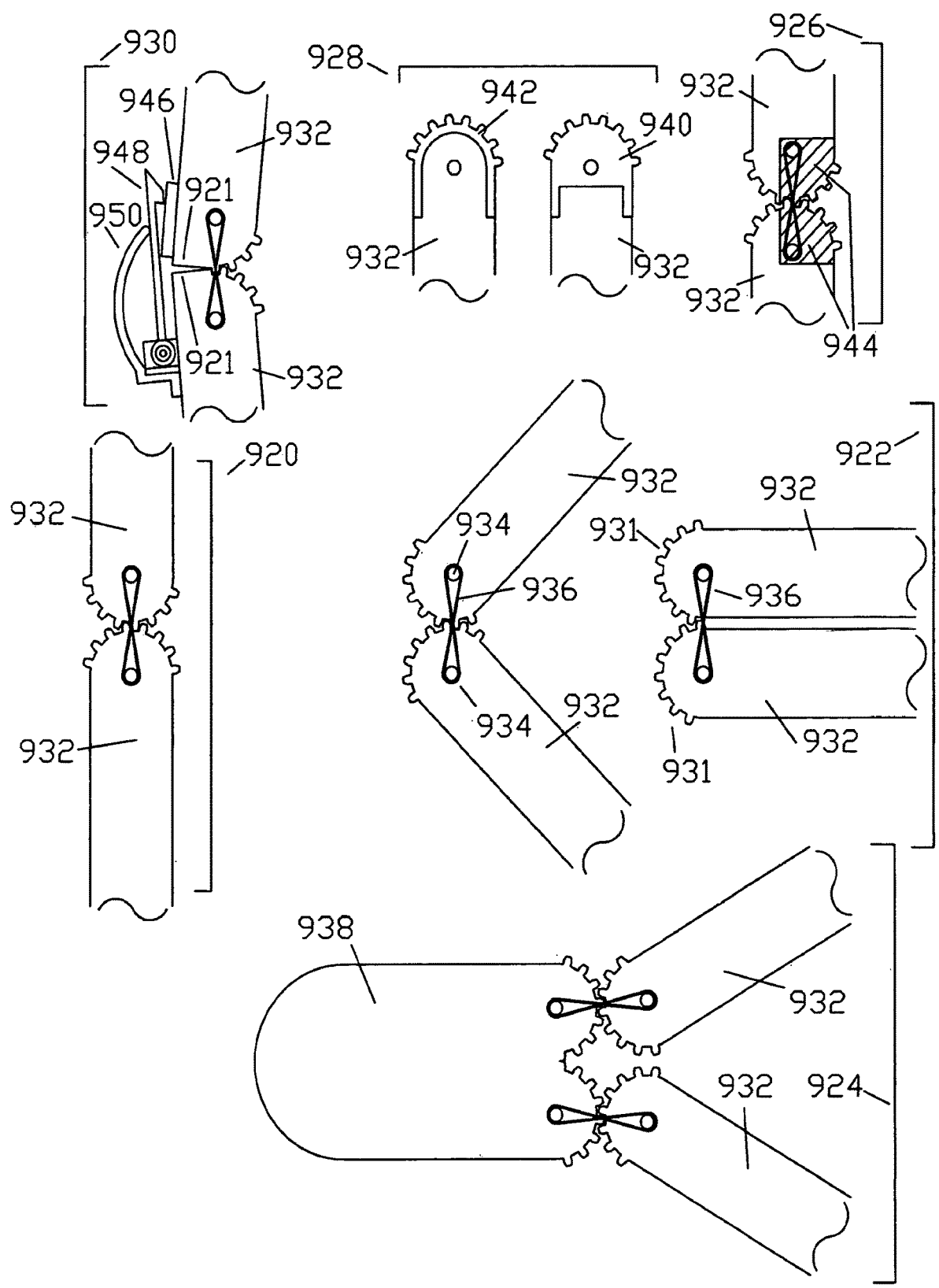
Figure 47. Tied Cogged Hinge Schematic Side Views

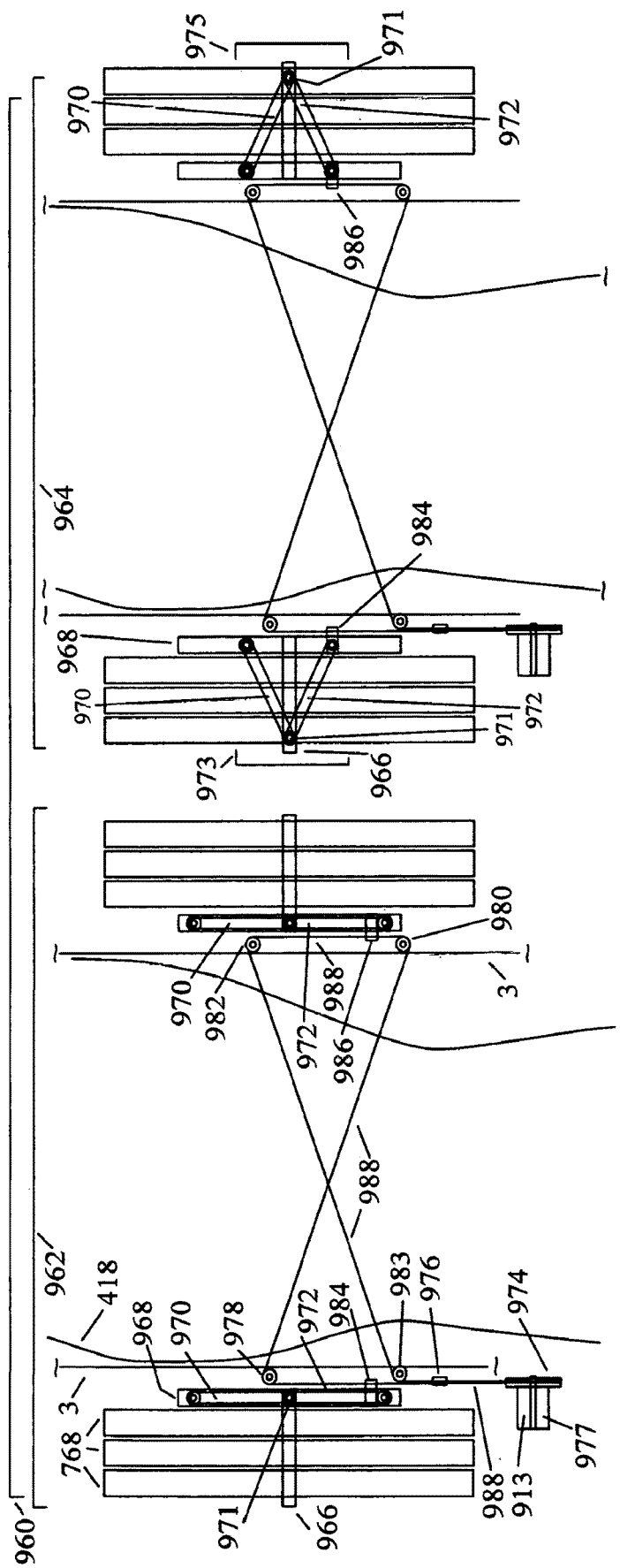
Figure 48. Cross Synchronized Pulley Actuated Gear Changer Schematic Top Views

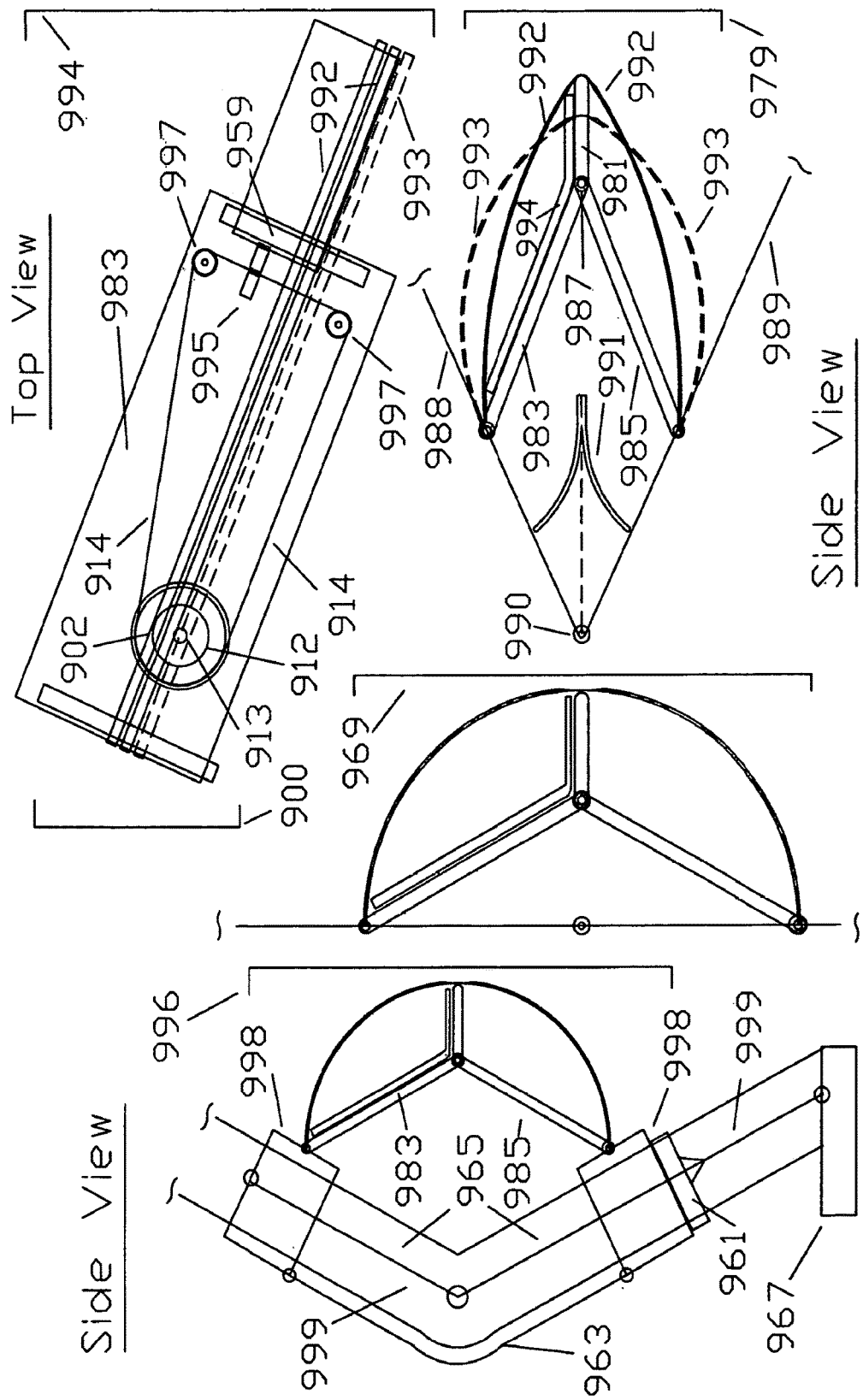
Figure. 49. Assembly for Rotating Limbs with Optimal Spring and Gear Change Schematic Side and Top Views

SUBSTANTIAL ENERGY RETURN SHOE WITH OPTIMAL LOW-IMPACT SPRINGS, TUNED GEAR CHANGE, AND SMART KNEE BRACE

This instant invention, as disclosed in the instant CIP patent, discloses an array of capabilities for a futuristic optimized shoe invention. It adds alternative designs, extensions, and improvements to the energy return, enhanced heel-lift shoe designs disclosed in its parent USPTO utility patent application Ser. No. 14/545,274 filed on Apr. 16, 2015—also of the instant inventor, Rennex. Herein, any reference to this parent application is simply made as the "parent application." Since the 1980's the holy grail for shoes has been substantial energy return—meaning that a substantial reduction in the metabolic energy cost of running is achieved by an effective coupling of the sole stored impact energy to lift the center of mass of the runner upward and forward during take-off. Simply putting springs anywhere in the sole provides only a few percent energy cost reduction— no matter how high the coefficient of restitution is for these simple springs. The issues of heel-toe action, ankle and knee action, series support, and timing make this effective coupling difficult to understand and achieve. Conventional shoes which only feature simple springs in the soles do not provide substantial energy return. Rather, substantial energy return requires enhanced heel-lift which is the goal of the instant invention. However, straightforward designs to achieve enhanced heel-lift are prohibitively complicated. The heel-pop designs herein are simple enough to be both practical and inexpensive to manufacture. They also overcome the inherent flaw in the only prior art design with enhanced heel-lift by using an anti-toe-sink mechanism or by using automatic gear changers.

BACKGROUND

Another capability of the invention uses low-impact springs to reduce the maximum impact force felt by the runner. These optimal springs can be used both in high-performance energy return shoes and in conventional shoes. With reference to FIGS. 1-3, the goal of the alternative design of FIGS. 28-30 is to make more robust the capability to achieve an optimal force curve (which requires that the force curve bend over during the compression of the shoe sole). This is achieved with a modification of how the spreading linkage is connected to the curved spring. The details of the revised linkage-to-curved spring hinges, the construction of the linkage, and curved spring itself are shown in FIG. 31. With reference to FIGS. 13 and 15, the goal of the alternative design of FIG. 32 of the invention of the instant provisional patent is to load the ring spring only by spreading it at its sides. The details of the construction of this linkage and this spring are also shown in FIG. 32. Notably, the tied cogged hinge of FIG. 47 can be used for the corner hinges of the parallelogram of FIGS. 7-9, for the internal linkage hinges of FIGS. 13, 15 and 32, and for the rotating arms joint of FIGS. 27 and 49.

The goal of the design of the merging arms embodiment of FIGS. 33-36 of the instant provisional application is to modify the ring spring of FIG. 32 in such a manner that it becomes both stronger and tougher, whereby the term tougher means that the new ring spring is capable of absorbing significantly more energy before breaking. This goal is accomplished by making the outer arms slightly bowed out and longer—in such a way that they just merge at full ring spring compression. There are also two types of improvements of the pivots. The first kind features enhanced novel necked down natural hinges which address the issue of composite brittleness with more flexible matrix materials. The second kind features tied cogged hinges which do not utilize natural hinges, but which can still be inexpensively manufactured—even at the small linkage sizes required in the shoe. This design is called the merging arms internal linkage ring spring. A variation of this design is called the overlaid merging laminates beam, in which sinusoidal-like, out-of-phase, adjacent laminates merge as the beam is bent. For both of these designs, there results a much tougher, much stronger merged structure than if you just added two independent laminates. This is because the merged laminate structure transitions to a cohesive structure twice as thick, and the spring strength goes as the cube of the thickness. If the comparison is for the case of two merged laminates, there is a benefit of two squared (a factor of four) in strength per weight. As the number of laminates increases, this benefit goes as the number of laminates squared. Also, since the bulged out laminates, e.g., are absorbing more energy by flexing more, these structures are much tougher.

Also, optimal performance requires a large sole compression for all impact forces (running speeds). The first gear change mechanism herein of FIG. 26 automatically changes the spring system stiffness so that there is always close to full sole compression. Additional simplified designs for gear change are shown in FIGS. 37-44 and in FIGS. 46 and 48. These include versions that are strictly mechanical or that also use electronic actuators. Notably, there are designs for precise gear change over a continuous range, not just at a few discrete gear levels like with a bike or a car. More notably, the cross synchronized pulley actuated automatic gear changer of FIG. 48 synchronizes the gear change of the inside assembly with that of the inside assembly in a manner that is optimally simple and easy to manufacture. Also, the precision of the gear change (equivalent to the number of gears) can be improved to the point where it is equivalent to the theoretically completely precise gear change of FIGS. 37 and 38. There are also designs for novel shoe impact electric chargers—both for the enhanced heel-lift shoe with large heel travel, and for a clip-on design for all shoes. These chargers are cheaper than those of the prior art, and they provide far more electric power. There is also a novel pulley actuator which is lighter, cheaper, simpler, and faster than those of that prior art. Finally, the optimal low-impact springs herein are improved so that they are significantly tougher and stronger. The sum of all these capabilities is a futuristic running/walking shoe with 40% lower impact force springs and with approximately 20% energy return at all walking/running speeds—by virtue of the fact that the effective spring strength (gear) is automatically changed step by step with a automatic gear changer which is powered by a shoe impact charger. There is also a variation of optimal springs for limbs rotating about a joint. Combining this with the electronic gear changer herein leads to a light, inexpensive energy return knee brace. It is conceivable that each of these two enhancements (the smart energy return shoe knee brace) can provide a 25% reduction in the metabolic energy cost of running. Thus, their combined energy return can be 50%.

SUMMARY OF THE INVENTION

The optimized shoe invention comprises a number of embodiments and two methods to optimize both the performance and comfort of footwear walking and running for people and for robotic, prosthetic and orthotic applications.

First, there are several versions of enhanced heel-lift shoes (also called heel-pop shoes herein) for significant energy return—much higher than what is achievable with conventional shoes. Note (to correct an all too common misconception in the shoe world) that energy return in the instant invention refers to metabolic energy cost reduction, not simply to the coefficient of restitution of the sole springs themselves. That is, the sole energy is used to thrust the runner's center of mass back into the air. This energy return is difficult to understand and very difficult to achieve. Second, to minimize foot impact, there are ten enhanced optimal springs. Third, for ankle and knee joints there is a rotating-arms enhanced optimal spring, and tied cogged hinge can be used as its optimally simple, yet robust hinge for folded arrays to be deployed in outer space. Fourth, said enhanced optimal springs are incorporated into conventional shoes. Fifth, there is an several automatic gear change mechanisms to change the effective sole spring stiffness so that the sole is always is close to full compression—so that performance and comfort is always optimal. This change of effective sole spring stiffness is referred to herein as "gear change"—as a short cut phrase that is easily understandable. The optimal force curve method to minimize foot impact requires optimal springs with a pre-loaded constant force curve, and it requires a means to calculate, measure, and adjust the optimal total sole energy for a particular user for a particular type of running or walking. The shoe tuning method provides a means to measure and adjust sole energy of shoes by precise slicing of 2D sole springs during the manufacture of said shoes or by the use of precise insertable 2D springs—based on the fact that the sole energy absorbed at full deflection by the optimized springs of the instant invention is linearly proportional to a scientifically chosen value of sole thickness. The runner or walker is referred to herein as the user.

The three versions of the heel-pop design herein ensure that virtually all of the foot impact energy is captured and stored during the impact period and then returned via enhanced heel-lift during the heel-lift period. Enhanced heel-lift means that the mechanism lifts only (or primarily) the user's heel (not the toe) by a distance that is substantially greater (by a factor of two to three) than the distance of sole heel compression during the impact period. The critical design feature of heel-pop shoes is that the sole structure below and rearward of the toe joint is spring loaded, and this sole structure flattens out during sole compression. As the runner's weight comes onto the runner's toes, the design ensures that the stored energy is used to lever up and to lift only the runner's heel substantially more than the distance of heel compression. This enhanced heel-lift is referred to herein as heel-pop. It is the best way to achieve substantial energy return. These heel-pop designs are simple, easily manufacturable, and novel in the shoe art. That is, although there are a number of shoe patents that claim to feature energy return by virtue of a whole host of types of conventional springs in their soles, in fact such prior art does not provide enhanced heel-lift and hence substantial energy return. The heel-pop benefit is due to the fact that the distance over which the calf muscles are providing heel-lift during heel-lift is roughly three times greater than the distance of heel compression and expansion provided by conventional shoe springs. For conventional shoes, the heel springs act for only a third (usually much less) of heel-lift. Thus, most of the stored heel impact energy is wasted because of the resultant and inherent poor coupling of the heel spring action to the acceleration of the user's center of mass upward and forward during heel-lift. Since the enhanced heel-lift action of the instant invention is doing most of the work of lifting the heel, the calf muscle does not have to work as hard. Thus, the metabolic energy exerted by the calf is significantly reduced. Thus, there is substantial energy return. The heel-pop mechanism requires that the toe plate be articulated with respect to the footplate. Its compressible sole compresses a greater distance than conventional soles (preferably 1-3 inches), and the footplate section of this sole comprises four sides. The front and rear sides are inclined forward and rotate forward during compression so that the compressible sole is flattened. In the first two versions of the heel-pop embodiment, the front and rear sides are curved springs, and in the third embodiment of the invention, the four sides form a spring-loaded parallelogram which is compressed downward and forward.

In FIGS. 28-31 the linkage which spreads the curved springs is connected differently than in FIGS. 1-3, in order to ensure the reliability of the optimal force curve in the energy return shoe design of FIGS. 1, 2 and 3. Also, details are provided of the construction and of the method of connection for the curved spring and its spreading linkage. This refers to the one-sided curved spring of these three figures. Also, the linkage spread ring spring of FIGS. 13 and 15 is modified and shown in more detail in FIG. 32—again to ensure an optimal constant force curve. Referring generically to this pivoted mirrored hemisphere spring, used in the linkage spread ring springs, as a pivoted ring spring, a variation of the pivoted ring spring is introduced herein in FIGS. 33-36 which features merging laminates (arms) to make this spring significantly tougher (that is, it absorbs more energy without breaking) and stronger. This merging arms internal linkage ring spring has a harder force curve. Thus, when used with linkage spreading which bends the force curve over to go to zero, the resultant spring force curve is a more constant force curve. This merging arms idea can also be used as an overlaid merging laminates beam with applications in other areas such as flexible, strong, light structural elements or body armor.

With regard to enhanced heel-lift, Rennex in U.S. Pat. No. 6,684,531 of Feb. 3, 2004 mentions the idea in his FIG. 21. However, that design was very different and impractical; also, it returned some of the foot impact energy at the toe. In the instant invention, virtually all of the impact energy goes into enhanced heel-lift for optimal energy return, and the instant design is eminently practical. Freschi in US application 20140165428 of Mar. 23, 2012 discloses a parallelogram-based shoe design which provides enhanced heel-lift. It is restricted to using a compression spring connecting the short one of the two diagonal connecting the parallelogram hinges. That is an admirably simple solution, but unfortunately the design is inherently flawed. In order to, in effect, change gears (a capability which is also reported in the instant patent and in its parent U.S. application Ser. No. 14/545,274 of the instant author) the wearer must reach down and hand adjust a dial which changes the length of the diagonal (of the parallelogram) which contains the compression spring. This reduces the height of the parallelogram, which severely reduces the energy return of the shoe as the sole height becomes smaller and smaller. It is also unacceptable that a wearer must constantly stop and kneel down to make this adjustment. And even where this adjustment has been made, there is optimal energy return only when this adjustment is made for maximum sole height and only when the runner compresses the sole fully. Otherwise, the heel-lift and the corresponding energy return decrease drastically. At the same time, when the impact force is too small for the parallelogram sole to fully compress, there is a severe toe-sink problem in which the wearer's toe flops down and sinks, which is comparable to one's toes sinking when running in the sand. This is unacceptable, and thus this design neither provides full energy return or a proper toe-off action over most of its range of shoe impact values for a user—in addition to the hassle of requiring the user to kneel down and adjust the shoe by hand every time the running speed changes. Furthermore, there is no way to correct for this shortcoming in the Freschi design. In contradistinction, the designs of the instant author, both in his parent application Ser. No. 14/545,274, and in the instant patent, overcome this shortcoming by virtue of the fact that these designs are very and patently distinct. That is, they are intended from the get-go to overcome these two design killer problems. In the design first disclosed in the parent application Ser. No. 14/545,274, the instant author utilizes an anti-toe-sink mechanism to automatically prevent excessive toe sink. Even though this solution is automatic and a distinct improvement over the design of Freschi (which requires that the runner stop and adjust the shoe by hand), there is still the shortcoming that the energy return lessens as the sole travel decreases. In the improved designs of the instant patent, there is no such shortcoming. The automatic gear change capabilities of FIGS. 37-43 herein guarantee that there is always full sole compression within either one step (for the precise gear change design) and within a few steps for mechanical gear change designs. In this case, there is no problem with toe sink, and there is no need for the runner to adjust the effective gear by hand. Incidentally, there is also then no need then for the anti-toe-sink feature—which simplifies the energy return shoe designs of the instant patent. In short, the energy return shoe designs of the instant author are entirely distinct from the designs of Freschi, and they are far superior in function and practicability. They are also lighter, and less expensive to manufacture.

Rennex in US patent application 2005/0262725 of Dec. 1, 2005, in FIGS. 9 and 12, anticipates the use of a number of types of springs in linked compressible soles such as a parallelogram sole. These include curved springs which flatten, a v shaped (on its side) floating hinge spring, a curved tension spring, and a conical spring which is similar to the mirrored arch springs of the instant patent. Also, Rennex in U.S. Pat. No. 4,936,030 of Jun. 26, 1990, discloses a parallelogram based compressible sole although that is not obvious or easy to see. With reference to FIGS. 2 and 4 of that Rennex patent, the vertical arms, of the bent 16 in the front and bent lever 25 in the rear, in fact serve as the front and back sides of a parallelogram. There is no articulating toe plate so it could not be used to achieve enhanced heel-lift. Perenich in U.S. Pat. No. 9,032,646 of May 19, 2015 discloses a backwards leaning parallelogram with various tension springs between the parallelogram hinges. Although Perenich mentions that the parallelogram might compress forward as well, he teaches nothing in terms of why that might be useful for heel-pop. In fact, the two just-mentioned patents of Rennex completely obviate the claims of Perenich. Furthermore, the springs mentioned by Perenich are entirely impracticable in that these are far too weak, and they add unacceptably to the uncompressed sole thickness. He mentions that the parallelogram could also be forward leaning, but he teaches absolutely nothing as to why it might be forward leaning. That is, he mentions nothing about the heel-pop idea for heel lift, and he mentions nothing about the need for an anti-toe-sink mechanism or of a gear changer to overcome the problem of toe sink. Finally, his groundplate is rigid from under the foot to under the toe which makes the heel-pop feature impossible to work. That is, the entirety of the toe region and the foot region must expand together in his design—which make heel-pop impossible. Also, there is no articulating toe plate. Nor is there any mention of enhanced heel-lift or of the need for an anti-sink mechanism. For all these reasons, his patent application does not anticipate the instant heel-pop invention, and there is not even anything novel in his disclosure. Sugawara in U.S. Pat. No. 6,718,655 of Apr. 13, 2004 discloses a "v-hinge" whereby the rear part of the shoe is spring-loaded to bend up (in his FIGS. 21A and 21B), and he discloses in his FIG. 25a and FIG. 25B two v-hinges, whereby both the toe and the heel bend up. This is an admirable effort to get enhanced heel-lift, but it has severe practical problems. First, it only works when the sole fully flattens—otherwise the shoe will be rocking about the joint (or joints) to make the toe go down during toe-off. This is related to the need for and anti-toe-sink mechanism in the instant invention. Another drawback is that the tip ends of his springs rub against the top surface, and also the amount of spring that is bending is very short, which severely limits how strong the spring can be in comparison with the large array of optimized springs in the instant invention.

Regarding the optimal springs of the instant invention, tube springs have been disclosed in shoes since Luthi, U.S. Pat. No. 5,822,886 of Oct. 20, 1998. Other tube disclosures include Keating, US application 2011/0289799 of Dec. 1, 2011 and Lucas, US application 2011/0138652 of Jun. 16, 2011. Oval springs have been disclosed in shoes since Crowley, U.S. Pat. No. 4,881,329 of November 1989. Other tube disclosures include Lindh, U.S. Pat. No. 4,910,884 of March 1990, Simon, U.S. Pat. No. 5,102,107 of Apr. 7, 1992, Hann, U.S. Pat. No. 7,788,824 of Sep. 7, 2010, and Nishiwaki—both U.S. Pat. No. 7,779,558 of Aug. 24, 2010 and US Application 2011/0138651 of Jun. 16, 2011. Conical springs have been disclosed in shoes since Cobley, U.S. Pat. No. 3,489,402 of January 1970 and McMahon, U.S. Pat. No. 4,342,158 of Aug. 3, 1982. Cobley discloses conical springs with internal rubber and he claims that it is possible to get a flat spring rate for $h/t=sqrt(2)$ without rubber and for $h/t>sqrt(2)$ with rubber, where h is the spring height and t is the spring arm thickness. Thus, the claim of a flat spring rate is old in the art. McMahon gives a very erudite and commendable explanation of the possibilities of conical springs in shoes. He also discloses a spring rate which bends over, but for h/t of 1-3. He was the first inventor to use an internal elastomer spring to prevent the spring rate from going to zero, but his goal was to have a continuously linear force curve, not a constant force curve. McMahon was a great scientist and the father of the energy return quest; and, he introduced the instant author to the concept of energy return shoes. His conical springs anticipate the mirrored arch springs of the instant invention and similar springs in a number of recent shoe patents. However, he does not teach how these conical springs can be modified to achieve the optimal force curves of the instant invention.

Patent application US 2011/0138652 of Jun. 16, 2011 by Lucas for Addidas (the famous spring blade shoe) discloses as many blade springs as can be fit in the shoe sole. This sole compresses a minimal amount, ~¼ inches, which permits many bending blade springs to fit in the footprint. However, the instant invention takes advantage of the fact that it is far better to utilize a minimal number of springs with a thicker sole compression, 1-3 inches in the instant invention, for the following reasons. These few springs (typically two in the instant invention) are more lightweight and easier to manufacture. With regard to the spring blade shoe, the distribution of springs along the entire length of the sole results in less energy return because the rearward springs return their energy even sooner, and, hence, more of that energy is wasted because the coupling between the acceleration of the user's center of mass with said spring action is even worse than if two springs were used (one in the mid section and the other in the heel)—as is most commonly done in conventional shoe designs. These remarks pertain to the use in the instant invention of optimal springs in conventional shoes.

Krstic, U.S. Pat. No. 7,089,690 of Aug. 15, 2006 discloses an interesting and notable double-sloped conical spring in which the slope changes partway up the cone. In effect, the first cone section coming up from the center plane acts as a spacer so that the force curve bend-over found in Belleville springs occurs early during compression. The only way this snap-through effect can work (with the greater height needed in a shoe sole, i.e., greater than for the relatively small height for Belleville metal springs) is to use a very compliant material such as TPUs (thermoplastic polyurethanes). This is because the perimeter sections of the cone (at the center plane) must circumferentially expand more and more (~50%) as the relative spring height increases. Unfortunately, this TPU material is an order of magnitude weaker than fiberglass for mirrored arch springs (refer to the discussion of Tables 1-3 of the instant invention). Also, the use of the de facto spacer of the cone section (corresponding to the first cone section with the first slope) compromises the compression ratio of his spring. Finally, the de facto tension element (around the perimeter) is due to the circular configuration—in which case the advantages of the 2D (cylindrical configuration) mirrored springs of the instant invention are not realized. This 2D advantage is that it is possible to precisely choose and vary the shoe total spring stiffness simply by precisely slicing these 2D springs. Furthermore, these 2D springs are much stronger for their weight and for the space used than for the circular configuration.

The instant invention uses the terminology of a 2D spring and of a mirrored arch spring, as shown in FIG. 10, to describe the 2D equivalent of conical springs, which is in a cylindrical configuration—as distinguished from the circular configuration of conical springs. Mirrored arch springs have been disclosed since Eliot, U.S. Pat. No. 104,718 of Jun. 28, 1870 for an auto suspension spring. These have merged or pinched pivots at the center. Whatley, U.S. Pat. No. 5,279,051 of Jan. 18, 1994 shows a monolithic mirrored arch spring in his FIG. 4E. This is the first instance found in a shoe. Perenich, U.S. Pat. No. 7,290,354 of Nov. 6, 2007 was filed on Apr. 19, 2004 with the earliest cross-reference being Nov. 21, 2002. He shows opposing leaf springs in his FIG. 16 made of carbon fiber. He also shows the equivalent in his U.S. Pat. No. 7,950,166 of May 31, 2011. The instant invention uses the descriptive terminology of a tensioned mirrored arch spring; this is first shown in monolithic form in FIG. 11 of Cohen, U.S. Pat. No. 4,611,412, Sep. 16, 1986. It is first shown with a separate tension element in Lekhtman U.S. Pat. No. 4,492,374 of Jan. 8, 1985, although this is shown as a huge foot-length spring under the foot. These were way too heavy and thick to be of any practical use. Vorderer, U.S. Pat. No. 4,843,737 of Jul. 4, 1989 puts a small tensioned mirrored arch spring in the heel using helical springs; he also discloses a planar elastomeric band for the tension spring in his FIG. 8. This invention of Vorderer is very important because it obviates the overly general claims of Greene below. Lucas, U.S. Pat. No. 7,013,582 of Mar. 21, 2006 (filed Jul. 15, 2003) and then again in U.S. Pat. No. 7,401,419 of Jul. 22, 2008, shows monolithic tensioned mirrored arch springs in his FIG. 6. Notably he reports a measured internal energy hysteresis value which seems to be about 20% for TPU material. The compression ratio for his spring using this material is poor.

Greene, U.S. Pat. No. 8,789,293 of Jul. 29, 2014 discloses a "differential-stiffness impact-attenuation member" with a planar tension spring element, but she makes an improperly general claim of only an "impact-attenuation member" "with a planar tension spring element. I will call her spring a band tensioned flared mirrored arch spring in the terminology of the instant invention. It looks like a wedge in the top view because the walls are spreading out (flared out). Her spring is the same as the tensioned band mirrored arch spring disclosed by Vorderer, U.S. Pat. No. 4,843,737, except for the flare out. Thus, her spring is a variation of the tensioned band mirrored arch spring 292 shown in FIG. 20 of the instant invention. She discloses a change in stiffness along her length of spring which corresponds to the width of the 2D springs in the instant invention (the flare out). She discloses only mirrored arch springs for which the side length of the arch is changing along her length dimension (see her FIG. 1A and FIG. 1B). This corresponds to the just mentioned stiffness change along the length. In fact, there are other ways to change the stiffness, and she should not be allowed to claim these without teaching them. To restate— her spring width and stiffness change along her spring length. This is the only novel teaching in her patent, but these two related disclosures (width and stiffness change) are not used to narrow her base claims—which, hence, are improperly general and invalid in view of Vorderer above. In addition, Greene mentions that the tension element might be slightly curved or undulating, but there are numerous examples in the prior art for such tension elements. Thus, she can properly claim her change in width (stiffness), but only for a monolithic (unitary spring). In fact, in an earlier patent in this same thread of cross-referenced patents, namely Greene, U.S. Pat. No. 8,539,696 Sep. 24, 2013, she does narrow her base claim with the differential-stiffness feature. This is more valid than for U.S. Pat. No. 8,789,293 just above, but it should only be claimed for a unitary differential-stiffness spring—in which case, one can still use separate springs to achieve the equivalent result and to overcome even this proper claim. A less obvious, but still valid reason that Greene's claim is invalid has to do with the following. Herr, U.S. Pat. No. 6,029,374 of Feb. 29, 2000, discloses, in the discussions of his FIG. 25 and FIG. 29, the use of one or more springs with different stiffness at various locations about the shoe (likewise for the below "varying stiffness" prior art). Herr discloses leaf springs which are an example of 2D springs in that they have the identical cross sectional shape across their width. One can make the case that a 2D spring is equivalent to a number of sliced 2D springs positioned side by side. In that case, Greene's disclosure of stiffness variation along the her length (or my width for 2D springs) of her spring is obvious and not patentable because a spring can be an assembly of a number of side-by-side strips—each of which has a constant stiffness across its width (her length) and each of which may have its own particular stiffness. Thus, this is the argument that Greene cannot claim even the stiffness variation when her spring is unitary (monolithic). Moreover, Greene also discloses that her claims cover separated springs. That is definitely incorrect in view of Herr (above.) In fact, it is more convenient to manufacture the 2D mirrored arch springs of the instant invention because they have constant dimensions of the side walls across the across the (instant invention) width of the spring. To vary the stiffness across the width of the shoe, it is preferable to simply use a separate spring strips with different stiffness distributed across the shoe width. This stiffness can varied either by virtue of geometry, material, or sidewall thickness. Finally, Herr U.S. Pat. No. 6,029,374 of Feb. 29, 2000, discloses, in the discussions of his FIG. 25 and FIG. 29, the use of one or more such springs with different stiffness at various locations about the shoe. Thus, Greene's disclosure of stiffness variation along the length of her conical spring is obvious and not patentable because a spring can be a composite of a number of side-by-side strips—each of which has a constant stiffness across its width (her length). And in addition, not only does Greene not mention in her claims her novel matter, the differential stiffness change, but she also broadens her claim for the tension spring as any concavity spring with a tension element—which is clearly invalidated by Vorderer. In that case, Greene should only be able to claim her particular novel versions of the tensioned mirrored arch spring.

Smaldone, U.S. Pat. No. 8,720,085 of May 13, 2014 is a continuation of Smaldone, U.S. Pat. No. 7,314,125 of Jan. 1, 2008. It was filed on Sep. 27, 2004. She discloses just a few particular mirrored tensioned designs with shafted pivots. She claims a general tensioned mirrored arch spring, which is invalid in view of Vorderer. The only novel matter here is that she discloses a monolithic pivot with a pocket receptacle to hold a planar tension element. This has the disadvantage that the edges of the pocket are levering together like a nutcracker to impinge the planar tension element, which is likely to damage it so it will break. Also, since the TPU-like planar material they are using is very compliant, it is likely that the ends will pull through. And, she discloses a band tension element that wraps around the mirrored arch spring section to act as a tension element. This uses up vertical space unnecessarily. However, none of this novel matter is claimed, so this patent does not prohibit the tensioned mirrored arch springs of the instant invention because the base claims are invalid. Her patent certainly does not prevent the patenting of (1) other means to hold the tension element, (2) other tension elements, or (3) other pivots connecting the various arch and tension elements of the novel tensioned mirrored arch springs of the instant invention.

Aveni, U.S. Pat. No. 8,225,531 of Jul. 24, 2012 discloses a number of springs of distinct design, some with shear resistance in a particular direction. His base claim is for the use of one or more such springs at various locations about the shoe with various stiffness values. His entire base claim is invalidated in view of the "varying stiffness" prior art below which also discloses shear resistant springs of various stiffness values in various locations of the sole. His only novel features are the particular types of shear resistant spring, and he would have to write a separate patent for each of those with appropriately narrow claims. He also discloses particular shear resistant springs which are shear resistant in only one direction. In fact, there are other shear resistant springs in the shoe art; all of the 2D springs disclosed in the instant invention are shear resistant across their widths. Therefore, any general claim that Aveni might make for shear resistant springs is invalid. He can only claim those of his specific designs that happen to be novel. All of the enhanced optimal springs of the instant invention are superior to and patently distinct from any of the springs disclosed by Aveni, so his patent does not invalidate the instant invention. The complete prior art for multiple springs in various locations with different stiffness values are the following: Rennex, U.S. Pat. No. 4,936,030 of Jun. 26, 1990 filed Nov. 8, 1988 disclosed multiple spring locations on sides and in front and back of sole with varying stiffness (he mentions their use to deal with pronation); Miller, U.S. Pat. No. 5,628,128 of May 13, 1997 filed on Jun. 7, 1995 (his claim 6); Miller, U.S. Pat. No. 5,625,963 of May 6, 1997 filed on Nov. 1, 1994 (his claim 3); Healy, U.S. Pat. No. 6,568,102 of May 27, 2003 filed on Feb. 24, 2000 (his claim 7); Crary, U.S. Pat. No. 6,457,261 of Oct. 1, 2002 filed on Jan. 22, 2001; Herr, U.S. Pat. No. 6,029,374 of Feb. 29, 2000, and Houser, US Application 20020038522 filed on Apr. 4, 2002 (which also has these springs at varying orientations). This prior art will be referred to as the "varying stiffness" prior art. Of these, the ones that are also shear resistant are those of Miller. These all pre-date Aveni's patent. Finally, Aveni, U.S. Pat. No. 8,261,469 of Sep. 11, 2012, filed on Jul. 21, 2006, claims multiple springs that are oriented at different angles. This claim is obvious and never should have been allowed. In fact, Houser US, Application 20020038522 filed on Apr. 4, 2002 (which pre-dates Aveni's file date of Jul. 21, 2006) discloses springs at varying orientations and at various stiffness values. Moreover and more importantly, the positioning of springs at various locations and orientations is necessarily and totally obvious. By allowing these obvious claims, the examiner now prevents any other inventor from incorporating valuable, patently distinct springs in the future in their patents if these springs are oriented at various angles. Even worse, these claims retroactively clash with in the earlier patent of Houser that has been awarded, which discloses positioning of springs at various locations and orientations. And, any other earlier springs which may have been oriented at various angles would be retroactively disallowed. That is wrong and will not hold up in court. There are numerous cross-referenced patents (27) and patent applications leading up to the patents discussed above by Greene, Smaldone, and Aveni. These have virtually the same matter and figures so the same conclusions about the validity of those related patents apply. They are listed in the information disclosure form of the application of the instant invention.

Klassen, U.S. Pat. No. 8,707,582 of Apr. 29, 2014 discloses a several "toggle linkage" springs. This was filed on May 30, 2008 based on provisional patents going back to Sep. 6, 2007. Refer to FIG. 19 of the instant invention to see some of these configurations. The idea in general is that the action of a pair (or four links if the paired linkage is mirrored to have four sides) of hinged rigid links oppose the motion of the resilient elements to which they are connected; and, their configuration may be compressive or in tension. As the toggle linkage spring flattens, the opposing forces of the link elements and the resilient elements become more aligned until the vertical spring force goes to zero. This basic design is old, and perhaps ancient, in the art. Klassen only teaches the use of tension resilient springs, but the instant invention also teaches compressive resilient elements, which is completely novel. Klassen's main embodiment (incidentally, the only one claimed) is for a circular configuration. The tension element is a resilient ring around the exterior of a rigid opposing disc assembly although that tension element is not even needed. That is, with reference to Belleville springs (also old in the art), in a circular configuration the circumferential expansion of the spring provides resistance to flattening of the conical discs. This circumferential expansion is also why Klassen requires radial slots, which however make the manufacture of his claimed disc embodiment difficult and more expensive. In his same base claim, there is a damper to prevent the spring from bottoming out and to dissipate energy. With reference to Klassen's FIGS. 9 and 10, his arguments for the benefits his dampers are misguided and misleading for the following reasons. An analysis—of the time dependent force distribution (from heel to toe) as related to the knee and ankle action of running—as applied to the energy return of the instant invention—is very involved and complicated. His arguments do not reflect such a thorough analysis, so it is not surprising that his conclusions are mistaken. Impact energy dissipation (damping) is a disadvantage, not an advantage. The delayed energy return of his heel spring is totally wasted as it expands in the air. Also, his analysis of the coupling of the heel spring to propel the runner back into the air is completely mistaken. Finally, there is no need for the heel (or the full sole) force to go to zero for the middle portion of the stance phase. Since the heel-pop shoe provides a geometric constraint that the front and rear parts of the sole must compress together while the footplate remains level, such a delay is even more unnecessary. Rather, the force curve should remain constant, or it should even be slightly increasing throughout compression. The heel-pop mechanism of the instant invention actually does couple optimally with the knee and ankle action for energy return, and it is explained in detail in the discussion of FIGS. 1-9 of the instant invention. Also, Klassen's material mentioned for his resilient ring is delrin which has detrimental hysteresis energy loss. Klassen also discloses toggle linkage spring designs in cylindrical configuration with necked down pivots and links (also not claimed). One of these (in Klassen's FIGS. 50-52) uses two loops 290 as compressive elements of a toggle linkage spring. These are the rings which compress as the spring flattens to store impact energy. This is a valid and interesting design, but the spring strength per unit area of the shoe sole is very limited because only a small volume (of the rings) is being used to store the impact energy. Thus, the height of these springs would have to be so high that the compression ratio would not be good. Also, again, the material delrin mentioned by Klassen is not optimally strong and it has energy hysteresis loss. Finally, compression of a ring is not an optimal design for energy storage. Another design in his FIGS. 37-40 uses a tensioned band for the resilient element. This is the best design in his patent, but he does not even claim it. Furthermore, just because a force curve is constant does not mean that foot impact energy is still being absorbed for that final portion of sole compression, which is vitally important for the shoe sole application. Note that the auxiliary springs of the instant invention continue to store sole impact energy even while the linkage-spread springs are no longer storing this energy. And, Klassen does not explain or even mention the reduction of the maximum impact force point with the use optimal springs, which reduction is a main benefit of the instant invention. Also, Klassen discloses the same monolithic pivot, with a pocket receptacle to hold a planar tension element, that Smaldone discloses in U.S. Pat. No. 8,720,085 of May 13, 2014. (See the remarks above about Smaldone for a critique of this pocket receptacle design.) Finally, Klassen's springs are not nearly strong as the fiberglass or Kevlar optimal springs of the instant invention. And, their construction is far more complicated and difficult, and they force the uncompressed sole much higher off the ground. Another design is that of Lekhtman US 2010/0223810 of Sep. 9, 2010 who discloses floating hinge springs monolithically connect to a sole plate. These are similar to the curly v-springs of the instant invention, but floating hinge springs are old in the art so this patent does not restrict the use the curly v-springs of the instant invention.

With regard to the capability of manufacturing or adjusting the stiffness of a shoe, the following prior art was found. Chu, US application 2006/0075657 of Apr. 13, 2006 has an adjustable heel spring. DiBenedetto, U.S. Pat. No. 8,234,798 of Aug. 7, 2012 has a heel spring which is compressed by an electric powered worm gear based on impact sensor information fed to an on-shoe microprocessor. The idea of compressing a spring to increase its stiffness for greater shoe impact is completely flawed because the compression distance is reduced and the deleterious result is to increase the stress on the runner's foot and leg. In contrast, the optimal force curve method of the instant invention requires that the compression distance always be maximized, and the automatic "gear change" of the instant invention is automatic and instantaneous. Lyden, US application 2008/0060220 of Mar. 13, 2008 goes to enormous lengths to show he has a general method to customize a shoe for any individual shoe user, but his application is devoid of enabling, teachable detail, and it does not define what optimal is as it is defined in the instant invention. Nurse, US application 2011/0047816 of Mar. 3, 2011 discloses a general method to adjust "stiffening members" and "tunable members" without teaching anything about what these adjustable members might be, how they might be adjusted, or on what basis they might be adjusted. As was the case for Lyden above, this is an attempt to claim an overly general and obvious invention (capability) without doing the hard work needed to actually design real inventions. As such, it is an attempt to prevent diligent inventors from being awarded patents that actually do work and that actually are based on the teaching of the required knowledge and design base needed for real inventions. Wilkinson, US application 2006/0174515 of Aug. 10, 2006 has a lever with a movable fulcrum to change spring stiffness. This is a commendable goal, but not a practical design. With regard to the use of insertable "cartridge-type" shoe springs, Lindqvist, U.S. Pat. No. 8,056,262 of Nov. 15, 2011 discloses a leaf spring insert. Weiss, U.S. Pat. No. 7,802,378 of Sep. 28, 2010 inserts a compressible core, Meschan, U.S. Pat. No. 7,726,042 of Jun. 1, 2010 inserts a screw-in-able helical spring, and Leedy, U.S. Pat. No. 8,006,408 of Aug. 30, 2011 inserts circular plug springs. Smaldone, U.S. Pat. No. 7,082,698 of Aug. 1, 2006 discloses insertable tubular plug-in springs. None of these have the advantages of optimal springs of the instant invention, nor do they instantaneously and automatically "change gears"—which refers to changing the shoe spring stiffness values. With regard to sensor-enabled automatic gear adjustment, Riley, U.S. Pat. No. 7,771,320 of Aug. 10, 2010 discloses shoe sensors for workout optimization. Berner, US application US 2010/0037489 of Feb. 18, 2010 discloses how sensors can be inserted or incorporated in shoes. Both of these patents are assigned to Nike. Regarding the incorporation or insertion of sensors in shoes per se, the just-above comments for Lyden and Nurse apply here as well. These are just attempts to block real inventions with actual teaching matter from being patented. The use of shoes sensors is obvious and old in the art. Regarding the matter of the use of shoe sensors for workout optimization, that is outside of the purview of the instant invention.

The springs of the above prior art are not nearly strong as the fiberglass and Kevlar optimal springs of the instant invention, and this prior art teaches nothing about why fiberglass and Kevlar (and Spectra Shield) are by far the best materials for shoe applications, in terms of strength. Rather, the above prior art teaching is restricted to discussion of injection moldable materials such as the thermoplastic elastomer PEBAXX 5533. That is, they ignore the fact that a fiberglass (or Kevlar, or Spectra Shield) product can also be mass produced. The discussions of Tables 1-4 of the instant invention substantiate the use of fiberglass (or better now—Kevlar, or Spectra Shield) as the preferred materials for the springs of the instant invention. However, other material with critical parameters for flexibility and bending strength which are similar to those of fiberglass can also be used. That is, a critical parameter for flexibility for said resilient elements is their elongation limit. Thus, other appropriate materials can be included among the best materials for the springs of the instant invention. These include Kevlar, spectra shield, carbon nanotubes composites with a high value of elongation limit, and composites derived from spider silk. Actually, the most recent non-linear finite element analysis for Kevlar and spectra shield gave a ring spring strength for Kevlar that is 6.2 stronger for Kevlar than for fiberglass, and 1.45 times stronger for spectra shield than for fiberglass. Thus, Kevlar is the new preferred material for the optimal springs of the instant invention. Another issue is that the optimal springs herein constitute a class of springs which are generically referred to as arch springs. Each arm of these springs is initially curved and then is flattened until straight, during compression. There are a number of permutations in terms of how these curved arms are combined: including one-sided, two-sided (the arch), and mirrored. However, all these permutations have the same force curve. The arch springs focused on herein are in a cylindrical geometry which provides for much improved lateral stability across the width of the shoe and which distributes the strain energy of the spring more uniformly over the entire shoe bottom. However, the modifications of the instant invention needed to achieve an optimal force curve can be easily applied to a circular geometry in the manner obvious to one of ordinary skill in the art. The other point of distinction for the arch springs herein is that the arms of the arch springs can be varied in terms of material, shape, taper, means of connection, and internal geometry—so as to achieve the optimal force curve. In short, there is nothing in the prior art like the enhanced optimal arch springs of the instant invention.

Also, improved automatic gear change designs are shown in order to improve the design of the aforesaid enhanced heel-lift shoe designs, herein. These eliminate the need for the anti-toe-sink features of the earlier shoe designs of FIGS. 1-9. The electronic auto gear changer herein is significantly cheaper, and one approach for this design provides precise gear change over the range of gearing—where the gear change is accomplished within one foot step. Of course, the term gear change refers to changing the effective spring strength of the shoe so that there is always full sole compression—just barely without bottoming out. These gear change designs can also be used in conventional shoes without enhanced heel-lift. Since electric power is needed for the electronic auto gear changer, two novel electric shoe chargers are disclosed—one for the enhanced heel-lift shoes with large sole compression travel and another clip-on version for conventional shoes with minimal sole travel. Each of these embodiments has a simple version and an enhanced version, wherein the enhanced version utilizes a gear pulley to increase the turns the generator shaft is spun—by an order of magnitude. The key to making such a gear pulley to work is to manage the rewind of the pulley lines so that there is no slack. A novel method is introduced to accomplish this key capability. These enhanced electric shoe chargers generate far more electric power that those of the prior art, at a reduced price. Thus, the improved designs of the instant patent ensure a futuristic shoe with real energy return via enhanced heel-lift and with minimal foot impact via its constant force curve springs. With the auto gear changer, these optimal features are continuously provided no matter how fast the wearer is walking or running.

There is also prior art for the foot impact chargers of the instant patent. Stanton et al. in U.S. Pat. No. 8,970,054 of Mar. 3, 2015 discloses a foot impact electric generator with a mechanism which is confined within an insole insert—which is a very thin horizontal space. It uses a very small depression of a this insole during foot impact to drive a very complicated mechanism to turn a generator. It is not at all obvious how this mechanism works based on the figures and explanation in this patent. However, based on the reports in the media it is clear that the mechanism is confined to a very small horizontal space, which makes it unnecessarily difficult and expensive to make. This constraint also severely limits how much electrical energy can be stored. Although a vague, unsubstantiated mention was made that various components could be positioned in different locations and orientations, there was no teaching whatsoever as to how and why this should be done. In contrast, the instant patent shows and clearly explains where every component is so as to optimize the simplicity and practicality of the impact generator designs herein. Yeh, U.S. Pat. No. 7,409,784 of Aug. 12, 2008 discloses a foot impact electric generator with a mechanism which is confined to the shoe heel. A vertically oriented rack turns two rotary gears to spin an electric generator. This design is very bulky in the heel sole, and it compromises the compliance of the shoe heel sole. Le, U.S. Pat. No. 6,255,799 of Jul. 3, 2001 discloses a foot impact electric generator with a mechanism which is confined to the shoe heel. A lever tab turns multiple gears to spin the generator. Again, this design is very bulky in the heel sole, and it compromises the compliance of the shoe heel sole. Chen, U.S. Pat. No. 5,495,682 of Mar. 5, 1996 also discloses a bulky mechanism in the heel sole to turn multiple gears to spin a generator.

The instant invention discloses a more simplified and yet more powerful foot impact electric generator. The heel-lift enhanced shoe designs of the instant invention feature much greater sole travel (1-3") than what is typically found in conventional shows (~¼"). In this case there is no need to have a lever extending below the shoe bottom—so the motion of the footplate at the top of the shoe sole (with respect to the groundplate) simply spins a pulley to spin the generator shaft. The pulley and generator share the same shaft, and the pulley diameter can be large since it is located high above the ground outside the heel. Thus, the large travel of the sole and the mechanical advantage due to large ratio of the pulley diameter to the shaft diameter both combine to ensure a much higher spin velocity of the generator shaft (and much more electrical power captured) than what is the case for the prior art. The second impact generator of the instant invention is intended for to be clipped on to conventional shoes. It now requires a lever protruding below the shoe bottom, but there is ample room to pull the pulley cable an inch, which is far more than the sole (lever) travel of the prior art (~0.2"). Thus, the electrical energy generated is still five to ten times greater than for the prior art impact generators. The other advantage is that only one pulley is used. Also, pulleys are much cheaper and quieter than gears. Finally, the shoe designs of the instant patent feature large sole travel. Any bulky components in the shoe sole, as mentioned above for the prior art shoe impact chargers, increase the sole height unnecessarily, which is undesirable.

The design of FIGS. 37 and 38 details a precise electro auto gear change capability for shoes. The criterion for optimal spring strength is that the sole fully compress without bottoming out. Thus, as foot impact changes, the effective spring strength must change (change gears). This design automatically changes gears in very precise increments continuously over the full range, not just for a few gears as is the case for cars, e.g. The use of electronics simplifies the design, but a purely mechanical design is shown in FIGS. 39-42. Both the mechanical and electronic approaches can be implemented for both the precise approach and for the not-precise approach (which changes gears only for a few gears). These gear change designs can be used both for the high performance, energy return designs featuring enhanced heel-lift and for the conventional shoe designs. FIG. 44 shows an impact electric generator for shoes, for the case where there is substantial sole travel—of an inch or two, or more. In this case, all elements can be above the bottom of the shoe sole. FIG. 45 shows an impact electric generator for
conventional shoes, in which case there is minimal sole travel—of the order of a quarter inch. In this case, a lever must extend slightly below the bottom of the shoe sole. A miniaturized, yet conventional electric generator is used. This provides the most power currently available for shoe impact electrical power generation with a minimal weight penalty. These designs have wider utility than just the case of shoe impact. Not only do these design provide ample electric power for the precise electro auto gear change mentioned above, but they can be used as a mobile power source for any devices with limited power needs such as laptops, mobile phones, on small batteries. The pulley actuator of FIG. 46 is an improvement over the prior art actuators, but the automatic cross synchronized
pulley actuated gear changer of FIG. 48 represents the most practical gear changer of the invention.

DESCRIPTION OF THE DRAWINGS

FIG. 1 depicts a schematic side view at heel-strike of the linkage-spread curved-spring heel-pop shoe which is the first version of the first embodiment of the invention with enhanced heel-lift for substantial energy return.

FIG. 2 depicts a schematic side view at mid-stance compression of the linkage-spread curved-spring heel-pop shoe.

FIG. 3 depicts a schematic side view at toe-off of the linkage-spread curved-spring heel-pop shoe.

FIG. 4 depicts a schematic side view at heel-strike of the curved-spring heel-pop energy return shoe which is the second version of the first embodiment of the invention with enhanced heel-lift for substantial energy return.

FIG. 5 depicts a schematic side view at mid-stance compression of the curved-spring heel-pop energy return shoe.

FIG. 6 depicts a schematic side view at toe-off of the curved-spring heel-pop energy return shoe.

FIG. 7 depicts a schematic side view at heel-strike of the parallelogram heel-pop shoe which is the third version of the first embodiment of the invention with enhanced heel-lift for substantial energy return.

FIG. 8 depicts a schematic side view at mid-stance compression of the parallelogram heel-pop shoe.

FIG. 9 depicts a schematic side view at toe-off of the parallelogram heel-pop shoe.

FIG. 10 shows schematic side views of the mirrored arch spring and the curly v-spring.

FIG. 11 shows schematic side views of a pre-loaded curved spring and a mirrored arch spring.

FIG. 12 shows a study of optimized force curves for springs.

FIG. 13 shows schematic side views of an internal linkage mirrored arch spring.

FIG. 14 shows schematic side views of linkage-spread curved springs.

FIG. 15 shows a schematic cut-out side view of a monolithic mirrored spreader linkage.

FIG. 16 shows schematic side views of a kite-end curved spring at various levels of compression.

FIG. 17 shows schematic side views of configurations for arrowhead, kite-end and double-link spread curved springs.

FIG. 18 shows schematic side views of a monolithic tensioned mirrored arch spring.

FIG. 19 shows schematic side views of torque-lift configurations for optimal springs.

FIG. 20 shows schematic side views of a tensioned band mirrored arch spring.

FIG. 22 shows schematic side views of monolithic tensioned linkage configurations.

FIG. 21 shows schematic side views of two tensioned linkage configurations.

FIG. 23 is a schematic side view of a monolithic nested tensioned linkage spring.

FIG. 24 shows schematic side views and a top view of optimal springs in a conventional shoe.

FIG. 25 shows a schematic top view of possible spring locations for a shoe.

FIG. 26 shows schematic views for "gear change" in shoes.

FIG. 27 shows schematic side views of a tensioned linkage rotating arms curved spring.

FIG. 28 depicts a schematic side view at heel-strike of the linkage-spread curved-spring heel-pop shoe with revised linkage.

FIG. 29 depicts a schematic side view at almost full compression of the linkage-spread curved-spring heel-pop shoe with revised linkage.

FIG. 30 depicts a schematic side view at toe-off of the linkage-spread curved-spring heel-pop shoe with revised linkage.

FIG. 31 shows schematic side views of details of the revised one-sided curved-spring linkage.

FIG. 32 shows schematic side views of the revised linkage-spread ring spring.

FIG. 33 shows a schematic side view of the uncompressed merging arms internal linkage ring spring.

FIG. 34 shows a schematic side view of the compressed merging arms internal linkage ring spring.

FIG. 35 shows schematic side views of the enhanced natural hinge and of void options—for the merging arms internal linkage ring spring.

FIG. 36 shows schematic side views of the overlaid merging laminates beam.

FIG. 37 shows schematic views of the precise electro auto gear changer for shoes.

FIG. 38 shows a schematic top view of the precise electro auto gear changer for shoes.

FIG. 39 shows schematic side views of components of the mechanical auto gear changer for shoes.

FIG. 40 shows schematic views of set, reset, and release wand configurations of the mechanical auto gear changer for shoes.

FIG. 41 shows schematic side views of a sample sequence of configurations of the mechanical auto gear changer for shoes.

FIG. 42 shows a schematic top view of various methods to slave the inside gear change assembly to the outside gear change assembly for the mechanical auto gear changer for shoes.

FIG. 43 shows schematic views of the above foot precise electronic automatic gear changer.

FIG. 44 shows schematic views of the impact electric generator for large compression shoes.

FIG. 45 shows schematic views of the clip-on impact electric generator for conventional shoes.

FIG. 46 shows a schematic side view of an improved pulley actuator using a miniature electric motor.

FIG. 47 shows schematic side views of the tied cogged hinge which is a novel way to avoid the use of steel shafts and bearings.

FIG. 48 shoes schematic top views of the cross synchronized pulley actuated gear changer which is automatic, which synchronizes the gear change of the two sides, and which is optimally simple, inexpensive, and manufacturable.

FIG. 49 shows schematic side views and a top view of an assembly for rotating limbs with optimal spring and gear change, and a smart knee brace application.

DETAILED DESCRIPTION OF THE INVENTION

FIGS. 1, 2, and 3 depict schematic side views at heel strike, mid-stance, and toe-off of the linkage-spread curved-spring heel-pop shoe, which provides enhanced heel lift—which in turn provides substantial energy return. This is the first version of the first embodiment of the invention, namely the heel-pop energy return shoe (featuring enhanced heel-lift). The sole compression due to the impact force of running is resisted by a spring system. After the sole is compressed, the runner's toe weight pins down the toe plate of the sole while the combination of the spring system and the sole's parallelogram-like geometry causes the heel section to be lifted upward into the air by an enhanced distance which is of the order of two to three times the compression distance of the heel during the period between heel-strike and mid-stance.

The basic structure of linkage-spread curved spring heel-pop shoe 51 features linkage-spread curved spring heel-pop sole 73 which comprises the following elements (which form a monolithic structure with pivots which are necked-down living hinges). Front footplate link 67 is hingeably connected to mid footplate link 53 which is hingeably connected to rear curved spring 62 which is hingeably connected to groundplate link 57 which is hingeably connected to front curved spring 60 which completes the closed four-sided linkage by pivotally connecting to both front footplate link 67 and mid footplate link 53 via front mono top 4-link pivot 61. These pivotal connections are also made via rear mono top 3-link pivot 59, rear bottom merged pivot 63, and front bottom merged pivot 65. End footplate link 55 is the monolithic continuation of mid footplate link 53. These various living hinges can as well be achieved with conventional cylindrical hinges using shafts and bearings—with design penalties of weight, space, noise, and cost. Shafts and bearings force the sole height to be higher because the load forces are substantial, and, hence, the bearing diameters are larger. The shapes of the necked-down living hinges are indicated in the these figures. These are designed to permit the necessary rotations of the various elements, one with respect to the other. As will be shown later in the discussion of FIG. 25 and Tables 1, 2, 3, and 4, fiberglass composite is stronger by a factor of 10 than carbon composite and by a factor of 16 than PEBAX 5533—for the 2D curved springs which flatten, herein. However, Kevlar is 6.35 times stronger than fiberglass, and Spectra Shield is 1.49 times stronger. Therefore, Kevlar (followed by Spectra Shield and then fiberglass) composite is preferred because the strength advantage corresponds to a light weight advantage. Accordingly, these composites are the preferred material for the spring/link monolithic linkages in FIG. 1—with the exception of double linkages 131 which are used just as links and not as springs—in which case TPU-like materials are preferred because they can be injection molded. By making the length sections thicker of the link parts of the spring/link monolithic linkages, they can function as links. Double linkages 131 can be made of injection moldable materials such as pellethane or PEBAX 5533. Although the later developed shaftless hinge, namely tied cogged hinge 920 of FIG. 47 is now preferred.

Double linkages 131 act to spread both rear curved spring 62 and front curved spring 60 so as to straighten out during sole compression. This combination of linkage and curved spring is referred to herein as an internal linkage one-sided curved spring and is discussed in detail for FIG. 14 below. Suffice it to say here, the linkage spreading action serves to bend over the force curve of this sole spring system, as is further discussed in detail for FIG. 11 and FIG. 12 for optimal springs. These optimal springs can reduce the maximum impact force point by as much as 40%. Top adjust spring 132 controls and modulates the onset of this linkage spreading which can eventually bend the spring system force curve over to approach zero. One or more adjust springs 133 allow said total force curve to remain approximately constant near full sole compression, as the force curve, due to the just mentioned internal linkage one-sided curved springs in the front and back, goes to zero.

Anti-toe-sink mechanism 74 comprises spring plate 52 which is fixably attached to ladder stop 35. Note that while spring plate 52 acts as a virtual continuation of groundplate link 57, they are in fact separate. This permits groundplate link 57 to rotate upward as shown in FIG. 3 during heel-lift, while spring plate 52 remains pinned to the ground by the weight of the force imparted by the toe of the runner during toe-off. Ladder stop 35 has ladder steps 36 on its front side. Front footplate link 67 is hingeably connected to spring plate 52 via toe curved spring 69 and via toe spring merged pivot 71. Toe plate 7 is hingeably connected to mid footplate link 53 via front mono top 4-link pivot 61, and it has toe stop 20 fixably attached to its mid section so that toe stop 20 protrudes downward. Toe plate 7 is biased upward by toe spring 21 which connects it to front footplate link 67.

With reference to FIG. 1 at heel strike, FIG. 2 at mid-stance, and FIG. 3 at toe-off and accordingly, linkage-spread curved spring heel-pop shoe 51 functions as follows. During foot impact, as linkage-spread curved-spring heel-pop sole 73 compresses, rear curved spring 62 and front curved spring 60 bend to gradually flatten against groundplate link 57. Top adjust spring 132 (optional) quickly compresses to gradually spread out double linkages 131, which in turn straighten out rear curved spring 62 and front curved spring 60. At a prescribed compression, mid footplate link 53 begins to load adjust spring 133, in parallel with the loading of rear curved spring 62 and front curved spring 60, thereby maintaining the force curve to be approximately constant for the remainder of compression. This adjustment by adjust spring 133 is needed because the linkage spread loading of rear curved spring 62 and front curved spring 60 by double linkages 131 results in the vertical force between the center of double linkages 131 and mid footplate link 53 to going to zero as the mechanical advantage of the action of double linkages 131 goes to infinity as they straighten out.

Also, during compression until mid-stance, toe spring 21 maintains toe plate 7 to be slightly rotated above front footplate link 67 so that toe stop 20 does not impinge ladder steps 36. And, since toe curved spring 69 has the same shape and pivot as front curved spring 60, front footplate link 67 remains approximately horizontal and aligned with mid footplate link 53. Note that toe curved spring 69 is only just strong enough to maintain this alignment. The intention is to minimize the compression energy stored in toe curved spring 69 so that the maximum compression energy is stored in the other main spring elements which provide energy for enhanced heel-lift.

Note in FIG. 2 at maximum compression (not full in this example) that the various springs will have compressed (or flattened) as far as they can. Also, the entirety of the top link elements, including front footplate link 67, have moved forward. Thus, toe stop 20 has stayed above ladder steps 36. Also the vector for the total resultant force of the runner's foot on the shoe continually moves forward. When the runner pushes her toe down, toe plate 7 rotates down so that top stop 20 impinges the adjacent one of ladder steps 36, and thus toe plate 7 cannot move down. During heel-lift, only the rear part of the sole assembly expands as the spring system pushes apart mid footplate link 53 away from groundplate link 57. Since the runner's weight is transferring forward to top plate 7, the top section of front curved spring 60 remains pinned to spring plate 52 which is pinned to the ground. However, the rear section of front curved spring 60 is free to curl up. The result is that the runner's heel is lifted up to achieve enhanced lift. That is, virtually all of the stored impact energy is thus used for heel-lift. After toe-off, the sole returns to its original expanded configuration, as shown in FIG. 1—by virtue of the expansion of the various elements of the spring system, including toe curved spring 69 which re-positions spring plate 52 to be adjacent to and aligned with groundplate link 57. This enhanced heel-lift is one essential function of all versions of the heel-pop embodiment of the invention.

Note that ladder stop 35 must be located outside of toe plate 7 so that it does not interfere with its compression—likewise for toe curved spring 69, and front curved spring 60. Also, the various spring elements extend across the width of the shoe. As is discussed below for FIG. 25 for conventional shoes, these spring elements are very strong so they do not need to extend all the way across the width of the shoe. In that case a bridging plate is incorporated above and fixably attached to linkage-spread curved-spring heel-pop sole 73 to fixably position the various separate width sections of the spring system elements. Likewise is true for the bottom sides of these spring system elements. Also, since the top side of linkage-spread curved-spring heel-pop sole 73 translates forward with respect to its bottom side, any springs which act directly between the top and bottom sides must allow this forward translation. This is accomplished for adjust spring 133 by positioning it in a slightly backwards rotated orientation before it starts to be compressed. The particular type of spring shown in FIG. 1 is mirrored arch spring 80 of FIG. 10. And, for the case when the impact force of running or walking is always pretty much the same, anti-toe-sink mechanism 74 is not required, but the heel-pop action still takes place. This case is included in the claims of the instant invention. Finally, for any versions of the heel-pop embodiment herein, an alternative trigger other than the toe pushing down can be used to rotate toe stop 20 down to impinge ladder steps 36. This alternative trigger is the onset of heel-lift, and it would work for running robots that do not have toe "muscles", so to speak. A simple spring-loaded lever at the bottom rear end of groundplate link 57 can be connected to the rotating action of toe plate 7 so that toe plate 7 rotates down when the bottom rear end of groundplate link 57 is lifted.

FIGS. 4, 5, and 6 depict schematic side views at heel strike, mid-stance compression, and toe-off of curved-spring heel-pop shoe 50 which is the second version of the first embodiment of invention. Front curved spring 60 and rear curved spring 62 comprise a monolithic fiberglass (or Kevlar or Spectra Shield) spring structure with spring base 70, which connects them and which in turn is strengthened and protected from the ground by the attached groundplate 5. It is also possible to clamp down the bottoms of front curved spring 60 and rear curved spring 62 to groundplate 5, in which case they do not form a monolithic spring structure. All of the above elements extend across the width of the shoe or across smaller widths as shown in FIG. 24 which discusses optimal springs for use in conventional shoes. Even so, all of these optimal springs (arch springs, mirrored arch springs, and curly v-springs to be discussed below in detail) can be sliced and used in two or more locations across the width of the shoe sole.

Front hinge 64 and rear hinge 66 connect these curved springs to footplate 3. At heel strike, these curved springs flatten out as shown in FIG. 5, and footplate 3 moves forward and downward with respect to groundplate 5. Shoe upper 1 is attached to footplate 3 in such a manner that the runner can freely flex her toe. Toe plate 7 is hingeably connected to footplate 3. Toe stop 20 is fixably attached to toe plate 7 in its mid section, and it extends somewhat below toe plate 7. Toe parallelogram 54 comprises the following elements: top toe link 68 and front toe curved spring 69. Front curved spring 60 serves as the rear element of toe parallelogram 54. As such it is the shared link which makes enhanced heel-lift possible. Note that the shape of toe curved spring 69 is the same as the shape of front curved spring 60 to ensure that top toe link 68 remains horizontal during compression—to ensure that toe stop 20 does not engage ladder steps 36 prematurely. Spring plate 52 serves as the bottom element of toe parallelogram 54. Note that even though this bottom element, spring plate 52, is separated from groundplate 5 and hence from the rear toe parallelogram element (front curved spring 60), during compression both spring plate 52 and groundplate 5 are firmly pushed down against the ground so that these two elements behave as if they were one continuous rigid element. This means that toe parallelogram 54 behaves like a parallelogram.

As with the heel-pop shoe of FIGS. 1-3, for the current version of FIGS. 4-6, anti-toe-sink elements are located outside toe plate 7 on both sides, as shown in FIG. 25. Ladder stop 35 is located adjacent to toe plate 7 so that toe plate 7 is free to descend during sole compression. Toe stop 20 is located on and adjacent to toe plate 7 so that toe stop 20 is directly above ladder stop 20. Toe spring 21 weakly biases toe plate 7 to stay above top toe link 19. Spring plate 52 is fixably attached to the bottom of ladder stop 35, and it extends across the bottom of the front sole so as to protect front curved spring 60 from the ground during sole compression. Note that spring plate 52 is not attached to ground plate 5; this is important because it allows spring plate 52 to separate from groundplate 5 during heel-lift. Toe parallelogram 54 and ladder stop 20 are hingeably connected to both footplate 3 and toe plate 7 only by front hinge 64 and by toe spring 21.

Accordingly, $2^{nd}$ anti-toe-sink mechanism 75 comprises toe spring 21, toe plate 7, toe stop 20, toe parallelogram 54, and ladder stop 35. Its purpose is to prevent the runner's toe from sinking down during toe-off for the case when the sole is not fully compressed. If the toe were allowed to sink, it would be like running in sand and highly objectionable. As such, anti-toe-sink mechanism provides a key capability of the invention. It works as follows. During the first half of toe stance (provided the runner is landing heel first), the foot impact is shared by the heel and the ball of the foot (just behind the toe joint). But, the toe is not weighted until toe-off. During compression, toe spring 21 is strong enough to prevent toe stop 20 from rotating down to impinge the closest step on ladder stop 35. Ladder steps 36 of ladder stop 35 are positioned so that only when toe plate 7 rotates down below top toe link 68, does toe stop 20 impinge the closest one of ladder steps 36, thereby preventing toe sink. Note that this scheme works only when footplate 3 moves forward with respect to groundplate 5 during sole compression. Also, $2^{nd}$ anti-toe-sink mechanism 75 allows the runner to run on his toes rather than just on his heels.

FIG. 6 shows how energy return is achieved. First, look at FIG. 5 at full sole compression. Note that front toe curved spring 69 is almost flat on the ground. Just before heel-lift, the user's weight shifts over onto toe plate 7, rotating it downward and overcoming the bias of toe spring 21, so that toe stop 20 impinges the nearest ladder step 36 to prevent toe sink. At the same time, front hinge 64 has been prevented from moving further downward by the action of the compressed spring system. Also, top toe link 68 has been pushed all the way down. And, note that toe plate 7 has been stopped, in this case from being horizontal at the end of its descent, by the bottom ladder step 36 of ladder stop 35. This option allows the runner to push off a slightly higher point and to thereby increase his stride slightly. Of course, it is optional to make the bottom step lower. At this same time of the beginning of toe-off, the runner's heel begins to lift. This allows both front curved spring 60 and rear curved spring 62 to curl up and return to their original uncompressed shape. As this happens, only the runner's heel is impelled into the air; hence, we have enhanced heel-lift and optimal, substantial energy return. Note that all of the foot impact energy has been stored in the two curved springs, and all of the impact energy is returned to lift the heel. Since this heel-lift force acts in parallel with the action of the runner's calf during toe-off, energy return is optimized. Also, this heel-lift distance is substantially greater than the heel deflection distance during heel compression (by a factor of two to three).

It is possible to taper the thickness profile of the sole thickness so that the thickness is somewhat lower at the front. This can be accomplished by increasing the curvature of front curved spring 60 with respect to that of rear curved spring 62 so that the whole of footplate 3 moves forward the same distance and in such a manner that the two springs will not constrain each other from fully flattening during heel compression. However, a thinner front sole thickness results in a smaller amount of heel-lift. Also, the thickness of the curved-spring heel-pop shoe of FIGS. 1-3 can be decreased say to 1.5" or even to 1".

However, the amount of heel-lift (and, hence, the energy return) will be smaller. And, the thickness can be larger for ultimate performance shoes—perhaps to three or four Inches.

As is the case for the version of FIGS. 1-3, this second version of the heel-pop embodiment of the invention, namely curved-spring heel-pop shoe 50 of FIGS. 4-6, has an advantage over the third version yet to come, parallelogram curved-spring shoe 2 of FIGS. 7-9, for the following reasons. The parallelogram of FIGS. 7-9 serves two functions. First, it prevents a seesaw action of the sole as the runner's weight shifts from heel to toe, which seesaw action would reduce energy return. Second, the parallelogram enables the heel-pop (enhanced heel-lift) action needed for energy return. However, it turns out that both the curved-spring feature (the curved springs) of the version of FIGS. 1-3 and the version of FIGS. 4-6 accomplish both of these functions, in which case the second structure, namely a foot parallelogram, is extraneous. That is to say, the front and rear curved springs take the place of the front and rear links of a parallelogram. However, this pair of curved springs allows some seesaw deformation, but this is negligible and more than worth it because of the elimination the extra parallelogram structure. Even so, the disadvantage of the version of FIGS. 4-6 is that front curved spring 60 and rear curved spring 62 provide all the resistance of the spring system, and these are linear springs with linear force curves (unlike the version of FIGS. 1-3).

However, the disadvantage of the designs of FIGS. 1-6 is that it is more difficult to incorporate the automatic gear changer features to be discussed later.

FIGS. 7, 8, and 9 depict schematic side views at heel strike, mid-stance compression, and toe-off of parallelogram heel-pop shoe 2 which is the third version of the first embodiment of the invention, namely the heel-pop energy return shoe. The basic structure features a shoe sole which comprises forward leaning foot parallelogram 4 under the foot and matching front parallelogram 6 under the toe. These parallelograms share a link, and this constrains their top links to compress together. Two designs for these parallelograms can be used and are shown. Copies of monolithic linkage 40 are shown separately at heel strike, full compression, and toe-off. These copies are immediately above the figures of the full shoe, and their elements are labeled separately because there are so many elements close together. The figure for hinged linkage 42 is shown only at heel strike just to demonstrate that all the hinges 34 can be conventional—that is, they can comprise shafts and bearings for which the design and construction are obvious to one of ordinary skill in the art. However, the use of shafts and bearings entails the following shortcomings. The weight is increased, the vertical space needed increases the sole height, the construction is more complicated, and the cost is higher.

The design of monolithic linkage 40 is challenging because the pivots and the links are monolithically joined. The links are necked down near the pivot, and this necked-down section must bend in such a manner that it will not break after many duty cycles. This means that the requirement that link material be strong and rigid is compromised by the requirement that the pivot material must be very flexible. One solution taught in detail for the first time in the instant invention is to use fiberglass (or Kevlar or Spectra Shield) for the monolithic material, and to change the thickness to transform from the rigid link section to the flexible pivot section. Since none of the elements of monolithic linkage 40 are used as springs, it is also feasible to use thermoplastic polyurethanes or like materials which have considerable compliance and which can be injection molded. PEBAX 5533 and Pellethane are examples. The detailed shapes of these link-to-pivot connections are shown in the drawing for monolithic linkage 40. First, let us look at hinged linkage 42 because it is easier to understand. Front parallelogram 6 comprises top toe link 19, front toe link 18, bottom toe link 17, and front link 28 (which is the shared link with foot parallelogram 4). All of these links are hingeably connected by hinges 34. Foot parallelogram 4 comprises rear link 27, top link 29, bottom link 30, and front link 28, which is the shared link with front parallelogram 6, Note that tension band 302 is one type of spring which can be used to resist the compression of front parallelogram 6 (although it puts too much force on the hinges), and it is only shown in this view. The force curve due to tension band 302 goes to zero approaching full compression, so an auxiliary linear spring (such as compression curly v-spring in the view of parallelogram heel-pop shoe 2 of FIG. 7) would have to be used to achieve the constant total force curve discussed for optimal springs in FIG. 12 and in FIG. 13. Next, looking at monolithic linkage 40, rear mono link 9 connects to bottom mono link 12 via bottom rear mono pivot 16 which connects to front mono link 10 via bottom front mono pivot 15, which also connects to front mono link 10, which connects to top mono link 11 via top front mono pivot 14. Top mono link 11 connects to rear mono link 9 via top rear mono pivot 13—to complete the circuit. Front mono link 10 also acts as the rear link of front parallelogram 6; it connects to bottom toe link 17 via toe bottom rear mono pivot 25. Bottom toe link 17 connects to front toe link 18 via toe bottom front mono pivot 24 which also connects via toe top front mono pivot 22 to top toe link 19, which finally connects via toe top rear mono pivot 23 to front mono link 10—to complete the circuit for front parallelogram 6. Note that the bottom of front mono link 10 has a three-way connection. That is the reason that there are two pivots shown. Monolithic linkage 40 is not a perfect linkage like hinged linkage 42, but it is good enough, and it is much easier to mass produce.

With reference to FIGS. 7, 8, and 9, parallelogram heel-pop shoe 2 comprises monolithic linkage 40 which is described above and which is spring loaded; it further comprises $3^{rd}$ anti-toe-sink mechanism 8 which further comprises front parallelogram 6. Footplate 3 may be one and the same with top mono link 11, or it may be the bridge plate across the width of the shoe if foot parallelogram 4 is located only on the sides. Likewise is true for groundplate 5 and bottom mono link 12. One or more of diamond linkage tension springs 38, e.g., can be placed inside of foot parallelogram 4 in such a manner that these springs flatten completely at full sole compression, as shown in FIG. 8. That is, they are tilted backward slightly as shown in FIG. 7 so they can fully compress as in FIG. 8. These are optimal springs as explained in the discussions of FIG. 11, FIG. 12, and FIG. 21 (where they are referred to as tension curved springs 330, which is one example of a diamond linkage tension springs 38). Provided they permit footplate 3 to translate forward with respect to groundplate 5, any of the other optimal springs herein described can also be used, such as internal linkage mirrored arch spring 107 of FIG. 13 (especially in the monolithic version as described in FIG. 15), or such as the monolithic tensioned mirrored arch spring 200 of FIG. 18, tensioned band mirrored arch spring 292 of FIG. 20, or the two examples shown in FIG. 22.

As will be explained later in the discussion of FIG. 12 for optimized force curves and of figures herein for various kinds of optimized springs, these springs reduce the maximum impact force by achieving a force curve that has a constant force curve over the later range of compression. As will be discussed in detail later for FIG. 10, compression curly v-springs 37 meet this forward shifting requirement since they feature a floating hinge. Other springs such as kite end curved spring 144 of FIG. 16 or arrowhead curved spring 145 of FIG. 17 can also be used if they are configured with floating hinges as shown in FIG. 17. Any of these springs can be positioned in a particular location at a particular orientation with compressible positioner 39 as in FIGS. 7-9. These are firm enough to maintain a spring in position, but weak and compliant enough not to absorb much energy when compressed. Before leaving the discussion of the heel-pop shoes it is important to note that for a particular type of use the anti-heel-sink feature is not needed. That is to say when the impact force is always the same, the strength of the spring system can be chosen so that the sole always just barely fully compresses at that particular impact force. Then there is no need for the anti-toe sink feature. An example could be a walking shoe where the impact is constant. Another example could be a jogging shoe where the user jogs at pretty much the same speed all the time. This option is covered by the claims of the instant invention.

Mirrored arch springs 80 of FIG. 10 and the various refined versions in FIGS. 12-17 can also be used, provided the center tops and bottoms are slightly raised and rounded, in which case these springs can rotate forward in like manner to how diamond linkage tension spring 38 of FIGS. 7-9 rotates from being inclined rearward in FIG. 7 to being oriented with the top vertex being located directly above the bottom vertex in FIG. 8 at full compression. However, mirrored arch springs 80 have linear force curves as compared with the optimal force curves discussed later herein, and, hence, the advantage of impact reduction is not realized. The other springs discussed herein meet the requirement of optimal force curve in varying degrees as will be explained more fully later herein.

Regarding other more conventional types of springs, remember that footplate 3 is moving forward substantially with respect to groundplate 5. This means that conventional springs, such a helical or spiral springs, do not work. Actually, these could be used if either the bottom or top of the spring can slide along the adjacent surface, but that would be highly objectionable due to sliding friction. Torsion springs at the hinges would work, but those are far too weak in view of the fact that the sole must compress to a very small thickness, of the order of a quarter of an inch. All manner or curved springs and sinusoidal springs can act in tension between front para hinge 18 and its opposite hinged vertex in foot parallelogram 4, but these solutions are also very weak and, even if they were strong, they would exert a too large compressive force on the link elements of foot parallelogram 4. The use of diamond linkage tension spring 36 or internal linkage mirrored arch spring 107 of FIG. 13 is far more optimal.

Note that foot parallelogram 4 may be preferentially located only at the perimeter sides of the sole. In this case footplate 3 comprises support elements on both sides and outside of the foot, and it comprises at its bottoms a minimally thin plate which extends across the center of the sole. In this way, the springs will act directly against this center plate adjacent to the runner's foot. This minimizes the strength and weight requirements for the side elements of foot parallelogram 4. The same can be done for groundplate 5. These variations of footplate 3 and groundplate 5 are not shown in detail, but are obvious to one of ordinary skill in the art. In this case, the various hinges of foot parallelogram 4 would also be preferentially located only at the sides of the sole. The 3rd anti-toe-sink mechanism 8 functions in almost exactly the same way as was the case in FIGS. 1-3, although its construction is slightly different. This can be seen in FIG. 9 where front parallelogram 6 remains compressed as foot parallelogram 6 opens up during heel-lift.

Note that it is possible to imagine applications in which the impact force of walking or running is fairly constant—e.g. for walking. In that case, a properly tuned shoe sole always fully compresses. The term properly tuned means that the spring system force is chosen or adjusted so that the shoe sole just barely fully compresses. In this case an anti-toe-sink mechanism is not needed. Even so, such heel-pop shoes without the anti-toe-sink mechanism are still novel and patentable since they still provide enhanced heel-lift with a improved constant force spring system. Also, note that it is easy to incorporate a spring under toe plate 7, but the main goal of the heel-pop inventions is to return virtually all of the foot impact energy into enhanced heel-lift. Any toe spring detracts from that goal. The reason for this design goal is that the runner's center of mass has been mostly accelerated upward and forward by the time this toe spring acts, in which case a toe spring contributes only negligibly to energy return.

The second embodiment of the invention is a class of novel springs, referred to herein as optimal springs in that their force curves are optimized.

These can be complex springs or spring systems. The optimal spring class comprises variations on curved springs and arch springs. These variations are designed to optimize the force curve for footwear and for a number of other applications—where it is advantageous to minimize the maximum force (especially when there is an impact force) on the device structural elements and/or on the user of the device such as a runner. The optimization criterion is to maximize the amount of energy absorbed, namely the area under the force curve for a given maximum force point on that curve. If there are no geometric constraints on the size of the spring, then various conventional springs can be used to achieve force-curve optimized springs, or spring systems. However, the force-curve optimized springs in the instant invention achieve the minimum thickness at full compression of the entire spring. They also minimize friction losses by eliminating shafted hinges or sliding friction elements. Finally, they minimize internal energy
hysteresis loss by using fiberglass or any another fiber reinforced composite (such as Kevlar or Spectra Shield) which may flex or streLd i buffidently.

Arch springs comprise elemental curved springs such as front curved spring 60 in FIG. 4; these curved springs are loaded in such a manner that they fully flatten at full spring compression. That is, these springs can flatten to an optimally small percentage of their uncompressed height. The fully compressed thickness value can easily be as small as a few percent, 5% e.g., of the uncompressed thickness. The ratio of uncompressed thickness to fully compressed thickness is referred to herein as the compression ratio. Thus, the compression ratio that corresponds to this 5% has a value of 20. These elemental springs are combined to construct the various types of arch springs and complex arch springs. FIG. 10 shows schematic side views of mirrored arch spring 80. Examples of possible configurations that can be built from the elemental curved spring include upper arch arm 84, mirrored arch spring 80, and curly v-spring 96, all of FIG. 10. All of these springs flatten to minimal fully compressed thicknesses. As such, they offer a big advantage over other conventional springs such as helical springs in
applications such as shoe springs where there is a severe constraint on how thick their uncompressed sole thicknesses can practically be. In addition, they make possible far more versatility in spring systems. In more detail, the goal in a shoe is to minimize the sole thickness. Typically, with conventional springs in shoes, the fully compressed thickness is perhaps half the uncompressed thickness. With arch springs or complex springs based on arch springs, the fully compressed thickness can be ~10% of the uncompressed thickness, e.g. This means that the sole thickness can be almost halved for a given desired spring deflection. Returning to FIG. 10, mirrored arch spring 80 comprises upper arch arm 84 which impinges lower arch arm 86 when compressed by load surfaces 90 from above and below. Arch vertex tethers 88 connect spring tips 92 at the ends of upper arch arm 84 and lower arch arm 86. An alternative vertex for upper arch arm 84 and lower arch arm 86 is joined vertex 94, in which case the two arms neck down and join in such a manner that the mirrored arch spring 80 can fully compress. Note that it is possible to modify and utilize mirrored arch spring 80 for use in the heel-pop shoes herein. Heel-pop shoes require that the top surface of the shoe sole, footplate 3 in FIG. 7 e.g., moves forward with respect to the bottom surface, groundplate 4 also in FIG. 7. Call this the relative motion problem; it precludes the use of most conventional springs such as helical springs. However, mirrored arch spring 80 of FIG. 10 can be modified so that its top and bottom have a circular shape, in which case it can simply roll to accommodate said relative motion, provided the rolling distance is small. Mirrored arch spring 80 should be initially oriented (rolled slightly rearward) so that it is symmetrically loaded at full compression—meaning that the line, between the vertices where upper arch arm 84 is rotatably connected with lower arch arm 86, is horizontal at full sole compression. This is fortunate because such "rolling" mirrored arch springs are particularly easy to insert into a heel-pop soles where conventional springs do not work because of the relative forward motion of the footplate with respect to the groundplate.

Another advantage of arch springs is that it is possible to vary the thickness profile along the length of the arch arms so that the stress energy density over the entire flattened area of that arm is constant. This constitutes energy storage optimization. The third advantage relates to the fact that it is possible to adjust, and thereby optimize, the force curve of the arch arms. Note in FIG. 10 that mirrored arch spring 80 comprises four curved springs 97, each of which flattens to a straight plate at full compression. Herein, each curved spring is referred to simply as a curved spring. Also top curly arm 98 is simply one example of curved spring 97, as indicated in FIG. 10. Note that when several individual curved springs 97 are combined to construct a more elaborate spring, such as the mirrored arch spring of FIG. 10, the resultant force curve has the same shape as that of each curved spring 97. Another combination used herein is curly v-spring 96. Finally, mirrored arch spring 80 can be split down the middle (when viewed from the side) so that only half is used—when space is limited. This is referred to herein as a one-sided mirrored arch spring. It also happens that both the structure and the shape of each curved spring 97 can be varied so as to make the force curve more optimal. More importantly, the geometrical construction of each such elemental spring can be varied to achieve more optimal force curves, with reference to many of the figures that follow.

Let us return to the matter of the force-curve optimized spring and its criterion which is to maximize the amount of energy absorbed (namely the area
under the force curve) for a given maximum impact force point on that curve. Another key advantage of the arch based springs herein is that they can easily be pre-loaded, for example to one-third of their eventual maximum force. FIG. 11 shows schematic side views of how both the elemental curved spring and mirrored arch springs can easily be loaded via pre-load tethers 106. Not pre-loaded curved spring 102 extends from its base, which is fixably attached to the lower one of load surfaces 90, to its upper end which will impinge the upper one of load surfaces 90 as it moves downward and leftward to begin to load not pre-loaded curved spring 102. At the chosen level of pre-load as shown by pre-loaded load surface 103, the upper one of load surfaces 90 is tethered by pre-load tethers 106. This prevents the upper one of load surfaces 90 from moving upward while it allows the top load surface 90 to move downward to further load pre-loaded curved spring 101.

In like manner, not pre-loaded mirrored arch spring 104 comprises four elemental not pre-loaded curved springs 102 configured as shown to form the mirrored arch spring type of the class of arch springs. Its top and bottom surfaces will impinge the upper and lower load surfaces to begin to be compressed. At the chosen level of pre-load as shown by pre-loaded load surface 103, upper and lower load surfaces 90 are tethered by pre-load tethers 106 to maintain preloaded mirrored arch spring 105 in the chosen state of pre-load. Various methods of maintaining the tips of the arch springs in intimate contact one to the other are described elsewhere herein. Next, it will be shown how the pre-load helps to optimize the force curve.

FIG. 12 shows force curves for two kinds of springs—a pre-loaded spring with a soft (regressive) force curve and a pre-loaded linear spring. Note that the area under each force curve is the energy absorbed by the spring. When the spring is pre-loaded, the required energy is stored at a lower value of the maximum force. In the example of the curve in FIG. 12 for the linear spring, there is a 25% lower reaction force with pre-load. In the example of the curve for the nonlinear soft spring, there is a 40% lower reaction force with pre-load as compared with a linear spring without pre-load, again for the same energy stored. It turns out that it is possible to vary the shape, the geometrical structure, and the thickness taper along the spring arm length so as to approach or sometimes even achieve the optimal constant force curve. In the case shown in FIG. 12, the pre-load starts at about one-third of the maximum force value. It then rapidly increases for about one third of the total deflection; it then asymptotically approaches the constant maximum force value. Thus, the first part of the method to achieve a desired optimized force curve with a minimum value for the maximum force on the curve is to pre-load it. The second part is to vary the spring structure and shape so as to achieve a softer, more constant force curve. The third part of the method will be explained later. It raises the need to determine the optimal energy to be stored in the shoe sole, and it points out that Tables 1, 2, and 3 can be used to realize this optimal sole energy. Another key insight is that just because a force curve is constant does not mean that foot impact energy is still being absorbed for that final portion of sole compression. In fact, for the various linkage-spread and arch tensioned or compressed springs of the instant invention, a reduced amount of impact energy is stored, over what would be miscalculated by simply using the area under the constant force curve as a function of compression distance. The various auxiliary springs in the designs of the instant invention make sure that the optimal amount of impact energy is still being absorbed and store for energy return as full spring compression is reached.

With reference to Table 1, for the size regime of shoe soles (with spring heights of one-half to three inches), the mirrored arch springs herein made of fiberglass are 10.5 times stronger than carbon fiber springs and sixteen times stronger than arch springs made of the injection moldable materials such as the thermoplastic elastomer PEBAXX 5533 mentioned in the prior art of the summary of the instant invention. A non-linear finite element analysis was required to come to this scientific conclusion. Notably, this result is not obvious and it has not been even mentioned in the prior art based on an extensive search by the instant inventor. Thus, fiberglass (or now more preferably Kevlar or Spectra Shield) is claimed herein as the material of choice for the arch and curved spring based springs used in both heel-pop shoes and in conventional shoes. Furthermore, the instant inventor did not find any prior art, which discloses the basic spring structure of two facing hemispheres hingeably connected (in either circular or cylindrical geometries), that even mentions fiberglass as the material of choice or which teaches the scientific data necessary to prove that fiberglass is by far the superior material in shoe applications. There might have been cases where a blanket statement is made that "any material could be used for any element," but this teaches nothing specific enough to be useful. As such, it would not hold up in litigation. Rather, this prior art is totally focused on the use of injection moldable plastics such as thermoplastic elastomer PEBAXX 5533. Also, these prior art springs do not compress to the optimally minimum thickness of the arch springs of the instant invention because the sides of the hemispheric sides are so bulky—because the material is so weak for bending applications. However, the instant inventor's most recent non-linear finite analysis included Kevlar 29, Spectra Shield, and stainless steel 302 (full hard, basis B). Please refer to Table 4 which gives the mechanical parameters used in the non-linear finite element study that led to Tables 1-4. It also gives the ratios of the calculated spring strengths of the various materials over the calculated spring strength for fiberglass. This study showed that the spring strength for Kevlar 29 was 6.35 times stronger than fiberglass, and the spring strength of Spectra Shield was 1.49 times stronger than fiberglass. This means that, based on just the spring strength values, Kevlar is by far the preferred material for the optimal springs of the instant invention, and Spectra Shield is 45% stronger than fiberglass. This also means that the spring strength values in the following four paragraphs are multiplied by a factor of 6.2 if Kevlar is used. This gives the shoe designer at lot of leeway in terms of making the spring weight almost negligible and in terms of the ability to use side springs for the gear changer designs. In conclusion, the resilient elements of the hinged ring springs and the curved springs herein should made of spring-strong materials which are most likely to be a fiber composite with a high elongation limit, with a high tensile strength, and with a modulus which is not so high compared with the tensile strength so that the toughness (spring energy stored) is compromised, wherein non-linear finite element analyses indicate that Kevlar composite is the preferred material because it gives the highest ring spring strength—followed by Spectra Shield composite which is 23% as strong as Kevlar, followed by E—fiberglass which is 16% as strong as Kevlar, followed by PEBAXX 5533 which is 1% as strong as Kevlar, wherein the prior art shoe springs use injection moldable materials such as PEBAXX 5533 which is far from optimal. Fiber composite materials are also preferred because they have very low mechanical hysteresis losses—of approximately one to two percent as compared to approximately 20-50% for injection moldable materials such as thermoplastic polyurethanes (for example, pellethane 2363 or PEBAX 5533), wherein any other material with critical parameters for flexibility and bending strength which are similar to those of Kevlar can also be used, wherein other appropriate materials include Vectran, novel carbon fiber composites and carbon nanotubes composites—both with high tensile strength and with a high value of elongation limit, and composites derived from spider silk—provided these novel materials can be produced in bulk at a low cost.

The spring strength results used for the Table 1 and later for Tables 2 and 3, use the following material specifications. The AN SYS FEA model used the mechanical properties from "GC-70-UL: UNIDIRECTIONAL FIBERGLASS LAMINATE" Eglass available from Gordon Composites. (http://www.gordoncomposites.com/products/TDS/GC-70-UL.pdf)
Of course, the modulus of Sglass is approximately 20% stronger than for Eglass, and the strength is approximately 30% stronger. This indicates that for the fiberglass made arch-based springs herein, their strength could be more than twenty times stronger than the PEBAX 5533 made springs of the prior art
mentioned in the summary of the instant invention. This is very significant! The reason that fiberglass shoe sole springs are so much stronger than carbon fiber composites is that the strain limits are higher by a factor of four (than those for carbon fiber laminates or titanium, e.g.), and this increased strain limit is the critical parameter in this size regime. And now, Kevlar springs are much stronger.

Curly v-spring 96 in FIG. 10 was used for the non-linear finite element analysis. This model was used to calculate the values in Tables 1-4. The first section of the Table 1, for the curly spring, reports the following parameters. Each of the two arms, top curly arm 98 and bottom curly arm 100, is a quarter of a circle with a particular radius. The deflection, d, equals twice the radius minus twice the arm thickness, t. The force f is at 80% compression. These results assume a spring width of one inch. At full compression the arms would be fully flattened. Note that the thickness values are only five percent of the radius values, or 2.5 percent of the deflection values. Thus, the first significant advantage for fiberglass composite is that the fully compressed thickness is only 5% of the deflection which corresponds to a compression ratio of 20. This demonstrates the first advantage of complex springs based on elemental curved springs and made of fiberglass. The second significant advantage has to do with the relative spring load force values for the four materials. The spring load force for fiberglass composite is by far the highest. It is 10.5 times higher than the value for carbon fiber composite; it is 9.3 times higher than value for titanium; and it is 16 times higher than the value for PEBAX 5533. Thus, fiberglass is by far the preferred material for these springs. That is, the second significant advantage is that fiberglass is much stronger. Also, taking into account the differences in density, the spring weight for these fiberglass springs is 12.3 times lighter than for carbon fiber springs, and it is 8.2 times lighter than for PEBAX 5533. Thus, the third significant advantage is that fiberglass is much lighter, because the spring widths are less. The advantage of injection moldable materials is that they are cheaper and easier to make, but fiberglass springs or Kevlar springs can be inexpensively mass produced as well. Again, based on the recent studies, Kevlar is much preferred over fiberglass.

Table 1 shows a very interesting feature which leads to another part of the method to optimize force curves, certainly for shoe applications and probably for other applications. Close inspection reveals that the ratio of force f to deflection d, and the ratio of arm thickness to deflection, are constant over the entire range of deflection shown, for each material. This is not unexpected because top curly arm 98 behaves like a cantilever or a diving board which starts with the shape of a quarter circle and bends (compresses) to flatten. Thus, the load force is
proportional to the thickness cubed over the length cubed, so these two load force ratios would be expected to remain constant. Likewise, the ratio of d to t remains constant.

However, looking at the second part of table 1 for the curved spring, which corresponds to the top or bottom half of the curly v-spring, note that for a given deflection d, say 2", the force, f is twice that for the curly v-spring (184 lbs as compared with 92 lbs). Likewise is true for the thickness, t (0.096" as compared with 0.048"). Thus, the curved spring arm is thicker than the curly spring arm, and the achievable force is doubled. That is why the heel-pop shoe spring systems (using curved springs) are twice as strong and, hence, twice as light as springs used for conventional shoes (see FIG. 24) which use mirrored arch springs (which are equivalent to curly v-springs for the purposes of this argument). Here is a conclusion which may seem surprising. Note that for these curly v-springs, increasing the deflection by a factor of ten increases the load force by a ten of ten. However, ten times as many springs can be fit into the same area (footprint) for the smaller deflection value. This means that the total force per area achievable is constant over the entire range of deflections for all spring heights (~d). This is an important insight. Assuming that the force curve is linear, the impact energy stored by the spring at full compression is equal to the maximum force times one-half the deflection. Thus, the possible energy that can be absorbed is linearly proportional to the deflection. Next, how is this insight relevant to the question of optimizing a spring for an application su h as running?

The impact energy of running is absorbed by two elements: the leg and the shoe sole. In a manner similar to two springs in series, impact energy is stored via resisted deflection of both the leg and the sole. For springs in series, when one element is very rigid, more impact energy is absorbed in the other element. If the sole is very rigid, the leg must absorb almost all the impact energy, mostly in the knees. Thus, the more deflection there is in the sole, the more energy there is stored in the sole and the less work the leg has to do to absorb the energy. However, there is a limit to how thick the sole can be because the combined knee ad ankle action to thrust the runner back into the air makes the determination of optimal coupling quite complicated. Even so, it is likely that the energy cost of running can be significantly reduced if the sole deflection is made as large as is practically possible, in which case the runner would run with less knee bend, which in turn reduces the energy absorbed in the quadriceps muscles. In addition, by optimizing the force curve as was discussed for FIG. 12, the maximum impact force can still be less than is the case with conventional prior art shoes with springs which are linear and not pre-loaded and with springs which typically deflect only about a quarter of an inch. This consideration, to maximize the sole thickness and, hence, the energy stored in the sole, is the third criterion of the method for optimal springs—to achieve a desired optimized force curve with a minimum value for the maximum force on the curve, discussed earlier for FIG. 12.

With these considerations in mind, it makes sense to determine the impact energy of running, and then to vary the sole deflection to determine the maximum energy that can be stored in the sole without compromising the leg/ankle action and the timing of the coupling action of running. With this optimal sole energy determined, it is then a simple exercise to use Table 1 to calculate the optimal deflection using the equation, spring work equals one-half the deflection squared—for a linear spring. If the spring force curve is non-linear, the force curve can be easily determined and used to achieve the same result. In summary, another part of the method to optimize the force-curve discussed for FIG. 12 is the following. One must determine the optimal energy to be stored in the sole spring, and one must use a table such as Table 1 to then determine the optimal deflection to realize this sole energy—in view of the fact that the stored energy is linearly dependent on this deflection for the optimal springs of the instant invention.

FIG. 13 shows schematic side views of internal linkage mirrored arch spring 107. This spring is designed to be an optimal spring with a force curve which starts linear and which then bends over to be constant. Actually, its force curve bends over and eventually goes to zero, but it is easy to incorporate auxiliary linear springs which start to be compressed as this just-mentioned force curve starts to decrease—so that the combined force curve is approximately constant until full compression. First, let us look as FIG. 19 for tensioned linkage spring configurations, and specifically at tensioned diamond spring 282. Vertical loads (shown by force load arrow 258) compress vertical vertices 256 together. This motion is resisted by generic tension spring 250 via side vertices 254. As 4-sided linkage 252 is compressed, the vertical force needed to pull apart tension spring 250 first increases and then reduces to zero. That is, at full compression the links are horizontal and, hence, provide zero vertical force. The design of FIG. 13 is actually based on compressed diamond spring 286 of FIG. 19 where, as 4-sided linkage 252 is compressed by vertical loads shown by force load arrow 258, this motion is resisted by generic compression spring 250, which compresses against fixed anchor 272. Again, the vertical force needed to push apart generic
compression spring 274 first increases and then reduces to zero. Looking again at FIG. 13 for internal linkage mirrored arch spring 107, let us see how the same force curve is achieved even though the configuration is somewhat different.

FIG. 13 with schematic side views shows the favorite enhanced optimal spring herein, namely internal linkage mirrored arch spring 107 which comprises the following elements. Load surfaces 90 compress monolithic mirrored arc 108. Mirrored spreader linkage 115 comprises (on top and bottom) center links 113 which are pivotally connected on both sides via corner hinges 120 to mostly vertical links 114, which are pivotally connected on both sides to impinger links 112 via impinger hinges 119. Inside linkage partial springs 117 are located between upper and lower center links 113, and they are located spaced away from each other to provide a restoring force to keep center links 113 horizontal during compression. Likewise is true for outside linkage partial springs 116. The reason for the need for this restoring force is that the top and bottom halves of mirrored spreader linkage 115 are inherently unstable, meaning that this half linkage could possibly shift sideways so that one adjacent corner hinge would be higher than the other—if the loading by outside linkage partial spring 116 were at the center of center links 113.

Now, for the interesting insight remember compressed diamond spring 286 of FIG. 19. Monolithic mirrored arch 108 acts as generic compression spring 274 of FIG. 19. That is, it resists the outward expansion of mirrored spreader linkage 115 as if it were a compression spring. And, instead of pushing in compression against fixed anchors 272 of FIG. 19, they push against the monolithic pivots of monolithic mirrored arches 108, which are shown in more detail in FIG. 15 as monolithic arch hinges 187. Thus, all of the comments made, for the how
compressed diamond spring 286 of FIG. 19 is an optimal spring with an optimal force curve, apply for internal linkage mirrored arch spring 107, which is even more optimizable by virtue of (1) the action of outside linkage partial springs 116 which control and moderate the initial spreading of monolithic mirrored arch 108 by mirrored spreader linkage 115, and by virtue of (2) the action of inside linkage partial springs 117 which prevent the force curve from going to zero at full
compression. That is, the force curve starts linear and then becomes constant all the way to full compression. This qualifies internal linkage mirrored arch spring 107 as a fully optimal spring (as long as partial springs 117 are included). Compressed internal linkage mirrored arch spring 109 shows the behavior during compression. Note that all elements flatten at full compression to maximize the compression ratio. Impinger hinges 119 and corner hinges 120 can be conventional cylindrical hinges with shafts and bearings, but preferentially they are necked-down living hinges as shown below in FIG. 15 or tied cogged hinges 920 of FIG. 47. Note well that a simple four-sided diamond shaped linkage does not work because its flattened length is less than the flattened length of upper arch 110. Thus, the extra links (center link 113 and impinger link 112) are needed to fully spread upper arch 110.

FIG. 14 shows schematic side views for various configurations of the internal linkage curved spring. Note that 1st double link-spread curved spring 122 is an example of linkage-spread curved spring 121, and it comprises double linkage 131 which comprises two double links 125 connected by double hinge 126. Double linkage 131 hingeably connects on either side via spring hinges 124 to curved spring 127, which is inclined to the left from vertical. Top adjust spring 132 is located between double hinge 126 and its adjacent load surface 90. Adjust spring 133 is located so that it is loaded only by load surfaces 90. The goal of this design is for double linkage 131 to spread and straighten curved spring 127 so that the force curve bends over at a partial compression. Top adjust spring 132, and adjust spring 133 are optional, but serve to achieve a more optimal force curve. Top adjust spring 132 controls the onset of the loading of double hinge 126 by load surface 90. Adjust spring 133 serves to maintain the total force curve approximately constant as the force curve just due to the linkage spreading of curved spring 127 would begin to go to zero without adjust spring 133. As the top load surface 90 compresses, eventually double hinge 126 is higher than the top spring hinge 124, at which time curved spring 127 is only loaded in spreading so that the force curve will bend over and eventually go to zero (without adjust spring 133). The onset of the pure spreading loading is shown by the figure for compressed 1st double link-spread curved spring 123. It is also possible to choose the relative lengths of the two double links 125, and to shorten curved spring 127—so that only double hinge 126 is impinging the top load surface 90 (top adjust is now not used). Now the top end of curved spring 127 is not touching top load surface 90 so that curved spring 127 is only loaded in tension, thereby ensuring that the force between the two load surfaces bends over and goes to zero as full spring compression is achieved.

An example of another version of linkage-spread curved spring 121 is 2nd double link-spread curved spring 135.

Here the lengths and the angles of the component links of double linkage 131 have been changed so that double hinge 126 impinges the top load surface 90 earlier during the spring compression. This causes the force curve to bend over sooner. The summed length of the two double links 125 must equal the length of curved spring 127 so that all elements can fully flatten at full compression. Two representations of 2nd double link-spread curved spring 135 are shown, the first at the beginning of compression and the second when double hinge 126 impinges load surface 90. This second representation is compressed 2nd double link-spread curved spring 136. In this double-link version and in the next triple-link versions, top adjust spring 132 and adjust spring 133 are not shown, but they can well be used to better refine the force curve. Tip path 130 traces the path of the tip of curved spring 127 as it is compressed to flatten.

The next two figure views show two versions of a linkage comprising three links. Again, the lengths and angle of the component links are changed to alter when the force curve bends over, and two levels of compression are shown. 1st triple link-spread curved spring 137 comprises three tri links 128 connected by two tri hinges 129. It also spreads curved spring 127 during compression.

Optional top adjust spring 132 and adjust spring 133 are not shown, but they can also be used to better refine the force curve. Compressed 1st triple link-spread curved spring 138 indicates the compression where the top tri hinge 129 impinges the top load surface 90. Another version is shown with 2nd triple-link spread curved spring 139 and compressed 2nd triple-link spread curved spring 140, where the top tri hinge 129 impinges the top load surface 90 earlier during compression. All versions here can be combined in mirrored versions about the center vertical line to make an arched configuration, which in turn can be mirrored about the horizontal center line to make a mirrored arch configuration.

FIG. 15 shows a schematic cut-out side view of cut-out monolithic mirrored spreader linkage 183 which portrays in detail a monolithic, necked-down living hinge version of mirrored spreader linkage 115 of FIG. 13. The full links are not shown to better view the pivot sections, but the missing center link sections are indicated by the wavy lines. This abbreviated display is referred to as a cutout herein. Cut-out monolithic mirrored spreader linkage 183 comprises monolithic center links 185 which connect via monolithic corner hinges 182 to monolithic mostly vertical links 186, which connect via monolithic impinger hinges 181 to monolithic impinger links 184 which impinge monolithic arch hinges 187, which connect upper arch 110 with lower arch 111 (see FIG. 13). As stated before, the preferred materials, for linkages like cut-out monolithic mirrored spreader linkage 183, are TPUs of appropriate hardness such as PEBAX or Pellethane, because these materials can be injection molded, or like materials. Also, the preferred and by far the strongest material for the curved springs herein is Kevlar, followed by Spectra Shield and fiberglass. Or, more preferably, tied cogged hinges 920 of FIG. 47 can be used.

FIG. 16 shows schematic side views of kite-end curved spring 144 at various levels of compression including first level compressed kite end curved spring 146, second level compressed kite end curved spring 147, and fully compressed kite end curved spring 148. Kite end curved spring 144 is compressed between load surfaces 90 in such a way that the top load surface 90 is free to move horizontally with respect to the bottom load surface 90. Solid initial section 152 is fixably attached to the lower load surface 90 at its beginning (base). It forms a monolithic structure with kite end section 149 which comprises the following: inner arch 153, outer arch 154, kite end section 149, spring end 151, and optional vertices tether 150. These two arches form a mirrored arch to be compressed. Optional vertices tether 150 is shown only in the uncompressed view in view of space limitations. Its first purpose is to prevent inner arch 153 and outer arch 154 from moving apart during the initial part of compression. Its second purpose is to pre-load kite-end section 149.

The idea behind kite-end curved spring 144 is that the character of the loading of kite-end section 149 changes during compression. Initially, it is oriented diagonally with respect to the upper load surface 90, during which time it receives primarily a bending load via spring end 151. The view of first level compressed kite-end curved spring 146 then shows that kite-end curved spring 144 has rotated counterclockwise so that the upper load surface 90 is beginning to directly load kite-end section 149, at which time the loading becomes primarily compressive rather than bending. Just at this level of compression (approximately 60% in this example for first level compressed kite-end curved spring 146), solid initial section 152 has been approximately flattened. Up until this level of deflection, the initial force curve force curve of kite-end curved spring 144 has been primarily due to the flattening of solid initial section 152. Now however, the force curve for the remaining 40% compression of kite-end curved spring 144 can be reduced in slope because it is due to the compression of kite-end section 149. In the first part of this compression of kite-end section 149, it is obliquely loaded so it is stiffer. This can be seen in the third view—of second level compressed kite-end curved spring 147. As full compression is achieved, kite-end section 149 is loaded more directly so that the force curve will soften. This can be seen in the fourth view—of fully compressed kite-end curved spring 148. With these detailed considerations in mind, it is apparent that the force curve of kite-end curved spring 144 can be engineered to bend over and to become significantly softer (more digressive). Thus, the goal to optimize the force curve by minimizing the maximum impact force has been achieved. Of course, spring end 151 could as well be hingeably connected to the top load surface 90, or it could be rollingly connected as has been previously detailed herein. Another option is to use optional vertices tether 150 to pre-load kite-end section 149.

FIG. 17 shows schematic side views of configurations for arrowhead, kite-end and double-link spread curved springs. First it shows a schematic side view of mirrored kite-end curved spring 169 uncompressed. The combination of four ones of kite-end curved spring 144 (from FIG. 16) results in the formation of mirrored kite-end curved spring 169. This combination forms a mirrored arch spring similar to mirrored arch spring 80 of FIG. 10. Accordingly, the elements of mirrored kite-end curved spring 169 comprise the same elements as those of kite-end curved spring 144. Thus, mirrored kite-end curved spring 169 comprises upper kite end arch 172 and lower kite end arch 173, each of which further comprise solid arch center section 170 and end kite section 171. FIG. 17 also shows schematic side views of arrowhead curved spring 145. This demonstrates yet another approach to attain a more optimal force curve by utilizing a structure at the end of a curved spring for which the nature of the loading changes as the end rotates during compression. Arrowhead curved spring 145 comprises solid initial section 152 which is rigidly attached to the lower load surface 90 at its base and which is monolithically attached to arrow rigid end 158. Inner arrow arm 156 and outer arrow arm 157 are fixably attached to arrow rigid end 158, and these are leaf springs. Spring end 151 forms the end of arrow rigid end 158, and it impinges the top load surface 90. Thus, arrowhead end section 159 comprises inner arrow arm 156, outer arrow arm 157, arrow rigid end 158, and spring end 151. The view of mostly compressed arrowhead curved spring 159 shows that spring end 151 initially impinges load surface 90. However, eventually during compression arrowhead end section 159 rotates counterclockwise so that the tips of outer arrow arm 157 and inner arrow arm 156 now impinge the upper and lower load surfaces 90. At full compression the spring action of solid initial section 152 is acting in series with the spring actions of inner arrow arm 156 and outer arrow arm 157. Since the stiffness of in-series springs add reciprocally, this means that the sum force of these two spring actions is less than the force of just solid initial section 152. Hence, the force curve has bent over, and it more optimal as defined herein.

Kite-end v-spring 165 behaves similarly to curly v-spring 96 of FIG. 10 in the sense that is has floating hinges, which ensures that top load surface 90 is free to translate to the left with respect to bottom load surface 90—as indicated by top load surface arrow 168. And, the force curve is similar to that of kite end curved spring 144. FIG. 17 also shows a schematic side view of kite-end v-spring 165 which comprises top kite-end curved spring 162 and bottom kite-end curved spring 164, which are joined by kite-end v-spring vertex 166. Likewise, mirrored linkage-spread curved spring 163 is similar to curly v-spring 96, but the force curve is similar to that of linkage-spread curved spring 121 of FIG. 14—of which it is composed with two mirrored parts. Again, these force curves are more optimal (constant force) than the linear force curve of curly v-spring 96.

FIG. 18 shows compressed and uncompressed schematic side views of monolithic tensioned mirrored arch spring 200, which comprises the following elements. Inner side-loaded arch spring 204 is located inside of and pulls on outer top-loaded arch spring 206 via inter-arch section 208. These three elements form a continuous monolithic structure, and they are interconnected via necked-down living hinges. Also, the bottom half of this continuous monolithic structure is the mirrored image of the top half, although inner tension-loaded curly v-spring 220 is substituted for the inner tension element in the figure to show an alternative version. Outer top-loaded arch spring 206 comprises extended flat section 224 and outer-tip sections 210. The curved sections of inner side-loaded arch spring 204 and outer top-loaded arch spring 206 comprise sections that are quarter circles in shape approximately. The extension of extended flat section 224 permits these inner and outer arch elements to both fully flatten without interference one to the other. Although the curve shapes do not necessarily need to be quarter circles, this is a convenient method to ensure the necessary full flattening. The other provision, to ensure full flattening, is outer-tip spacer 218—as can be seen in the view of compressed monolithic tensioned mirrored arch spring 202. Note that the height of outer-tip spacer 218 is exaggerated for easy viewing, but it will be minimized so that all arch elements only just touch along their lengths at full compression. Outer clamps 216 clamp together the mirrored outer-tip sections 210 to outer-tip spacers 218, and inner clamps 214 clamp together mirrored inner-tip sections 212. To show another possibility for the inner tension element, inner tension-loaded curly v-spring 220 is shown instead on the bottom half of the structure, and it also fully flattens at full compression. Its mirrored halves are connected by inter curly-v tip section 222. Necked-down living hinges are depicted for inter curly-v tip sections 222, outer-tip sections 210, and inner-tip sections 212.

FIG. 20 shows another design where mirrored arch springs
incorporate a tension spring element, in this case a stretchable band which in the prior art was made of a TPU-like material—which, however, has energy hysteresis losses of 20% to 50%. However, there are two distinct advantages of monolithic tensioned mirrored arch spring 200 of FIG. 18 over the design of FIG. 20: namely that the tension spring element, either inner side-loaded arch spring 204 or inner tension-loaded curly v-spring 220 of FIG. 18, can be made of fiberglass (or Kevlar or Spectra Shield) which has minimal energy hysteresis loss (~1%), and the connection between the tension spring element can thus be made monolithic—since outer top-loaded arch spring 206 is much preferably made of fiberglass (or Kevlar or Spectra Shield) which is an order of magnitude stronger than TPU-like materials. Note also that said tension spring element serves to resist the
compression of the outer top-loaded arch springs 206, so the combined spring action is stronger. However, as the whole spring assembly compresses, the action of the tension spring element becomes more aligned with the action of outer top-loaded arch spring 206 so that the vertical component of these opposing forces (which is directly opposing the compression between the opposing load surfaces 90) decreases and eventually goes to zero. Thus, the total force curve decreases, but note that it does not go to zero because the bending force of outer top-loaded arch spring 206 is still opposing compression. Thus, if the strength of the inner and outer arches are roughly the same, the total spring rate (the total force curve slope) starts at twice the value for just the outer arch spring, and then decreases to the value just due to the outer arch element. The conclusion for FIG. 18 therefore is that the total force curve can be "half-optimal" because it cannot become horizontal. Moreover, this is not the case for the linkage spread curved springs designs of FIGS. 13, 14, 15, 19, 21, 22, 23 and 27—and especially of FIG. 32 herein, which are completely optimal because the "total" force due to the linkage spread arch springs (or curved spring for FIG. 27) does go to zero, so that an auxiliary spring can be used to make the complete total force curve go constant when the auxiliary spring is included in the spring system. This is because there is no contribution to the force curve from the links, which do not bend.

The discussion of FIG. 19 pertains to goal of optimal springs which can fully minimize the maximum impact force point of running. These optimal springs are the second embodiment of the invention. FIG. 19 shows schematic side views of various configurations, called herein torque-lift configurations for optimal springs, in which a tension element is used to resist compression of a linkage in such a manner that the force curve for the spring-tensioned linkage assembly is optimal as defined by the criterion that the force curve starts linear and then bends over to stay essentially constant, although it may continue to increase with a lower slope. In tensioned diamond spring 282, vertical loads (shown by force load arrow 258) compress vertical vertices 256 together. This motion is resisted by generic tension spring 250 via side vertices 254. As 4-sided linkage 252 is compressed, the vertical force needed to pull apart tension spring 250 first increases and then reduces to zero. That is, at full compression the links are horizontal and, hence, provide zero vertical force. Compressed diamond spring 286 comprises 4-sided linkage 252 which is compressed by vertical loads shown by force load arrow 258. This motion is resisted by generic compression spring 250, which compresses against fixed anchor 272. Again, the vertical force needed to push apart generic compression spring 274 first increases and then reduces to zero. Now consider spring systems based not on linkages, but on mirrored arches—to explain why these are "half-optimals." Tensioned mirrored arch spring 284 is loaded by load surfaces 90; it comprises outer upper arch spring 268 which is pivotally connected to its mirror image, outer lower arch spring 270, via pivot connections, 260. Likewise, inner upper arch spring 264 is pivotally connected to inner lower arch spring 266 via pivot connections, 260, which connect these inner and outer mirrored arches together via cords 262. By virtue of these connections, the inner mirrored arch springs resist the outward motion of the pivot connections 260 connecting outer upper arch spring 268 with outer lower arch spring 270. This increases the force needed to compress the whole spring assembly over the vertical compression force exerted just by the outer mirrored arch spring. In effect, the total spring stiffness is increased, and approximately doubled. Cords 262 exert only a horizontal tension force, which goes to zero as the inner arch mirrored spring approaches full flattening. This means that the contribution of the inner mirrored arch spring goes to zero, so the slope of the total vertical spring force goes to one-half of its initial value. This makes tensioned mirrored arch spring 284 "half-way optimal." This is not as good as the linkage-spread curved spring systems herein which are fully optimal since their force curves approach a constant value, but it is still an improvement over a spring with a linear force curve. Note that care must be taken to ensure that inner upper arch spring 264 and inner lower arch spring 266 are loaded only horizontally via cords 262. If these inner arches are loaded vertically by impingement of their center sections with the outer arches, the slope of the force curve will increase to its initial value, or by approximately a factor of two, and the spring is no longer even "half-optimal." Another problem with this design as shown is that the lengths of the inner arches are smaller than the lengths of the outer arches, which prevents the outer arches from fully compressing.

Compressed separated mirrored arch spring 288 solves the problem of fully flattening by separating the outer arches. It is very similar to tensioned mirrored arch spring 284. It comprises left half outer arch spring 278 and right half outer arch spring 280 which also have pivot connections 260 at their centers, and which also connect via cords 262 to the inner mirrored arches, namely inner upper arch spring 264 and inner lower arch spring 266. Note however that left half outer arch spring 278 and right half outer arch spring 280 are now connected by cords 262. The vertical forces are exerted by slotted spacers 276 as indicated by force load arrows 258. Interference between cords 262 and slotted spacer 276 is prevented by virtue of longitudinally oriented slots in slotted spacer 276 which permit passage of cords 262. With these provisions, separated mirrored arch spring can fully compress and flatten. It also has a "half optimal" force curve.

FIG. 20 shows schematic side views of tensioned band mirrored arch spring 292. Here the tension element is tension band 302 which loads the mirrored arch elements which are shown with rounded tip curved arm 296 on the left side and as necked-down tip curved arm 298 on the right side. This is just to show two options for the pivot at the tips of these mirrored arch elements. It is important that these tips can rotate ninety degrees without putting undue stress on the curved arm. During compression, rounded tip curved arms 296 on the left side and necked-down tip curved arms 298 on the right side, impinge their mirrored image vertically through the ends of tension band 302. To further prevent tension band 302 from sliding out between these impinging tips, band end loop 306 encloses
hollow rectangular band retainer pin 300 so that this assembly cannot squeeze down to pull through the space between the mirrored images of impinging tips of rounded tip curved arms 296 on the left side and necked-down tip curved arm on the right side. This appears to be the easiest fail-safe method for attachment so that tension band 302 cannot squeeze and pull through. This method is both novel and easy to fabricate. After cinching the assembly tightly together with stitched cord 306, hollow rectangular band retainer pin 300 is simply inserted from the side through band end loops 304. The view of compressed tensioned band mirrored arch spring 294 shows the spring assembly at full compression by load surfaces 90. Note that stitched cord 306 must be easy foldable. Band loops are easy to make of injection moldable material.

The view of pre-load stitching configuration 312 indicates how to fabricate stitched cord 306. Vertical arm pre-load holes 308 are made across the center top of rounded tip curved arms 296 (or of necked-down tip curved arms 298 if that version is used), and likewise for band pre-load holes 310 in tension band 302. Then stitched cord 306 is threaded going across the width of tensioned band mirrored arch spring 292 at its longitudinal center. Provided that a suitable material can be found for tension band 302 the design of FIG. 22 appears to be a suitable solution for the tension element attachment. Thermoplastic polyurethanes appear be strong enough and to stretch the necessary 60%, but they appear to have significant hysteresis losses of ~20-50%. If energy return of the springs does not need to optimized, then these TPUs could be used in the design of FIG. 20. If optimal energy return is needed, then the design of FIG. 18 is preferable since it uses bending fiberglass curved arms for the tension element, which are 98% to 99% energy efficient. That is, their hysteresis loss is only 1-2%. Lucas in U.S. Pat. No. 7,401,419 of Jul. 22, 2008 show figures for hysteresis loss which appear to indicate a hysteresis loss of 20-30% for TPUs. Other data in the literature indicate hysteresis losses of 40% for these materials. Note that technique of pre-load stitching configuration 312 can be used anytime that a spring system needs to be pre-loaded or held in place. For example, refer to FIG. 11, FIG. 13, FIG. 18, or FIGS. 21-23 herein.

FIG. 21 shows schematic side views of two tensioned linkage configurations. Tensioned linkage spring 320 uses bending fiberglass curved springs as the tension elements, and band tensioned linkage spring 340 uses tension band 302. Tensioned linkage spring 320 comprises four quad links 322 which are pivotally interconnected by vertical hinges 323 and horizontal hinges 324 to form a diamond shaped linkage. Load surfaces 90 load vertical hinges 323. The tension element is comprised of tension curved springs 330 symmetrically arranged on four sides, which comprise initially vertically oriented tension spring tips 332 which interconnect via tip cords 326. At the other ends at the center of the arrangement, tension curved springs 330 connect to horizontal hinges 324 via hinge cords 328, which are clamped to tension curved springs 330 by tension clamps 334. Hinge cords 328 loop around horizontal hinges 324 to withstand the tension force. This looping is easily done if horizontal hinges 324 use a shaft—in which case one or more longitudinal slots are cut across the width of quad links 322. The loops of hinge cords 328 are then pushed through these slots so that said shafts can be pushed through said loops to achieve the tension connection in a manner obvious to one of ordinary skill in the art. The view of compressed tensioned linkage spring 321 shows how tension curved springs 330 are pulled to straighten during compression. This design is a fully optimal spring as has been defined herein several times, provided auxiliary springs are used to prevent the total force curve from going to zero as full compression is approached. See for example FIG. 7. Note that these auxiliary springs are of partial height of the deflection distance, and they need to be loaded directly by the load surfaces. Also, note that tension curved spring 330 was used as an example in this figure.

Tensioned linkage spring 320 was the example used for diamond linkage tension spring 38 in FIG. 7, but many of the other optimal springs herein can be used as well, preferentially the ones of monolithic construction.

Also shown in FIG. 21 is band tensioned linkage spring 340. It uses the same four-sided linkage as tensioned linkage spring 320, but instead it uses tension band 302 for the tension element. The view of compressed band tensioned linkage spring 342 shows the compressed state. The explanation just given for tensioned linkage spring 320 explains the connections and function for band tensioned linkage spring 340. The caveats of hysteresis energy loss given for FIG. 20 for tension band 302 also apply here when it is made of TPU-line material. FIG. 22 shows schematic side views of monolithic tensioned linkage configurations. These are similar to the designs of FIG. 21 except that the connections of the various elements are monolithic, utilizing necked-down living hinges. Monolithic tensioned linkage spring 350 comprises a four-sided, diamond shaped linkage comprising monolithic quad links 354 connected by monolithic vertical necked-down vertices 356 and by monolithic horizontal necked-down vertices 358. The monolithic construction continues with the connection of horizontal necked-down vertices 358 to side vertex connection sections 370 which divide in a merged sense to form monolithic tension curved springs 366, which connect to their mirrored images via monolithic tip connection sections 368.

Optional elements used to reinforce the side connections comprise first necked restraints 364, monolithic loops 360, and retainer pins 362. Monolithic loops 360 are part of the continuous link/spring structure. Retainer pins 362 are inserted from the sides through these loops, and they serve, in combination with first necked restraints 364, to withstand the considerable compressive force exerted on monolithic horizontal necked-down vertices 358 by the action of monolithic tension curved springs 366. Since the monolithic structure has to serve as a spring element as well as a link element, fiberglass is the preferred material. This also applies to the necked-down living hinge elements. The view of compressed monolithic tensioned linkage spring 352 shows this design in compression by load surfaces 90.

Monolithic tensioned linkage spring 350 is the second most preferred tensioned optimal spring in the instant invention because it can be used to achieve a completely optimal spring with a completely optimal force curve. It features high energy efficiency (99%) of its spring element, monolithic tension curved spring 366, and it can be mass produced as an insertable spring in any shoe design, including the heel-pop designs of FIGS. 1-9 provided it is tilted backwards before compression, and in conventional shoes as shown in FIG. 24. However, again for emphasis, internal linkage mirrored arch spring 107 of FIG. 13 as made monolithic by as shown by cut-out monolithic mirrored spreader linkage 183 in FIG. 15 is the most preferred optimal spring herein because this internal linkage impinges the outer mirrored arch spring, and there is a distinct practical advantage of not needing to make tensioned connections. The fact that this linkage can be injection molded, in combination with the fact that the outer mirrored arch spring element can be easily fabricated of fiberglass (an order of magnitude stronger/ lighter than TPUs), makes the monolithic version of internal linkage mirrored arch spring 107 the clear winner. Again, the force curve can be made completely optimal, as explained for FIG. 12, since this design is easily to pre-load and with auxiliary springs to ensure a constant total force curve near full compression.

The analogous design to band tensioned linkage spring 340 of FIG. 21 is monolithic band tensioned linkage spring 372 of FIG. 22, which is shown in its compressed state with the view of compressed monolithic band tensioned linkage spring 374. Monolithic quad links 354 connect to their side mirrored images via monolithic vertical necked-down vertices 356. The side connections comprising second necked restraint 376, band end loop 304 (and hollow rectangular band retainer pin 300 on the right side) correspond to those same or equivalent elements in FIG. 20. Likewise the side connections comprising third necked restraint 378, band end loop 304, and hollow rectangular band retainer pin 300 on the left side correspond to those same or equivalent elements in FIG. 20. In this design, the link elements are preferential made of injection moldable material such as TPUs (e.g., Pellethane or PEBAX), while the spring elements are preferentially made of fiberglass. This is a fully optimal spring in the sense defined herein provided there are auxiliary springs incorporated as explained just above. Note that the monolithic side pivoting arrangement of monolithic tensioned linkage spring 350 can as well be used with a tension band as was done with monolithic band tensioned linkage spring 372. Basically, tension band 302 replaces monolithic curved springs 366, and the linkage elements are monolithic with the spring tension elements—in which case both need to be a more compliant material such a TPU with its attendant energy hysteresis loss.

FIG. 23 is a schematic side view of monolithic nested tensioned linkage spring 380 which is very similar to monolithic tensioned linkage spring 350 of FIG. 22 except that two nested curved springs are used. Side vertex connection section 370 now diverges into 1st nested curved spring 382 and 2nd nested curved spring 384, each of which is pivotally connected to its mirrored image by monolithic tip connection sections 368. Otherwise, the elements are the same as for FIG. 23 as in FIG. 22, and the discussion is the same. The reason for nesting curved springs is that the spring system can be stronger, by a factor of two or three practically speaking. The disadvantage is that the total spring height is higher and the compression ratio is lower. However, this ratio does not change significantly in view of the fact, for the fiberglass curved springs preferred in the instant invention, that the arm thicknesses are so small (of the order of 0.05" to 0.2" as shown in Table 1). This increase in nested spring strength is important for the gear change capability of FIG. 26.

FIG. 24 shows schematic side views and a top view of optimal springs in a conventional shoe, which means shoes that do not feature the heel-pop capability for enhanced heel-lift. The use of optimal shoes in conventional shoes is the fourth embodiment of the invention because it can be used in all shoes, thereby providing the health benefits of significantly reduced maximum impact force to the people of the world. Constant thickness shoe 411 comprises shoe upper 1 fixably attached to the top of constant thickness sole 405. Constant thickness shoe 411 comprises shoe upper 1 fixably attached to the top of constant thickness sole 405. Tapered shoe 413 comprises shoe upper 1 fixably attached to the top of tapered thickness sole 407. One or more internal linkage mirrored arch springs 107 can be located in both constant thickness sole 405 and tapered thickness sole 407, e.g. Likewise is true for sideways internal linkage mirrored arch springs 401, which are the same as internal linkage mirrored arch springs 107 except that they are rotated about the vertical by 90 degrees, in which case with they resist forward translation of footplate 3 with respect to ground plate 5. Both fig views have toe pivot 403 so that both constant thickness sole 405 and tapered thickness sole 407 can articulate at the toe joint. In tapered thickness sole 407, sideways internal linkage mirrored arch spring 401 features on its top side hard elastomer top to compensate for the small difference in sole height from the front side to the back side of sideways internal linkage mirrored arch spring 401. Another type of spring that can be used is mirrored arch spring 80. However, this has a linear force curve. The novel aspect here is the use of optimal springs. There have been a number of optimal springs shown in the instant invention. Any optimal springs shown herein that are variations of curly v-springs and of mirrored arch springs can be used in constant thickness sole 405 or in tapered thickness sole 407, because these compress vertically.

If the sole is thick (i.e. the sole travel is large) and of constant thickness, there will be a problem with toe sink, as was explained for FIGS. 1-9. Several things can be done to solve this problem. Unfortunately, the anti-toe-sink mechanism of the heel-pop shoes of FIGS. cannot be used because it requires forward translation of footplate 3 with respect to groundplate 5 to work. Using a tapered sole helps, or conventional toe stop 412 can be located under toe plate 7, say half the sole height, for example. This is only shown for constant thickness sole 405, but it can also be used in tapered thickness sole 407. Also, a stiff spring can be used under the very front of toe plate 7. In either case, the runner's toes are bent up at full sole compression. Having the toe bent up is tolerable, and there is definitely no toe sink during toe-off. And, there is actually a benefit in that the toes can push off from a higher point during toe off. Also, use of the automatic gear changes of FIGS. 37-43 obviates toe sink problems.

The top view in FIG. 24 of conventional shoe with optimal springs 409 (which corresponds to both constant thickness shoe 411 and tapered shoe 413) shows possible locations of the various springs. Since the optimal springs herein are all based on curved spring elements, they can all be sliced to any width. This means that the widths can be all across the shoe or at any combination of one or more springs of smaller widths. Just as an example, internal linkage mirrored arch springs 107 are shown four abreast and then three abreast. Sideways internal linkage mirrored arch spring 401 is also shown. At zero compression, this is touching footplate 3 and groundplate 5 along a center line longitudinally oriented. Mirrored arch spring 80 is shown below toe plate 7, but it could be any optimal spring. Note well that any of the component springs in an assembly of springs for a shoe—in FIG. 24, or in FIGS. 1-9 for heel-pop shoes, or in FIG. 26 (and FIGS. 37-43) for gear change in shoes—(1) can be located anywhere underfoot or around the outside of the foot, (2) can have any stiffness value of force curve, and (3) can be oriented at any angle. The decision on how to use each component spring in the assembly depends on considerations of structural optimization, stability, and functionality issues such as pronation. In addition, these component springs can easily be held together one to the other with bridging plates so that they can be inserted into a shoe sole as a cartridge, in a manner obvious to one of ordinary skill in the art.

The essential benefit of the second and fourth embodiments of the invention (the second being optimal springs and fourth being their use in
conventional shoes), where the optimal springs embodiment includes both optimal springs of the instant invention and the method to construct these optimal springs, is that the maximum impact force value is reduced by as much as 40% as explained for FIG. 12. The optimal springs disclosed in the instant invention are novel, as their use in any shoe, conventional or heel-pop is novel. Also, the method to achieve a desired optimized force curve with a minimum value for the maximum force on the curve explained for FIG. 11 and FIG. 12 and table 1 (for the optimal sole energy storage) is also novel and can be used in any type of shoe, both conventional and heel-pop. There will also be some energy return for optimal springs in conventional shoes, but not nearly as much as for heel-pop shoes as was explained earlier. All of these designs can be pre-loaded. Also, many of these designs can be used in various combinations with each other—with equivalently optimum force curves. And, each design can be refined and optimized by varying the shapes of the spring elements, the various thickness profiles, the hinge means, the geometries, and the configurations. While various materials can be used to fabricate these optimal springs, the preferred material for the spring elements for most applications, and certainly for shoe applications, is now Kevlar, followed by Spectra Shield and fiberglass. This applies to the discussions above.

In order to understand the entries for nested springs in Tables 2 and 3, consider the following. For example, FIG. 23 shows monolithic nested tensioned linkage spring 380. Also, note that it is possible in like manner to nest all of the optimal spring described herein. Since the thicknesses of the arms of all variants of the arch spring are small (~1/16" for both the curly v-spring and the mirrored arch spring; ~1.8" for the one-sided curved spring), it makes sense to nest the springs when greater spring strength is required because the compression ratio of the nested springs is still quite high. With regard for the entries for spring
strengths in Tables 2 & 3, it is assumed that a nested spring is twice as strong as an un-nested spring. Actually, if more than two levels nesting are done, it could be more than twice as strong, again at the price of increasing the fully compressed thickness of the shoe sole. These tables also show that the various springs for the three types of shoes do not have to fill the entire sole width. For example, the spring system for the curved-spring heel-pop shoe is 2.8 times stronger than needed. This means that only 38% of the sole width need be used—presumably 18% on either side with a 64% of width gap in the middle. Also, the spring strength on either side can easily be varied (simply by altering the spring width on one side) to make the spring strength asymmetric.

In like manner, the above-described procedure can be used for conventional shoes, in which case the spring system is three times what is needed (shown in Table 2 as 300%). If one were to nest the springs, even less of the sole width would be needed for the spring system. For example, for the curved-spring heel-pop shoe, only ~19% of the sole width need be used with one level of nesting—9.5% on either side. Furthermore, in view of the fact that the spring material is fiberglass, the spring weight for each shoe is very light, 4 oz for the curved-spring heel-pop shoe and 3.5 oz for a conventional shoe. It is rare to find a conventional running shoe that deflects more than a quarter of an inch, and even then it is only the heel that deflects. With the novel arch springs described herein, the sole deflection of 2 inches is eight times greater, over the entire sole, and the spring weight is only 3.5 oz. That's quite a bargain. Note also, as an alternative to locating the narrow springs only on either side, that narrow strips of springs could also be located in the center region. This would prevent the center region (laterally speaking) from caving in, which would permit the footplate structure to be lighter. Of course, these springs can now be much lighter using Kevlar or Spectra Shield [0088] Now we have the information needed to address the fourth embodiment of the invention, namely a method to tune the spring system strength to the requirements of the individual user—during manufacture. Although this method applies to any springs used in shoes, the arch springs described herein are preferred because their strengths can be finely chosen (tuned) by cutting them to a particular width. In other words, this method can be used in manufacture to provide a particular fixed spring strength finely tuned to the requirements of a particular user. In addition, a shoe company could manufacture a shoe with a particular minimum spring strength, using springs located on either side within the sole of the shoe. Then add-on springs of variable strengths could be inserted in the vacant center section of the shoe sole so as to tune the shoe for an individual's needs. In this way, standard shoes can be mass produced for a limited range of spring strengths, as is now done, and then spring inserts can be sold to tune the shoe for an individual. These inserts can easily be snapped into the center region of the sole in a manner obvious to one of ordinary skill in the art. Or, a shoe owner could buy a range of springs to cover different uses such as walking, jogging, running, or sprinting. Or, if the owner's weight changes a lot, she can simply change the center spring to fine tune her shoes to her new weight. Various metrics can be used to tune the spring system for the user—first, just his or her weight, or his gait range such as walking or jogging, or the results of a force platform study of his or her ground reaction force requirements. This equipment should be standard fare in shoes stores practicing the spring tuning method described herein.

Included in the second (optimal springs) embodiment of the invention is a method to tune the spring system strength to the requirements of the individual user—during manufacture. In order to better understand how to tune the spring system, it behooves us to explore in some detail the locations and strengths of these springs. First a very important part of the method must be understood. The shoe inventions herein work best with substantially greater sole deflections (~1-3 inches) than what is found in most running conventional shoes (~⅛ to ⅜ inches). Note well, that in order to achieve the full benefits of any shoes, in terms of foot impact reduction and energy return, the sole should fully deflect (e.g. by the full 2 inches). Again, if the compressing sole bottoms out or only deflects partially, the shoe will not provide the full benefits of both impact reduction and energy return for the user. Needless to say, virtually none of the conventional shoes provide the above benefits to their users to full potential.

FIG. 25 shows the schematic top view of possible spring locations for a shoe. In particular, it shows the possible underfoot locations and area sizes of the curved springs used for precise spring tuning for the optimal springs embodiment, as well as the side locations for the fifth embodiment for gear change. Even so, FIG. 25 will serve to describe the locations of the springs for the other shoes described herein, such as the parallelogram heel-pop shoe and the conventional shoe. The spring locations are in two possible types of locations—under the foot (in the sole) and on the sides of the foot. The shoe is divided into three sections from front to back: toe section 400, forefoot section 402, and heel section 404. Foot 418 is for nominal size 8 US. As such, the nominal width of display front curved spring 410 is 4 inches, and the nominal width of display rear curved spring 408 is 3 inches. The nominal width of inside curved spring 412 and of outside curved spring 406 is 1 inch. Boundary for inside heel clearance 416 defines the area inside that boundary for which there is heel clearance as the foot (and especially the heel) in the air passes the planted foot during walking or running. Base inset 414 shows that the heel is narrower than the forefoot. Toe hinge 420 defines the front edge of display front curved springs 410, and it defines the front of the adjacent inside curved spring 412 and of the adjacent outside curved spring 406. There are three tables which provide data for spring strengths to be used for optimizing the spring system strengths in shoes: Table 1. Comparison of Spring Strength vs Deflection for Various Materials, Table 2.

Summary of Spring Strengths for Heel-Pop Shoes and for Conventional Shoes, and Table 3. Calculation of Spring Strengths for Heel-Pop Shoes and for Conventional Shoes.

Accordingly, for the heel-pop shoes of FIGS. 1-9, e.g., in view of FIG. 25, there are 4 inches of underfoot spring width available from forefoot section 402 and 3 inches of underfoot spring width available from heel section 404. That is a total of 7 inches of underfoot spring width. At the same time, there are 2 inches of side spring width available from forefoot section 402, and there are 2 inches of side spring width available from heel section 404. As shown in Table 2. Summary of Spring Strengths for Heel-Pop Shoes and for conventional Shoes, like values for spring width are used to calculate the available strengths for three types of shoes, namely for curved-spring heel-pop shoes, for parallelogram heel-pop shoes, and for conventional shoes. These spring strength calculations are done for the underfoot springs and for the side springs. For example, the first entry in Table is for curved-spring heel-pop shoes which use curved springs (see FIGS. 4-6). Nonlinear finite element analysis (fea) was done for these springs to calculate the maximum spring strength achievable at a 2" spring deflection (height) as 180 lbs for a 1" width spring. As Tables 1-4 show, the preferred material by far is now Kevlar, followed by Spectra Shield and fiberglass. Thus, the fiberglass spring strength for 7 inches of available spring width is 1260 lbs as shown in Table 3. Assuming that a 150 lb runner is running with a maximum ground reaction force of 3 gees, 450 lbs of spring strength is needed, the available force is 2.8 times 450 lbs, or 280%. In like manner, the available spring strengths are calculated for parallelogram heel-pop shoes of FIGS. 7-9 which use curly v-springs 96 or the aforementioned rolling version of mirrored arched spring 80, and for conventional shoes which used a combination of mirrored arch springs 80 and curly-v-springs 90, The results of the spring strength calculations of Table 2 are
summarized in Table 3. Those entrees related to gear change will be discussed below in the passages describing gear change. With reference to FIGS. 7-9 for parallelogram heel-pop shoes, which can use either three curly v-springs 96 or which can use the aforementioned rolling version of mirrored arched spring 80, and with reference to FIG. 25, there are 4 inches each of available spring width from the two curly v-springs 96 of forefoot section 402 and 3 inches of available spring width from heel section 404, for a total of 11 inches. Each inch of spring width provides 90 lbs, so the total spring strength is 990 lbs, or 220% of what is needed. In like manner for conventional shoes, with reference to FIG. 25 and tables 2 and 3, springs can now be located in toe section 400 both underfoot and on the sides. Mirrored arch springs 80 are used in forefoot section 402, while curly v-springs 96 are used in toe section 400 and heel section 404. Thus, there are 4 inches of available spring width in forefoot section 402 and 7 inches of available spring width from toe section 400 and heel section 404. This provides a total of 1350 lbs of spring strength, or 300% of what is needed.

The fifth embodiment of the invention is a structure and method to automatically change the spring stiffness of the shoe while the user is running or walking. This is referred to herein by the short-cut term of "gear change" of the shoe because that term is more easily understood. We have already seen where side springs can be located outside the shoe sole in the discussion of FIG. 25. Gear change cannot be achieved by using only display front curved spring 410 and display rear curved spring 408 because these are underfoot. This means that these springs must always act to resist sole compression. In the case of side springs, it is possible to disengage them so that the runner's foot, via footplate 3, does not act against them. Thus, by engaging and disengaging these side springs, the shoe gear (effective stiffness) can be changed.

Consider the following example of the side spring strength needed to change gears by a factor of three. Basically, this means that two-thirds of the total spring strength needs to be provided by the side springs. The total spring force is 450 lbs (3 gees for a 150 lb runner). Thus, the side springs must provide 300 lbs of force. With reference to Table 3, this explains the value of 300 lbs used there—that must be supported by the side springs. Note again that we have 2.4 times as much spring force as is needed for both the curved-spring heel-pop shoe and conventional shoes, and 1.8 times as much spring force as is needed for conventional shoes. Notably, these values are doubled to 4.8 and 3.6 with spring nesting. Thus, the use of fiberglass for these springs makes possible a gear change ratio that is quite acceptable since these values exceed the above value of a factor of 3. So now that we know we have enough spring strength, how do we change gears? FIG. 26 shows a schematic drawing of a mechanism to accomplish this goal, in three views for one side of the shoe. Of course, this mechanism is on both sides of the shoe, and the gear change must be synchronized on both sides. Now Kevlar or Spectra Shield give even more favorable results than fiberglass.

FIG. 26 shows schematically a side view, a top view, and a front view of gear change side spring assembly 450, and it shows schematically a side view and a front view of compressed gear change side spring assembly 452. These are located on either side of the shoe within the side constraints indicated by FIG. 25. Spring frame 458 is rigidly attached to the side of footplate 3; it extends upward to rigidly connect to drive shaft 468 which extends out toward the side. Three drive bars 472 are rotatably connected to drive shaft 468 via bar holes 460, and these hang down from drive shaft 468. Directly below each drive bar 472, there is located side mirrored arch spring 462, which is mounted on top of groundplate 5 and which comprises a top half and a bottom half rotatably connected to each other by arch spring pivot 464. For example, a 1" wide spring could be sliced into three springs, ⅓" wide. Lock hole 466 is in the top of drive bar 472 above bar hole 460, and it is oriented perpendicular to it.

Compressed gear change side spring assembly 452 shows the configuration in which two of the three side mirrored arch springs 462 have been compressed, while the third one has been disengaged and, hence, not compressed. In other words, a particular total spring strength has been selected, which corresponds to a particular gear having been selected. In particular, the two outside drive bars 472 have driven downward the two outside compressed mirrored arch springs 476 below them. Note that compressed mirrored arch spring 476 is simply a side mirrored arch spring 462 that has been compressed. At the same time, inside drive bar 472 has disengaged so that its side mirrored arch spring 462 has not been compressed. The method of disengagement is shown in assembly the top view and in the side view of compressed gear change side spring assembly 452.

Housing 480 is rigidly connected to the top of spring frame 458, and it houses length actuator 482, which in turn moves shaft bar 478 forward and backward. There are three lock shafts 470, one for each drive bar 472. Each lock shaft 470 is rigidly attached to shaft bar 478 at staggered lengths so that each of them passes through its lock hole 466 (in drive bar 472) at different times as shaft bar 478 is moved forward and backward. When lock shaft 470 enters lock hole 466, drive bar 472 cannot rotate out of the way of side mirrored arch spring 462, in which case drive bar 472 drives side mirrored arch spring 462 downward to the compressed state of compressed mirrored arch spring 476. Otherwise, drive bar 472 is free to rotate to the configuration of rotated drive bar 474, in which case its side mirrored arch spring 462 is not compressed. That is to say, the gear is not engaged.

The other elements of this gear change mechanism are microprocessor 484 and force sensor 486. These are electrically connected to length actuator 482. These elements are shown only in the top and side views, in schematic fashion. Microprocessor 484 controls the motion of length actuator 482 so as to change gears, and it could be located in a number of places, but probably it would be mounted on spring frame 458 close to housing 480. Shoe power source 488 can also be located in housing 480. Force sensor 486 is located at the bottom of groundplate 5 so that it can measure the ground reaction force of running or walking. The gear change method proceeds as follows. Its function is to maintain the total spring strength at a level at which sole deflection is maximized. Micro processor 484 has a look-up table which looks at a measured force and sends a signal to length actuator 482 to move to a position at which the optimal gear (that is equivalently, the optimum number of engaged drive bars 472) is selected for the very next stride. Remember that an engaged drive bar 472 corresponds to a compressed mirrored arch spring 476. The example shown, with three side springs, could permit the following gears. The weakest gear (total spring strength) would be the strength of the underfoot springs, e.g. 1 gee. Then, each individual side spring could add 0.7 gees, in which case the four gears would be 1 gee, 1.7 gears, 2.4 gees, and 3.1 gees. Remember from tables 2 and 3 that there is plenty of strength to achieve these spring strengths with the various combinations of arch springs described herein. Thus, the gear change allows the sole to fully compress for four levels of impact force, and the performance of the shoe is automatically optimized over a range of running impact forces.

FIG. 27 shows schematic side views of a tensioned linkage rotating arms curved spring. That is, it shows schematic side views of an optimal spring for a rotating arms joint which is the third embodiment of the invention. Tensioned links rotating arms curved spring 500 comprises top arm 510 hingeably connected to bottom arm 512 by arm hinge 514. Compressed mirrored double linkage curved spring 516 is hingeably connected to bottom arm 512 and top arm 510, and it comprises mirrored double linkages 131, which comprise curved spring 127—
hingeably connected to top arm 510 (e.g.) and hingeably connected to one of the two double links 125. The two double links 125 are hingeably connected by double hinge 126, and the other double link 125 is hingeably connected to the other end of curved spring 127 where it hingeably connects to top arm 510. Adjust spring 133 is tethered to arm hinge 514 by adjust tether 504, and it is tethered to top arm 510 by arm tether 508 via one of its curly v arms. Refer to curly v-spring 96 of FIG. 10. Any of the other curly v type versions of optimal springs herein can be used as well. Curved arch pivot 518 connects the mirrored curved springs 127. Monolithic arch hinge 187 of FIG. 15 can be used here as well as conventional hinge with shafts and bearings. The view of compressed mirrored double linkage curved spring 516 shows that double linkage 131 has compressed so that the mirrored double hinges are impinging, and thereby double linkage 131 is spreading curved spring 127 to resist the folding of top arm 510 with respect to bottom arm 512 about arm hinge 514. Also, adjust spring 133 is now engaging top arm 510 and bottom arm 512 to prevent the torque exerted by tensioned links rotating arms curved spring 500 (to resist the folding about arm hinge 514) from going to zero. Adjust tether 504 prevents adjust spring 133 from sliding away from arm hinge 514 during compression. Thus, the torque force curve can be made constant, in a manner analogous to how the force curve in FIG. 14 remains constant for 1$^{st}$ double link-spread curved spring 122. The advantages for the various optimal springs herein also apply for tensioned links rotating arms curved spring 500. The maximum torque value is minimized for a given energy necessary to fold the arms. This reduces the wear and tear on the device, and it minimizes the impact force in running for the application of ankle joints or knee joints—for orthotics, prosthetics, robots, and mechanisms in general.

In a manner analogous to the gear change capability of FIG. 26, multiple tensioned links rotating arms curved springs 500 can be arranged side by side as torque elements in such a manner that one or more can be engaged or disengaged to, in effect, change gears for the spring resisted folding device (namely tensioned links rotating arms curved spring 500). Likewise, sensors can be used to
determine when the spring—resisted folding device has the resistance elements engaged. For applications such as an ankle joint or a knee joint, all curved springs 127 must be disengaged during the swing phase when the runner's feet are not in contact with the ground. A microprocessor uses this sensor information to determine when these resistance elements should be re-engaged just before foot impact, and how many are re-engaged. A ratchet device might be incorporated in case the folding joint does not always straighten the same amount before foot impact. That is, the knees may remain more bent at heel-strike. Or, more practically, these springs can be engaged only after the runner's knees have already bent somewhat. All these adaptations of the gear change device of FIG. 26 can be made by one of ordinary skill in the art, and all of the features of the gear change device of FIG. 26 can be adapted to a gear change application of tensioned links rotating arms curved spring 500. Also, the gear changer designs of FIGS. 37-42 can be adapted to the optimal spring for rotating arms joint of FIG. 27. The precise electro automatic gear changer designs of FIGS. 37 and 38 are very valuable for robotic applications where energy efficiency is the key to increasing the range of robots before they run out of their energy source. Likewise, the impact generators of FIGS. 44 and 45 can be used to extend this range. Finally, the pulley actuators of FIGS. 46 and 48 are probably the most applicable to changing "gears" for the rotating arms designs, and FIG. 47 demonstrates an optimal hinge in this regard.

This changing gears (effective spring strength) is analogous to the human brain recruiting a variable amount of muscles fibers acting about the human joints, as the force level changes.

FIGS. 28, 29, and 30 depict schematic side views at heel strike, mid-stance, and toe-off of a linkage-spread curved-spring heel-pop shoe with revised linkage, which provides enhanced heel lift—which in turn provides substantial energy return. These correspond to FIGS. 1, 2 and 3. And, the spring-linkage system in FIGS. 1-3—comprising double linkage 131 and both front curved spring 60 and front curved spring 62—is now replaced by revised link-spread/curved-spring linkage 521, which comprises the following elements: top spreading link 520, bottom spreading link 522, spreading link pivot 524, front mono top 3-link pivot 526, uncompressed top link-to-spring connection 528, compressed top link-to-spring connection 530, uncompressed bottom link-to-spring connection 532, compressed bottom link-to-spring connection 534, and two revised linkage curved springs 540 for front curved spring 60 and front curved spring 62. There are two equivalent revised link-spread/curved-spring linkages 521—one in the front and one in the rear. FIGS. 28-30 show how revised linkage curved springs 540 and the linkage comprising top spreading link 520, bottom spreading link 522, and spreading link pivot 524, straighten out as linkage-spread curved-spring heel-pop sole 73 compresses (in FIG. 29), and then these linkage elements unfold to their original configuration in FIG. 30 at toe-off.

The new spring-linkage system of FIGS. 28-30 ensures that the vertical load force between both mid footplate link 53 and end footplate link 55 against groundplate link 57 acts only to spread both front curved spring 60 or front curved spring 62, which are now designated revised linkage curved spring 540 in both cases—because their construction has become much more sophisticated. If that were not the case, then the force curve would become more linear. Note that the component of force exerted by top spreading link 520 and bottom spreading link 522 (perpendicular to the line between the ends of front curved spring 60) goes to zero at full compression of linkage-spread curved-spring heel-pop sole 73. This is the condition for its force curve to bend over—that is, for its slope to decrease to zero and to then become negative. As was explained in detail for FIGS. 1-3, auxiliary springs such as adjust spring 133 are also incorporated so that the force curve of the combined spring system can be made to approximate a constant force curve. This provides for the most optimal force curve—to minimize the maximum force of the combined spring system. With regard to the spring-linkage system of FIGS. 1-3, it should still provide an optimal force curve, but then the lengths of double linkage 131 must be chosen very carefully—to be large enough to ensure that the spreading force dominates the force curve. And, if these lengths are too large, this will compromise how large the compression ratio can be. The improvements of FIGS. 28-30 make the design more robust.

The explanation of how this design functions to provide enhanced heel-lift and to prevent toe-sink are the same as that explanation previously provided for FIGS. 1-3. Top spreading link 520 is pivotally connected to bottom spreading link 522 by spreading link pivot 524, which is necked down. The link-to-spring
connections are shown FIG. 28 and FIG. 29 for the uncompressed and compressed
configurations—namely uncompressed top link-to-spring connection 528,
compressed top link-to-spring connection 530, uncompressed bottom link-to-spring connection 532, and compressed bottom link-to-spring connection 534. The details of these link-to-spring connections are shown as blow-up views in FIG. 31. Details of Revised One-Sided Curved-Spring Linkage. The detailed construction of revised linkage curved spring 540 from FIGS. 28-30 are shown through its component parts—inner plies curved spring part 542 and continuous loop outer ply of curved spring 544. Note first that one way to make revised linkage curved spring 540 is to first make inner plies curved spring part 542 and then to insert that into continuous loop outer ply of curved spring 544. In this way the splice for continuous loop outer ply of curved spring 544 can be located away from its top or bottom, and the end loop attachments are optimally strong. In 31A,
Uncompressed Top Link-to-Spring Connection, the end of top spreading link 520 is interleaved (across its width) with top end loop 554 of continuous loop outer ply of curved spring 544 in such a manner that (via pivot rod 546 which is slid in sideways through hole in the end of top spreading link 520 and through top end loop 554 of continuous loop outer ply of curved spring 544), top spreading link 520 pushes the top end of revised linkage curved spring 540 apart from the bottom end of revised linkage curved spring 540 (that is the curved spring is straightened out). Note that continuous loop outer ply of curved spring 544 features loops at its top and bottom ends formed by its outer plies. At the location where these plies come together there is a section (top end bending section 558) of continuous loop outer ply of curved spring 544 which wraps and unwraps around top wrap-around form 548—as revised linkage curved spring 540 becomes more uncompressed (more curved). In 31C, Compressed Top Link-to-Spring Connection shows how top end bending section 558 straightens as revised linkage curved spring 540 compresses (becomes straighter) under the spreading action due to the opposing force—of top spreading link 520 and bottom spreading link 522—on these top and bottom loop sections of continuous loop outer ply of curved spring 544. The crux requirement of this design is to limit how sharply top end bending section 558 bends between the state of full uncompression to full compression. The larger the radius of top wrap-around form 548, the less sharp is this bending. Also, the thinner that top end bending section 558 is, then the more fatigue cycles it can bend without breaking. The limit on how thin it can be is that its tensile strength must be large enough to withstand the pull of the end of top spreading link 520 at full compression. A third way to increase the number of fatigue cycles for top end bending section 558 is to incorporate a more flexible or plastic or rubber matrix material in this fiberglass composite. This is viable since the composite elements are being stressed primarily in tension (at full compression) and since fiberglass composites are stronger both in bending and especially in tension. These conditions of bending and tension can be seen to apply via the opposing direction of link end force arrow 550 with respect that of to curved spring end force arrow 552. The same considerations apply in 31B, Uncompressed Bottom Link-to-Spring Connection and in 31D. Compressed Bottom Link-to-Spring Connection—for the bottom end pivoting of the link-to-spring connection. In this case, bottom end bending section 560 can be seen to be bent slightly around bottom wrap-around form 549, and then to straighten at full compression—than is the case for compressed top end link-to-spring connection 530 (in FIG. 29). Also, the link at play here is bottom spreading link 522 which connects to bottom end loop 556—so these have to be interleaved as well. Note that all of these elements in this paragraph extend across at least a portion of the width of the shoe. Also, looking at FIG. 28, note that bottom spreading link 522 now acts as the front and rear sides of the sole parallelogram structure, and mid footplate link 53 acts as the top side and groundplate link 57 acts as the bottom side. Clearly, there needs to be a hingeable connection between these four sides. Accordingly, in the front and rear, revised link-spread/curved-spring linkage 521 is connected at the top to mid footplate link 53 by link pivot attachment 536, which is an upward extension of spreading link pivot 524 into to mid footplate link 53. And in the front and the rear, revised link-spread/curved-spring linkage 521 is connected at the bottom to groundplate link 57 by wrap-around form attachment 538 which is a downward extension of bottom wrap-around form 549 into groundplate link 57. These attachments can be made in various ways with stitching, or glue, or mechanical means—in a manner obvious to one of ordinary skill of the art. In summary, these details enable the linkage-spring system of FIGS. 28-31 to withstand a sufficiently large number of fatigue duty cycles. Note with regard to FIG. 1 that front mono top 4-link pivot 61 is now is changed to front mono top 3-link pivot 526 because revised link-spread/curved-spring linkage 521 is now performing the necessary pivoting with respect to mid footplate link 53 and groundplate link 57. This is also true for rear mono top 3-link pivot 63.

FIG. 32 shows schematic side views of revised linkage-spread ring spring 561—for both the uncompressed state (internal linkage mirrored arch spring 107) and the compressed state (compressed internal linkage mirrored arch spring 109). The only change from FIG. 13 is that now center link 113 pushes against load surface 90 (at the top and at the bottom) via interleaved center-link load element 562—which is interleaved with respect to multi-plied composite ring 564, which in turn now constitutes upper arch 110 and lower arch 111. Center-link load force arrows 570 indicate this vertical force. The important point is that load surfaces 90 do not now act directly against the top of upper arch 110 or against the bottom of lower arch 111—thereby ensuring that the vertical load force curve (due to just the action of mirrored spreader linkage 115 to spread monolithic mirrored arches 108) is not linear. Rather, it bends over and then decreases. Now, load surfaces 90 now act directly against center link 113 (at the top and bottom) via interleaved center-link load element 562—acting only to spread the ring spring comprising upper arch 110 and lower arch 111. Inside linkage partial springs 117 of FIG. 13 are not shown in FIG. 32, just to simplify this depiction. Of course, they would be included in FIG. 32, and they would be located between upper and lower center links 113. Or, they could be located adjacent to internal linkage mirrored arch spring 107. Their purpose is to increase the total combined force curve due to both inside linkage partial springs and due to internal linkage mirrored spring 107 so that it remains approximately constant as the force due to internal linkage mirrored spring 107 begins to decrease. And, of course the spacing between load surface 90 and center link 113 will be minimized.

The other feature of note in FIG. 32 is the multi-ply construction shown as multi-plied composite ring 564. As was described at length for FIGS. 13 and 15, the preferred material is fiberglass because it has the highest strain limit, which in turn makes it of the order of ten times stronger based on non-linear finite element studies of candidate materials. Even so, novel measures must be used to maximize the number of pivot (compression) duty cycles before fatigue failure. The non-linear finite element study of Tables 1-3 shows that it is entirely possible to accommodate the amount of bending of the entirety of multi-plied composite ring 564 needed for the shoe application. However, the amount of bending at the horizontal sides (the pivot locations) requires additional measures to prevent fatigue failure. More flexible wrap-around impinger section 566 wraps around the cylindrically round surface of impinger link 112 during spring compression. The diameter of this wrap-around limits how sharply more flexible wrap-around impinger section 566 must bend at full compression. Another way to reduce bending fatigue is to drop plies in more flexible wrap-around impinger section 566, as shown with necked down natural hinge 572. Finally, as mentioned above, it is also possible to incorporate a more flexible or plastic or rubber matrix material in this fiberglass composite for this section. Other candidates for a more flexible matrix include polyurethane elastomers, silicone elastomers, or even nylon. This design is viable since more flexible wrap-around impinger section 566 is being stressed primarily in tension at full compression, and fiberglass composites are stronger in both bending and especially in tension. As was mentioned above, the linkage in both FIG. 32 and FIG. 13 will preferably be replaced by cut-out monolithic mirrored spreader linkage 183 of FIG. 15. The very significant advantage of the designs of FIGS. 13, 15, 28, 29, 30, 31 and 32 is that shafts and bearings are eliminated in the construction of the pivots of these linkage-spread curved-spring systems. This simplifies and lightens their construction considerably. When combined with inside linkage partial springs 117 of FIG. 13, the result is an optimal, constant force spring which is easy to manufacture because no shafts or bearings are required for the linkage pivots. This optimal spring can be used for a host of applications in industry. By reducing the maximum force by as much as 40%, comfort is dramatically improved, and injury reduction is dramatically reduced for shoe applications. Also, the lifetime of a device is increased for industrial applications. And, the "order of magnitude" increase in strength by using fiberglass results in dramatic lightening. Finally, these optimal springs can be inexpensively manufactured. Of course, now Kevlar—followed by Spectra Shield—give even more favorable results than fiberglass.

The goal of the design of the flex/strong embodiment of FIGS. 33-36 of the instant application is to modify the ring spring of FIG. 32 in such a manner that it becomes both stronger and tougher, whereby the term tougher means that the new ring spring is capable of absorbing significantly more energy before breaking. A key motivating fact is that the bending strength of a curved or straight (diving board) plate goes as the thickness cubed. Thus, the motivating goal here is to use geometry to, in effect, make the plate thicker. This goal is accomplished with a layup in which adjacent arms of the spring are separate, one from the other, at the neutral uncompressed state, as shown in FIG. 33. However, these arms gradually merge during compression. The thickness of each arm is maximized so that it can just barely fully flatten out—and still maintain a tolerable stress level—at full spring compression. Call the maximum strength at full compression of the ring spring with this single arm, Si. For two independent and separate arm ring springs, their combined full compression strength is 2Si. Note that whenever a plate bends, one side is in tension, and the other side is in compression, and there is a neutral plane near the center which is neither in tension or in compression. For the case of the ring spring, the layers at outside surface are progressively more in compression, and the layers at the inside are progressively more in tension—as the ring spring compresses. This is true within each of the two arms shown, namely inner arch arm 609 and the outer arch arm 611. The basic idea of the flex/strong structure is that a separate two-armed (or multi-armed) structure (in this case a ring) transitions to a single armed structure of twice the thickness of each arm, during compression. Note, each arm is at its own maximum thickness for the flexing corresponding to the flattening out of the ring spring, but each arm can flex much more separately than fused. A double thickness ring spring would have long since "stressed out" (broken) at full compression. However, since the two arms only fully merge at full compression, they do not break while merging (and flexing more). The result is that, at full compression, the merged spring strength is that of that of a double width arm, which is nominally eight times that of the single width arm, namely the strength Si. Thus, the ratio of strength of the fully compressed merged arms of FIG. 33 to simply two unmerged arms is 8Si/2Si=4. That is, this ratio goes as the number of laminates (arms) squared. Thus, by induction if there are three laminates, the spring strength ratio is 3 squared=9, e.g. That is by induction, this ratio for n layers is n squared. Of course, if the spring might be further compressed it would break, but it can't be further compressed as it has flattened out. In effect, more stress energy is stored in this spring. Hence, it is much tougher as well. Note that it may be beneficial to use somewhat thinner arms in this construction so that the arms can flex more as they fully merge.

Accordingly, merging arms internal linkage spring 600 is constructed as follows. First, note that the basic components and function of internal linkage mirrored arch spring 107 have already been discussed in the discussion of FIG. 32 herein. So we will only discuss the changes of FIG. 33. Now the ring spring feature comprises upper multi-armed arch 602 and lower multi-armed arch 604 which are pivotally connected via enhanced natural hinges 606 on either side. Each of upper multi-armed arch 602 and lower multi-armed arch 604 comprises inner arch arm 609 and outer arch arm 611. Outer arch arm 611 bows out and separates from inner arch arm 609 in such a manner that it is sufficiently longer so that upper multi-armed arch 602 and lower multi-armed arch 604 merge at full spring compression, as indicated by the partial compression shown in FIG. 34, where there is already substantial merging. That is, inter-arm void 614 has already shrunk considerably. Note that optional void ridges 616—on the adjacent surfaces at one or both sides of inter-arm void 614—act to prevent slippage of the adjacent surfaces of inner arch arm 609 and outer arch arm 611. This serves to make the force curve of merging arms internal linkage spring 600 harder. Or, also optionally, a low friction coating can replace void ridges 616—to make said force curve softer by allowing slippage of these adjacent surfaces during merging.

The details of enhanced natural hinge 606 are shown in the exploded schematic side views of FIG. 35, namely FIG. 35A for the uncompressed state and FIG. 35B for the compressed state. That is, FIG. 35A shows FIG. 35A Exploded view uncompressed of enhanced natural hinge 618, and FIG. 35B shows FIG. 35B Exploded view compressed of enhanced natural hinge 620—as indicated in FIG. 33 and FIG. 34. Thus, enhanced natural hinge 606 comprises outer continuous hinge layer 612 which is a continuation of the inner one of the sub-layers of outer arch arm 611 and which is partially folded in the region between the adjoining ends of inner arch arm 609 and outer arch arm 611. The other sub-layer, that connects upper multi-armed arch 602 with lower multi-armed arch 604, is inner continuous hinge layer 610 which is the innermost one of the sub-layers of inner arch arm 609. As can be seen by also viewing FIG. 35B for the compressed state, impinger link 112 impinges (in the direction indicated by impinger load force arrow 568) first inner continuous hinge layer 610 and then outer continuous hinge layer 612, during which time both of these wrap around impinger link 112. Since outer continuous hinge layer 612 is on the outside of this impingement, it would be stretched more except for the fact that it is longer. In this way, both inner continuous hinge layer 610 and outer continuous hinge layer 612 share the load of resisting this impingement without the latter being stretched more and breaking. A calculation shows that the tensile strength of just these two layers is large enough to resist the force of just this impingement without breaking. The reason for using a thinner set of layers here is that fiberglass is inherently brittle, but the thinner the wrap around layer, the less brittle it is. Another provision that can be taken is to actually eliminate the fiberglass matrix for inner continuous hinge layer 610 and outer continuous hinge layer 612 just in the vicinity of the pivot, in which case they are even less brittle. Or, they may be impregnated (infused) with a softer more rubbery matrix for their protection from abrasion. At the same time, these two layers extend all the way around merging arms internal linkage ring spring 600 so that there is no problem with attachment in tension between the main body of the ring spring and the connective elements at the pivot regions. Again for emphasis, this continuous connection, and the provisions to make the pivot elements, solve the daunting problem of making a pivot section which does not break even with a high number of duty cycles. Also, hinge sheath 608 can optionally be glued to the outer and inner sides of merging arms internal linkage ring spring 600 in the vicinity of the pivots—to prevent abrasion and to prevent dust and dirt from entering the inner region of enhanced natural hinge 606. Note also that these blow up drawings show inter-arm void 614 and void ridges 616 during the merging. The action of mirrored
spreader linkage 115 and impinger link 112 was explained in the discussion herein of FIG. 32. Finally, the improvements of the pivots shown in FIGS. 33-35 can as well be used in the ring springs of FIGS. 13, 15, and 32. These include enhanced natural hinge 606 of FIG. 35 and more flexible wrap-around impinger section 566 of FIG. 32. Also, now the preferred fiber composite material for the springs is Kevlar.

FIG. 35C depicts the top left quadrant of the ring spring of FIG. 35A, at the uncompressed state for three options— for the creation of voids between inner arch arm 609 and outer arch arm 611. It also depicts the top half at both uncompressed and almost fully compressed states for late void option 634 for the creation of voids between inner arch arm 609 and outer arch arm 611. The option shown in FIGS. 33 and 34 is middle void option 622, in which middle void 628 is in the middle and the adjacent surfaces of inner arch arm 609 and outer arch arm 611 touch on either end. In top void option 624, top void 630 is at the top of the quadrant, and in side void option 621, side void 626 is on the side of the quadrant. The idea behind late void option 634 (showing late void 632) is to delay the merging of inner arch arm 609 with outer arch arm 611 until merging arms internal linkage ring spring 600 is almost fully compressed—as shown in compressed late void option 636. This delay is accomplished by refining the shapes of the curves of the two arms. The advantage here is that more energy is absorbed while inner arch arm 609 and outer arch arm 611 are bending before the merging occurs (late along most of their lengths, just as this merging arms internal linkage ring spring 600 fully compresses). Again, as is the case for all of these void options, for the portion of the arm lengths that are merged, the bending strength (and the corresponding load capability) is greatly increased—proportional to the thickness cubed. That is, if two laminate arms are used the increase is by a factor of eight. More laminates of number n can be used, in which case this increase is by a factor of n cubed. Of course, once the merging is complete, that portion of the length cannot bend much more, but still it is much stronger. Note that each of these options will give slightly different force curves, and the choice of options depends on the application. In summary, this merging approach, to making structures more flexible and stronger, provides greatly enhanced energy absorption with greatly enhanced strength at full compression.

FIG. 36 shows schematic side views of overlaid continuous merging laminates beam 668 (which is uncompressed) and compressed overlaid continuous merging laminates beam 670. It is referred to as a beam, but it might also be called a compressible plate, or it could be configured to be curved in its compressed or uncompressed state. It might also be loaded in various ways. Also, the initial and/or final configurations may involve some combination of being bent or compressed. The basic idea is the same as for the embodiment of FIGS. 33-35. Overlaid continuous merging laminates beam 668 comprises two continuous merging laminates beams 672, one above the other, which are undulating and which are offset with respect to each other so that highest point of the upper one faces the lowest point of the lower one. Also, the lowest point of the upper one is above the highest point of the lower one, as if they are 180 degrees out of phase. Each continuous merging laminates beam 672 comprises repeating sections, which are merging laminates beam sections 651, and each of which transitions to compressed merging laminates beam section 650 at full compression. The lower and upper continuous merging laminates beams 672 are fixably attached one to the other at interlaminate attachment sections 678, which correspond to the lowest points of each upper merging laminates beam section 651. Each merging laminates beam section 651 comprises two or more layers, in this case three layers. It is difficult to see this in the drawing, but the explanation makes it clear that two or more merging layers can be used for each laminate, and these separate progressively more. Draw an imaginary construction straight line
connecting the lowest edge of merging laminates beam section 651. Each adjacent layer bulges progressively more upward going further from said construction line—in such a way that each layer separates further from its neighbor at the center of each bulge—in the uncompressed state. As overlaid continuous merging laminates beam 668 compresses to become compressed overlaid continuous merging laminates beam 670, each layer merges with its neighbor. This is one merging action. The other is the merging of each two continuous merging laminates beams 672, so that when they are fully compressed, the combined beam acts as a single beam with the width of six layers. Since the beam strength goes as the thickness cubed, the beam strength of this full width straight beam is (6 cubed) greater,
which is 216 times the strength of a beam which is a just a single layer wide. The beam strength comparison with six independent layers is the number of layers, six, squared, or 36. This is the same n-squared ratio (n=6 here) as was the case for the embodiment of FIGS. 33-35. Note well that the amount that each layer is flexing is much more than the amount that a single beam of a six times greater width can flex. Thus, much more stress energy is stored amongst the six layers, and as overlaid continuous merging laminates beam 668 transitions to compressed overlaid continuous merging laminates beam 670, this resultant compressed beam is thus much tougher than a simple beam of width six times the width of a single layer. Note that for the comparison for the beam strength of the two laminates (each comprising the three layers) the ratio value is two squared, or four. Finally, the overlaid configuration ensures that there are no weak seams for applications such as body armor, where this is a very important consideration. The top section of FIG. 36 shows mirrored overlaid continuous merging laminates beam 674 which compresses to mirrored compressed overlaid continuous merging laminates beam 676. The configuration is simply the combined mirror image of overlaid continuous merging laminates beam 668. Thus, the comments immediately above apply here, as the structure compresses to a "straight" compressed state. Depending on the practicality of a given application, the number of such laminates can be increased indefinitely—with a corresponding increase in beam strength and toughness. Note also that the merging occurs late for the designs of FIG. 36, in a similar fashion to the late merging void option shown in FIG. 35C, and this "lateness" can be
enhanced to allow the structure to absorb even more energy before it becomes extremely strong and rigid at full compression. This bodes well for applications such as body armor. Also, the structure as a whole can flex very well. The overlaid merging laminates structure can be laid up running vertically and around a manikin mold so that there are no seams of weakness. Furthermore, this structure can be used to construct both the web and the flange of I beams so that these can flex, and, in similar fashion, the same can be done for other typical types of beams.

FIG. 37 shows schematic side views of side electro auto gear assembly 680—for the case of the maximum effective spring strength and for the case of a partial effective spring strength (~⅓)—for both the uncompressed and compressed sole states. There is an electronic gear changer for FIG. 26, but the design of FIG. 37 is a distinct improvement. First we will explain the full spring strength configurations of full spring strength (gear) configuration 677 and compressed full spring strength (gear) configuration 678 (shown in the bottom half of FIG. 37). This design is referred to as side electro auto gear assembly 680, and there are four configurations of it in FIG. 37. It is preferentially located on the outside of the runner's shoe, but it could also be located on the inside. Any springs used for gear change for a shoe cannot be located under the runner's foot because then it is not be possible to disengage the spring to reduce the effective spring strength. Footplate 3 and groundplate 5 define the uncompressed sole thickness. Ramp 696 is fixably attached to groundplate 5. Ring spring 708 is the generic designation of the spring type as shown in FIG. 32 of the instant patent as revised linkage curved spring 540 or as shown in FIG. 13 as internal linkage mirrored arch spring 107. Ring spring 708 is fixably attached to ramp 696, and it is tilted backwards at its top. (The right side in FIG. 37 is the back side of the shoe.) Lever post 692 has a horizontal part at its bottom which glides forward and backward within post guide 694, which is fixably attached to groundplate 5 via groundplate attachment 695. This is how the "gear" is changed. Lever 688 rotates downward about lever hinge 706, which is located at the top of lever post 692. Lever ratchet 690 is located on the bottom of lever 688. End lever catch 700 is rotatably connected to the end of lever 688 by catch holder 704 which is sufficiently stiff so that end lever catch 700 does not engage lever ratchet 690 unless lever 688 is pulled downward from its horizontal position by the action of footplate 3 moving downward during foot impact. End lever catch 700 engages footplate ratchet 691 (on the bottom of a portion of footplate 3) so that the downward motion of footplate 3 always pulls the end of lever 688 all the way down when footplate 3 is fully compressed (which is the goal of the gear change optimization). Note that there is a stop (not shown) which prevents lever 688 from rotating upward beyond horizontal, and there is a spring (not shown) which biases lever 688 back to horizontal after foot impact. Engage-spring bolt 686 is fixably attached to the top of ring spring 708, and it extends across the width of the same. Ring spring pivots 710 hingeably connect the top and bottom halves of ring spring 708. Note that the top of ring spring, to which engage-spring bolt 686 is connected, has been rotated clockwise so that the diameter construction line from this top through the center of ring spring 708 is perpendicular to the surface of ramp 696. The reason for this tilting and for this ramp is to better align the motion of the end of lever 688 (an arc) with the straight line motion of engage-spring bolt 686, as ring spring 708 is compressed. Moving lever catch 702 rotatably connects engage-spring bolt 686 to lever ratchet 690 via catch holder 704 which is stiff enough to position catch holder 704 from engaging lever ratchet 690 when lever post 692 moves back and forth in the non-impact phase of the running cycle. The casing of electro-actuator 698 is fixably attached to groundplate 5 via groundplate attachment 695. The moving part of electro-actuator 698 is fixably connected to the bottom of lever post 692, which it moves back and forth to change gears.

Accordingly, the gear change is accomplished as follows. The actuated horizontal motion (forward and backward) of lever post 692 is freely accomplished only in swing phase when the foot is in the air and when end lever catch 700 and moving lever catch 702 are disengaged from their respective ratchets. Note that the term ratchet is used because it is familiar. However, a ratchet surface typically means that the relative motion is allowed in one direction only. For the purpose of this application, this relative motion is not allowed in either direction, so a
triangular tooth shape can be used as well. Here, this relative motion is allowed because these two catches are moved away from the "ratchet teeth" during swing phase. For the bottom two sub-figures in FIG. 37, lever post 692 has been moved so that moving lever catch 702 is at the end of lever 688. This corresponds to the strongest gear when ring spring is fully compressed—as shown in compressed full spring strength (gear) configuration 678 where moving lever catch 702 has pulled down engage-spring bolt 686 to fully compress ring spring 708. For the top two sub-figures, lever post 692 has been moved forward so that moving lever catch 702 is much closer to lever hinge 706—as shown in partial spring strength (gear) configuration 679 and compressed partial spring strength (gear) configuration 681. Now, even though lever 688 has been pulled all the way down, the motion of moving lever catch 702 is much smaller because it is positioned further up lever 688. Therefore ring spring 708 is compressed much less. This corresponds to a weaker effective spring strength (gear) of one-third the spring strength. This demonstrates the essence of the gear changer.

FIG. 38 shows all three schematic views of the precise electro auto gear changer embodiment—side, front, and top. The front view shows how the various components are positioned so as to not interfere with each other during sole compression. The top view shows the approximate locations of side electro auto gear assemblies 680. It is possible to not have electro-actuator 698 on the inside, provided synchronizer assembly 682 is used to slave the position of the lever element components to their position on the outside. FIG. 42 shows examples for how this slaving can be done for the mechanical auto gear changer, but similar designs can also be used for the precise electro auto gear changer embodiment as well. This saves cost as well as side space occupied by electro-actuator 698, which is especially important on the inside of the shoe. FIG. 38 also indicates that groundplate side tab 684 must extend out from the main body of the groundplate to support side electro auto gear assembly 680. Boundary for inside heel clearance 416 demonstrates that there is plenty of room on the inside of the shoe for side electro auto gear assembly 680.

A very significant aspect of this just described auto gear changer is that it is precise, which is not the case for most examples of gear changers such as those for cars or bikes. Instead of having three or four gears, there is a distinct gear corresponding to each location of lever post 692 along its range of motion. That is, each position corresponds to a distinct effective spring strength (gear)—within the resolution of the device, depending or the distance between ratchet teeth or on the distance resolution of the electronic actuator (whichever is less). And, this gear change is implemented after every step so that it is effectively instantaneous. Side electro auto gear assembly 680 works in concert with the following additional components in the following manner. These components are a microprocessor, an impact transducer located at the bottom of groundplate 5, and an electric generator (to be further described in FIGS. 44 and 45 herein). The microprocessor has a look-up table which gives the correct position of lever post 692 for every shoe impact force. Based on the previous step, the impact transducer measures the maximum impact force for the previous step. Various position devices such as a laser rangefinder or a potentiometer can be used to measure the position of lever post 692. These data are sent to the microprocessor via wires as soon the instantaneous impact force is zero at toe-off. Then, the microprocessor sends this data point to the electronic actuator to move lever post 692 to the optimal position corresponding the last impact force. And, the electronic actuator makes this move in swing phase so that, on the very next step, there will be full sole compression without bottoming out—the optimal gear criterion. Electric power is provided by a battery, or by an electric generator with a large capacitor, or by an electric generator with a small battery. The last two options are attractive because batteries need not be included. Designs for a viable electric generator are given in the discussion for FIGS. 44 and 45. The detailed circuits to accomplish this design are straightforward and obvious to one of ordinary skill in the art.

FIGS. 39-41 show schematic side views of various elements, sequences, and configurations of the mechanical auto gear change embodiment. FIG. 42 shows a schematic top view of the same—with particular emphasis on how the various numbers of engaged spring slices 768 are engaged by rack bolt 812 and on how the gear changing motion of side view frontways rack 722 is converted to the direct gear changing motion of rack bolt 812. The basic idea is to harness or utilize a small portion of the shoe impact energy to move a tiny bolt to change the effective spring strength of a shoe. Remember that the criterion for the "gear change" is, as the shoe impact force changes, to change the effective spring strength so that the sole compresses just barely fully—without bottoming out. In fact, a more complicated design is needed for the mechanical solution, as compared with the electronic solution of FIGS. 37 and 38, but the advantage then is that batteries and/or electric generators are not needed. Mechanical auto gear 776 uses elements to measure the amount (distance) of sole compression (0-100%) in discreet amounts—e.g. four divisions of 25% each. It comprises plus assembly 778 and minus assembly 780, both of which move up and down with footplate 3. Plus assembly 778 comprises the following elements: minus pawl guide 734, pawl reset spring 744, minus catch 738, pawl mount 737, minus pawl 736, pawl spring 742, reset spring 745, pawl extension 741, and footplate mount 773. Both minus pawl guide 734 and reset spring 745 are mounted to footplate 3 via footplate mount 773. As will be explained for FIG. 40, wands 770 rotate minus pawl 736 and plus pawl 750 by impinging pawl extensions 741 on each of the same. This then disengages the same from their respective catches (minus catch 738 arid plus catch 751) so that they can be moved to change gears. Minus pawl guide 734 contains minus catch 738. Pawl reset spring 744 extends from the left end of minus pawl guide 734 to bias pawl mount 737 of minus pawl 736 toward the left when it is disengaged from minus catch 738. Minus pawl 736 is mounted on pawl mount 737. Pawl spring 742 biases minus pawl 736 to rotate clockwise to reengage minus catch 738 when pawl mount 737 is eventually moved back to the right to be re-engaged.

Pius pawl guide 748 is fixably attached to pawl mount 737, and it contains two plus catches 751. It also contains pawl reset spring 744 which biases pawl mount 737 back to the right after plus pawl 750 has been reset. Thus, the pawl mount 737 for plus pawl 750 moves back and forth on plus pawl guide 748. Hinged mover 730 moves back and forth in mover guide 729, which is fixably attached to pawl mount 737 of plus pawl 750. Plus pawl guide 748 also contains pawl reset spring 744 which extends from the right end of plus pawl guide 748 to the pawl mount 737 of plus pawl 750—so that hinged mover 730 can be moved back and forth with respect to pawl mount 737 of plus pawl 750. Rotatable bolt pin engager 731 is rotatably attached at the left end of hinged mover 730. It has a vertical extension for pin engager spring 727 to bias rotatable bolt pin engager 731 upward to disengage it from rack pin 723—when wand 770 lifts up release extension 739 as shown in FIG. 40. When pawl mount 737 of plus pawl 750 and pawl mount 737 of minus pawl 736 have been positioned by the actions of their associated wands 770, the result is that set spring 764 has been set to move rotatable bolt pin engager 731 to the proper position to set the gear for the next step. However this motion cannot occur until the shoe is in the air because of the friction force between the currently engaged spring slices 768 and rack bolt 812 of FIG. 42. That is, when this friction prevents rack bolt 812 from moving to change gears, it also prevents frontways rack 722 from moving. To avoid confusion (to the extent that is possible for this excessively complicated mechanism), note that the view of frontways rack 722 in FIGS. 39-41 shows only the features of rack pins 723 which extend vertically up from frontways rack 722 and which move frontways rack 722 forward and back to change gears. The other feature or aspect of frontways rack 722 is that it acts as a rack with teeth on its side to rotate pulley pinion 806 which in turn drives rack bolt 812. The reason for this conversion from frontways motion to sideways motion is to limit how far out to the side mechanical auto gear 776 extends. That is, the parts of mechanical auto gear 776 shown in FIGS. 39-41 take up about two and a half inches in the frontways direction, but only about an quarter inch in the sideways direction. Thus, the gear change motion still needs to be converted to the sideways motion of rack bolt 812 to change gears by engaging and disengaging spring slices 768.

As a quick review, plus pawl 750 and minus pawl 736 are moved back and forth to set (set spring 764) at the correct level of expansion or contraction so that it will move frontways rack 722 to the right position so that the right number of spring slices 768 are engaged in the next step. Plus assembly 778 and minus assembly 780 in FIG. 39 show how plus pawl 750 and minus pawl 736 are moved correctly for gear change. Minus assembly 780 serves to decrease effective strength. The change is accomplished with bent lever 720 and wand 770, which is mounted on wand post 772, which is rigidly mounted on and extends up from groundplate 5. Wand 770 is constructed so that it is rigid in one direction but it flexes in the other direction. One way to accomplish this, is to back up a flexible thin plate with a thin rigid plate in such a way that the flexible part extends a little further. Also, the two plates are not attached to each other, except where they attached to wand post 772. In the example of two side by side minus assemblies 780 in FIG. 39, on the left, minus assembly 780 is moving downward past wand 770 during sole compression. Wand 770 impinges the short side of bent lever 720 causing it to rotate counterclockwise. This causes the long end of bent lever 720 to impinge a little pin on the top of pawl mount 737 and to move it to the right and past minus catch 738 which prevents it from moving back left, as shown with the minus assembly 780 on the right. Now both reset spring 745 and set spring 764 are lengthened. Note that reset spring 745 is used to return minus pawl 736 to its neutral position during swing phase. Also, bent lever 720 is mounted on bent post 719 which is a vertical extension from minus pawl guide 734.

Plus assembly 778 serves to increase effective spring strength. Right below the two "side by side" minus assemblies 778, there are two plus assemblies 778, one above the other. Looking at the top one, as it is moving upward (as footplate 3 is moving upward), the short side of bent lever 720 is impinged by wand 770. This rotates bent lever 720 which causes its long side to impinge the indicated pin in pawl mount 737 and move it to the left, as shown in the lower plus assembly 778. Now plus catch 751 prevents plus pawl 750 from moving back to the right, and pawl reset spring 744 has been lengthened while reset spring 745 has been shortened. Depending on whether footplate 3 has compressed sufficiently, another wand 770 will cause plus pawl 750 to move left again. This will be further explained below in the discussion of FIG. 40. Basically, depending on the amount of footplate compression, the effective spring strength can be either decreased (for minimal compression), unchanged, or increased (if the compression bottoms out). And, this is because the change in length of set spring 764 is held in place by the positions of minus pawl 736 and plus pawl 750—until set spring 764 finally moves frontways rack 722 via rack pin 723 in swing phase. Now, bent lever 720 is mounted on bent post 719 which is a vertical extension from plus pawl guide 748.

At the bottom of FIG. 39 there are two ×2 plus assemblies 782, one above the other. The ×2 plus assembly 782 (×2 stands for times 2) is used when there is only one plus catch 751 on plus pawl guide 748, in which case the distance which plus pawl 750 must move is twice as large. In this case, the effective spring strength is always decreased unless the footplate 3 compression bottoms out—in which case the effective spring strength increases. Thus, there is not a case where the effective spring strength is unchanged. The manner of moving and holding the position of plus pawl 750 is entirely similar to that described in the previous paragraph, except that the twice size ×2 bent lever 774 is used. Bent lever 720 is mounted (twice as high) on bent post 719 which is a vertical extension from plus pawl guide 748. For all of these uses of bent lever 720 or ×2 bent lever 774, bent spring 718 pulling from spring post 725 is used to return these bent levers to their pre-impingement positions.

FIG. 40 shows several configurations for the locations of wands 770 which rotate the various bent levers 720 or the ×2 bent lever 774 to achieve gear change. Note that wands 770 are oriented with the flexible plate on the top or bottom depending on whether they impinge the two types of bent levers during sole compression or sole expansion. In the blow up view of a typical wand 770, rigid wand thin plate 769 is on one side; flexible wand thin plate 771 is on the other side, and it is slightly longer. It bends so that it does not rotate bent lever 720 in one direction, but it is backed up by rigid wand thin plate 769 so that it does rotate bent lever 774 while moving in the vertical other direction. The blowup view of wands 770 oriented for upward or downward triggering is shown in the bottom right section of FIG. 40. The "set minus" arrow and its designation means that wand 770 rotates bent lever 720 or ×2 bent lever 774 while footplate 3 is compressing (moving downward)—and vice versa for "set plus." The two components of wand 770 are rigid wand thin plate 769 and flexible wand thin plate 771, which bends to not rotate bent lever 774 for one of the two vertical directions of footplate 3 (in which bent levers 774 are moving). The wands 770 are not labeled on the left side of FIG. 40 because it is obvious that they are the same as in their blow up drawing.

Release/reset assembly 775 shows details of how a particular wand 770 rotates release extension 739 of rotatable bolt pin engager 731 (on the left) and minus pawl 736 or plus pawl 750 (on the right). This release/reset occurs just at foot impact when footplate 3 just begins to compress, and its purpose is to reset rotatable bolt pin engager 731 and minus pawl 736 and plus pawl 750 to their neutral positions via their reset springs, which are pawl reset spring 744, reset spring 745 and set spring 764. Down arrow 732 indicates that pawl mounts 737 are moving (with footplate 3) downward past wands 770. Looking at the detail in the top right section of FIG. 40, at foot impact, wand 770 rotates rotatable bolt pin engager 731 via release extension 739, thereby disengaging from rack pin 723 of frontways rack 722.

Immediately after this release, pin engager spring 727 causes rotatable bolt pin engager 731 to engage with the rack pin 723, now below it. At the same time, wands 770 rotate minus pawl 736 and plus pawl 750 so that their assemblies can be returned to their neutral configurations by disengaging respectively from minus catch 738 and plus catch 751. Impact/reset configuration 788, minus wand configuration 786, plus wand configuration 784, and simple plus/minus configuration 783 demonstrate how and where the pawl elements are set to move frontways rack 722 back and forth to "change gears." The percent value of how much footplate 3 has compressed is indicated on the left. As was just described, the reset/release happens at sole impact (impact/reset configuration 788). The minus setting, in which minus pawl 736 if moved to the left (FIG. 39), occurs a little ways into the compression (minus wand configuration 786)—notably on the way down. There are then two options, the more sophisticated option of plus wand configuration 784 or the simple option of simple plus/minus configuration 783. Let's look at the simple option first. Only when there is full compression does plus pawl move to the left—see ×2 plus assembly 782 of FIG. 39. And then it moves twice as far as the distance traveled my minus pawl 736—in which case, the effective spring strength is increased. That is, if full compression is not achieved, the effective spring strength is then increased. Thus, there are only two gear change options after every step—to increase or decrease the effective spring strength so as to stay close to full sole compression as the shoe impact force changes. In order to stay closer to the optimum of full sole compression, plus wand configuration 784 offers, in effect, more gears. Remember from FIG. 39 that there are two positions to which plus pawl 750 can be changed. If it moves only to the first plus catch 751, the there is no "gear" change because the plus movement of plus pawl 750 is canceled by the minus movement of minus pawl 736. This corresponds to the sole compression being close to full. A careful study of plus wand configuration 784 will show that no gear change can occur when the sole compression is just to the locations of the wands 770 at compressions of 50%, 67%, and 85%. Only when there is a full compression of 100% is it possible to move plus pawl 750 a second time to the left by the action of the wand 770 on the left side of plus wand configuration 784, which is positioned to rotate plus pawl 750 a second time. Now, there is a net movement to the left so that the effective spring strength increases. The configuration corresponding to plus wand
configuration 784 is realized by having a spring strength of half of the full spring strength located under the foot. Then, three spring slices 768 are located on either side of the shoe. Each corresponding slice pair is one sixth of the full spring strength. Thus, you would have a walking gear, a jogging gear, a running gear, and a sprint gear. Note that the plus actions all occur when footplate 3 is moving upwards in sole expansion. And, in swing phase when the shoe is in the air and frontways rack 722 is free to move, then rack bolt 812 of FIG. 42 is free to engage more, less, or the same number of spring slices 768.

FIG. 41 shows schematic side views of an example sequence in which the effective spring strength is increased by one spring slice 768 during one step (sole compression plus swing phase in the air). That is, the changes in mechanical auto gear 776 of FIG. 39 are shown at five states of sole compression. Admittedly, this is a very complicated design, so hopefully it will help the reader to follow a gear change throughout a step cycle. The full cycle is referred to as mechanical auto gear sequence 790. A short description is provided at the side of the following steps of gear setting: reset/impact configuration 792, neutral configuration 794, minus/plus set configuration 796, in-air/move-rack configuration 798, and second impact/reset configuration 800. Reset/impact configuration 792 shows that, at impact, rotatable bolt pin engager 731 is lifted (by its wand 770) as shown in FIG. 40, and both minus pawl 736 and plus pawl 750 are disengaged (by their wands 770). And, the three pertinent springs—pawl reset spring 744, reset spring 745, and set spring 764—are now at their neutral lengths. Neutral configuration 794 shows that rotatable bolt pin engager 731 has re-engaged with the nearest rack pin 723, and that the pawl springs 742 for minus pawl 736 and plus pawl 750 are now biasing them against minus pawl guide 734 and plus pawl guide 748, respectively. Minus/plus set configuration 796 shows first that minus pawl 736 has been moved right to engage minus catch 738 as shown in plus wand configuration 784 of FIG. 40. Also, plus pawl 750 has been moved twice to engage the leftmost minus catch 751, as shown in minus wand configuration 786 of FIG. 40—due to the fact that the sole travel has bottomed out. This means that frontways rack 722 needs to be moved to the left to add one spring slice 768. The result of the movement of minus pawl 736 and of plus pawl 750 is that set spring 764 is compressed. As soon as the shoe is in the air, frontways rack 722 is free to be moved left by set spring 764—by a distance corresponding to the distance between adjacent rack pins 723. Then, the effective spring strength has been increased by the amount of a pair of spring slices 768—one on either side of the shoe. Second impact/reset configuration 800 corresponds to reset/impact configuration 792 because the elements above have been reset at impact, except that one more pair of spring slices has been added, and frontways rack 722 has been moved to the left. Note that when frontways rack 722 is at either end of its range, it just doesn't move further, but as soon as it needs to move within its range, it will.

FIG. 42 shows top views of three designs to slave (synchronize) the "gear change" on the inside of the shoe to the gear change on the outside of the shoe. These are double pulley design 801, double rack design 803, and mirrored slave linkage design 805. This is for a left foot, so the left side is the outside of the shoe. Foot 418 is shown and the shoe encircles it. Foot 418 rests on footplate 3. It is possible to have some springs directly underfoot, but these cannot be used to change gears for the shoe because they cannot be disengaged. Three spring slices 768 are shown on either side, and these can be disengaged. This slaving can be done both for the precise gear changer (FIGS. 37 and 38 e.g.) and for the
mechanical gear changer (FIGS. 39-42). Double pulley design 801 assumes that there is a mechanical gear changer. The approximate locations of some of its components are shown on the left (outside) of foot 418. Pawl/guide assembly 814 is adjacent to and inside of spring slices 768. Wands assembly 816 is just inside pawl/guide assembly 814 and just outside foot parallelogram 4. Pulley pinion 806 is mounted to footplate 3, and it is driven to rotate by frontways rack 722. Its rotation then drives outside cross rack 802 to move sideways back and forth to engage and disengage spring slices 768 on the inside of foot 418. Both frontways rack 722 and outside cross rack 802 have gear teeth on their sides to achieve the rack and pinion capability. Cross rack guide 818 guides the sideways motion of outside cross rack 802, and it is mounted to and just below footplate 3. Pulley line 810 runs around the pulley pinion 806 on the outside of foot 418 to around the pulley pinion 806 on the inside of foot 418 to turn it to drive inside cross rack 804 to engage and disengage the spring slices 768 on the inside of foot 418. Double pulley/pinion slaver 836 comprises these just mentioned elements, which are located just below footplate 3. The insert shows detail for double rack and pinion 819. For double rack design 803, which features double rack/pinion slaver 834, only the racks and pinions are shown, but the other components on the outside of the shoe are the same as for double pulley design 801. Outside cross rack 802 is driven by pinion 822 in cross rack guide 818. Note that center pinion 824 is positioned to be driven by cross rack guide 818, and it in turn drives offset inside cross rack 820 within a second cross rack guide 818—to engage and disengage the spring slices 768 on the inside of foot 418. Probably the best of these three designs is mirrored slave linkage design 805, which features mirrored slave linkage 830. Again, outside cross rack 802 is driven (within cross rack guide 818) by pinion 822. But now it is hingeably connected to the left one of mirrored slave links 826. Both of these are hingeably connected at their bottom ends, one to the other, and that connection pivot is constrained to move vertically in slave guide 828. As a result, outside link 832 is slaved to move sideways in concert with outside cross rack 802. Note that these methods—of slaving the gear change on the inside of the foot to the gear change on the outside of the foot—can obviously be adapted to the precise electronic gear changer of FIGS. 37 and 38.

Note that the mechanical auto gear changer of FIGS. 39-42 can be adapted to the approach of the precise electro auto gear changer of FIGS. 36 and 37, except that the lengthwise motion of frontways rack 726 is now actuated by components of the mechanical auto gear changer. Likewise the approach of the mechanical auto gear changer of FIGS. 39-42 can be implemented with an electronic actuator which moves rack bolt 812 sideways to engage and disengage spring slices 768. Also, the auto gear changers of FIGS. 37-43 can be used for conventional shoes as well as for the high performance energy return shoes with enhanced heel lift. They could also be used for other types of shoes such as the shoe of US application 20140165428 of Freschi to accomplish his gear change, which is done by hand.

FIG. 43 shows a schematic front view and a schematic side view of above foot precise electronic automatic gear changer 843. This is just a modification of side electro auto gear assembly 680 of FIGS. 37 and 38, except that that the gear changer is positioned above the top of the runner's shoe. Here the shoe happens to be basically parallelogram shoe 1 of FIGS. 8-7-9—using the variation where conventional pivots are used for the parallelogram. However, other versions of the heel-pop shoe might also be used, albeit not as conveniently. Very briefly, here are the elements of this example parallelogram. Footplate 3 is hingeably connected to top toe link 19 via hinge 34. Rear link 27 and front link 28 are hingeably connected to footplate 3 via hinges 34—and to bottom link 30 via hinges 34. Bottom link 30 is part of groundplate 5. Front toe link 18 is hingeably connected to top toe link 19 via hinge 34 and to footplate 3 via hinge 34. Toe plate 7 is connected to footplate 3 via hinge 34. Hinged linkage 42 comprises these just described elements. Shoe upper 1 is fixably attached to footplate 3.

Above foot precise electronic automatic gear changer 843 has two supports which make it possible to locate it above forefoot. The first is groundplate support 838 which extends up from the groundplate and across the top of shoe upper 1—to support ramp 696 and post guide 694. Footplate support 840 extends up from the footplate on either side—and then backwards—to provide the horizontal element which has footplate ratchet 691 along its bottom side—which pulls down engage-spring bolt 686. Although it is possible to have an actuator on either side, it is preferable to have one centrally located actuator in a center gap of ramp 696. Actuator bar 842 extends out to the lever post 692 on either side, to move it back and forth—to change gears. With this top relocation, top electro auto gear assembly 843 functions the same way as does side electro auto gear assembly 680 of FIGS. 37 and 38. The advantage is that there is no need to have the device on both sides of the foot, and only one centrally positioned impact absorbing spring is required.

FIG. 44 shows a schematic back view and a schematic side view of versions of the integral impact charger, which is located on the outside of the heel. The basic idea is to use shoe impact to spin a miniaturized electric generator which charges a battery. The circuits for this charging are old in the art and obvious to one of ordinary skill in the art, so this discussion focuses on the optimal mechanism for spinning the shaft of the miniature generator that is used the charger designs herein. For the high performance shoes of the instant invention, there is a substantial sole compression travel of an inch or two or more. In this case there is no need to have the impact absorbing mechanism extend below the bottom of the shoe (the groundplate), and the impact mechanism can be essentially integral to the sole construction. Also, both groundplate 5 and footplate 3 require a small tab which extends a little ways out to the side so the elements of integral impact charger do not interfere with the sole compression. Simple integral impact charger 869 and its compressed version, compressed simple integral impact charger 868, are shown. Compressed means that footplate 3 has moved down to touch groundplate 5. The back view for the uncompressed state shows how the following rotary elements are positioned on generator shaft 864 of electric generator 863, which is fixably housed in gen pulley support 862, which in turn is fixably mounted on groundplate 5 via support post 845. Generator shaft 864 extends on the right, through flywheel 847, and then through one-way-clutch/rewind-spring assembly 865 and generator double pulley 861. Flywheel 847 is fixably mounted on generator shaft 864, but generator double pulley 861 is mounted on generator shaft 864 via one-way-clutch/rewind-spring assembly 865 so that it turns generator shaft 864 only in the direction that footplate side gen pulley line 867 is spinning it, when footplate is pulling down footplate side gen pulley line 867 during sole compression. Of course, footplate side gen pulley line 867 is fixably attached to footplate 3. However, when generator double pulley 861 is spun in the other direction, it is disengaged from generator shaft 864 via oneway-clutch/rewind-spring assembly 865. This leaves flywheel 847 free to continue spinning generator shaft 864 when the sole is expanding and when the shoe is in the air in swing phase. Note that one-way-clutch/rewind-spring assembly 865 is represented schematically in the figure, but its details are obvious to one of ordinary skill in the art. The side views show how footplate side gen pulley line 867 is pulled down by footplate 3 during sole compression. It also shows how footplate side gen pulley line 867 expands simple windup spring 871 (mounted on simple post 870) during sole compression. Then, windup spring 871 pulls back during sole expansion to spin generator double pulley 861 back the other way during sole expansion. This is possible because there are actually two pulleys in generator double pulley 861—one for each of the two pulley lines.

Note that each of these is fixably attached to generator double pulley 861 in order to spin it—in opposite directions. Also note that flywheel 847 and generator shaft 864 are continuously spinning and generating electrical power. With each step this spinning is given a push and thus augmented. Since, for the enhanced heel-lift shoes of the instant invention, there is sufficient travel of footplate 3, it is possible to realize this simple design without any additional mechanical advantage. For the dimensions shown, generator shaft 864 is spun three times each step.

However, if it is desirable to generate significantly more electric power, then an additional mechanism must be added to provide the requisite mechanical advantage. This is shown in the bottom half of FIG. 44 with enhanced integral impact charger 844 and with compressed enhanced integral impact charger 841. Here, generator assembly 846 is mounted on support post 845 just as for simple integral impact charger 869 above. But now the additional mechanical advantage mechanism comprises: windup lever 848, lever roller 849, charger gear double pulley 850, inner gear double pulley 851, windup support 852, windup pulley 854, reverse windup pulley 855, curled lever extension 856, gear windup line 857, gear reverse windup line 858, gen windup line 859, gen reverse windup line 860, and taut spring 872. Windup lever 848 is hingeably connected to footplate 3, slightly outside of the heel so that it is free to rotate without interference with the shoe. Charger gear double pulley 850 is fixably attached to inner gear double pulley 851 so that they rotate together, and their shaft is rotatably mounted on windup support 852 which is fixably attached to groundplate 5. The downward motion of footplate 3 causes the bottom end of windup lever 848 to impinge groundplate 5 via lever roller 849. This rotates windup lever 848 counterclockwise until it is eventually almost horizontal. Gear windup line 857 is attached to the top of the straight part of windup lever 848 so it spins inner gear double pulley 851 (via its groove) counterclockwise—via windup pulley 854, which optimizes the direction of pull by windup lever 848. Gear reverse windup line 858 is connected to the top of curled lever extension 856, and it passes around reverse windup pulley 855 to wind around the other groove of inner gear double pulley 851—in the opposite direction from that of gear windup line 857. Again, the position of reverse windup pulley 855 is chosen to optimize the direction of pull by the top of curled lever extension 856 as it spins inner gear double pulley 851 clockwise in sole expansion. Thus the opposite pulls—of gear windup line 857 and gear reverse windup line 858—coordinate to spin inner gear double pulley 851 in the two directions—thereby preventing any slack in these pulley lines. Taut springs 872 pull and/or push windup pulley 854 and reverse windup pulley 855 all function to tighten the total line lengths to prevent slack. Of course, the dimensions of these elements are first adjusted so that the length of pull of each line is approximately the same. A spring loaded track is required for the motion of these two pulleys, but this is not shown in the limited space of the drawing. Alternatively, stiff tension spring elements in these line systems can be used to maintain them taut. Gen windup line 859 and gen reverse windup line 860 are attached to and occupy the two grooves of charger gear double pulley 850 so as to provide opposing pulls to spin generator double pulley 861 of generator assembly 846—as detailed in the top views of FIG. 44 for compressed simple integral impact charger 868. The only difference is that the opposing pulls to achieve the two directions of spin are now accomplished with gen windup line 859 and gen reverse windup line 860. Otherwise, the elements of generator assembly 846 function in like manner as above. The difference now is that generator shaft 864 is now spun thirty times each step rather than three times each step—due to the mechanical advantage afforded by charger gear double pulley 850 and inner gear double pulley 851. Of course, this mechanical advantage can be adjusted by changing the dimensions of the various pulleys. Thus, the impact chargers of FIG. 44 provide ample power for electro-actuator 698 of side electro auto gear assembly 680, of FIGS. 37 and 38—and for any other portable electronic devices a user might be carrying.

FIG. 45 shows schematic side and bottom views of clip-on impact charger 874. The top views depict of clip-on impact charger 874, and the bottom views depict enhanced clip-on impact charger 898. These two embodiments are intended for any shoes or boots which have a sole compression of less than a half inch, or so. This requirement applies basically to all conventional shoes. And, this embodiment can be clipped on to any shoe or boot. It could also be used for ambulating robots. As was not the case for the embodiment of FIG. 44, this embodiment requires that an element extend below the bottom of the shoe. This is the only way to have enough travel of clip-on line 892 to spin electric generator shaft 864 adequately. Since the sole of conventional shoes is not very thick and it usually does not compress very much, only groundplate 5 is shown in FIG. 45, and this represents the heel sole of a conventional shoe. Shoe bottom 896 also represents this heel sole. Generator assembly is the same as in FIG. 44.

Accordingly, clip-on impact charger 874 comprises the following elements: clip-on stirrup 876, clip-on tab 878, outside stirrup support 880, clip-on post 882, clip-on lever 884, clip-on redirect pulley 886, clip-on line 892, reverse clip-on line 894, shoe bottom 896 and clip-on lever shaft 898. These are positioned on the outside of the shoe heel, as far to the rear as possible without sticking out behind the back of the shoe heel. Clip-on post 882 is fixably attached to outside stirrup support 880 (as indicated in the bottom view), and its left arm houses clip-on redirect pulley 886 which redirects clip-on line 892 as it is pulled down by clip-on lever 884 to spin generator shaft 864 of generator assembly 846 during shoe impact. In a similar manner as in FIG. 44, reverse clip-on line 894 expands simple windup spring 871 (attached to clip-on stirrup 876) so that it can rewind inner gear double pulley 851 of generator assembly 846 during sole expansion. The bottom view shows clip-on stirrup 876 as it wraps around and grips the heel of shoe bottom 896. Clip-on stirrup 876 is longer for clip-on enhanced impact charger 888 at the bottom of FIG. 45. Clip-on stirrup 876 has clip-on tabs 878 on either side—to prevent clip-on stirrup 876 from moving upward with respect to shoe bottom 896 during heel impact. Its sections, which wrap around the back of the heel, are flexible so that it securely grips the back of the shoe heel. It is easily possible to incorporate a strap (not shown) around the front of the ankle from the sides of clip-on stirrup 876—to better attach it to the shoe heel. And/or sharp protrusions on the inside of clip-on stirrup 876 (not shown) could enhance the grip upon the shoe heel. Note that a stop (not shown) is incorporated in the hingeable connection of clip-on lever 884 with outside stirrup support 880 (via clip-on lever shaft 898)—to limit the downward rotation of top impact lever 884. Outside pulley support 880 is a rigid upward extension of clip-on stirrup 876, and clip-on post 882 is attached to it to house generator assembly 846. The function of generator assembly 846 to generate electric power is the same as was described for FIG. 44.

Clip-on enhanced impact charger 888 is shown in the bottom of FIG. 45, for the moment just before shoe impact. It is very similar to enhanced integral impact charger 844 of FIG. 44 except that windup lever 848 now extends below the level of the bottom of the shoe, but it only extends a shorter distance, e.g. one inch. Other than that, the positioning of the charger elements is essentially the same. Since the upper end of windup lever 848 is longer, e.g. 2 inches, the result is still to spin inner gear double pulley 851, thirty times with each step. The other difference is that support post 845 and windup post 852 are now fixably connected to outside stirrup support 880. Again, this method of mechanical advantage for spinning generator shaft 864 of generator assembly 846 gives a much greater number of spins, thus generating much more electric power, than the shoe electric chargers of the prior art. This is by virtue of using gear pulleys and by virtue of solving the problem of preventing slack of the pulley lines when windup lever 848 rotates back downward during heel-lift. This solution—to use a separate pulley line for each direction of this spin—is novel, and it is the only recourse when there is such a large mechanical advantage. The other advantage of the clip-on embodiments, is that they can be easily removed when electric power is not needed. And, they can be used on any pre-existing shoe. Finally, the impact chargers of FIGS. 44 and 45 can easily be modified and adapted to generate electric power for any applications where there is repetitive up and down or back and forth motion (not just for shoes or boots)—in a manner obvious to one of ordinary skill in the arts. And, these impact chargers can also charge batteries for any other electric power needs such as cell phones, laptops, lights, heat, etc. Another option is to store enough charge in capacitors so that batteries are not needed.

FIG. 46 is a schematic side view of pulley actuator 900, which is an alternative to electro-actuator 698 of FIG. 37. The advantage over conventional linear actuators is that it only requires two pulleys and a miniature electric motor. Thus, it is cheaper and lighter, and much faster. Also, the whole side configuration for the gear changer can be arranged to be narrower because the pulleys can be positioned away from the other elements of electro-actuator 698 of FIG. 37. In this case, only the width of actuator pulley line 914 in involved, and that is negligible. Accordingly, pulley actuator 900 comprises pulley actuator 900, motor pull pulley 902, opposing pulley 904, forked line catch 906, first pulley actuator post 908, second pulley actuator post 910, actuator motor 912, actuator pulley line 914, post guide 694, post 692, and motor shaft 913. Motor pull pulley 902 is fixably attached to first pulley actuator post 908 which is rigidly attached to groundplate 5. And, opposing pulley 904 second pulley actuator post 910 is fixably attached to second pulley actuator post 910 which is rigidly attached to groundplate 5.

Actuator pulley line 914 extends tautly between and around these two pulleys. Actuator motor 912 is bi-directional. Actuator motor 912 is mounted on first pulley actuator post 908 and its motor shaft 913 serves as the shaft of motor pull pulley 902—to which is fixably attached. Forked line catch 906 is fixably attached to actuator pulley line 914 and to post 692. Thus, when motor shaft 913 is turned by actuator motor 912 in either direction, it pulls forked line catch 906 back and forth via actuator pulley line 914 and via post guide 694 along which post 692 is guided. As per the discussion of FIGS. 37 and 38, this is how the "gear" is changed. Also, as per this discussion, the aforementioned components, —namely a microprocessor and an impact transducer—also feature a position device for post 692 along post guide 694.

When the microprocessor computes the next position of post 692, it then signals actuator motor 912 to turn in the right direction, and the microprocessor optionally uses the real-time signal from the position device to stop the actuator when this next position is reached. Again, the circuits for how to switch the direction of actuator motor 912 and how to stop it are old and obvious in the art. Pulley actuator 900 can also be used for the other electronic gear changers herein, such as that of FIG. 43 for above foot precise electronic automatic gear changer 843 of FIG. 43 or a possible electronic gear changer to engage side spring slices.

FIG. 47 shows schematic side views of various depictions of tied cogged hinge 920. Straight to aligned depiction 922 shows opposed, on the left, tied cogged hinge 920 with the two cog-end links 932—then partially rotated in the middle, and then aligned on the right. That is, cogs 931 on the rounded end of the top cog-end 932 mesh with those of the bottom cog-end 932. Shaft-tie crossed loop 936 connects the top cable shaft 934 with the bottom cable shaft 934 in such a manner that the two cog-end links 932 remain meshed no matter what the load is on tied cogged hinge 920. That is, it functions as a practical hinge even though there is no conventional main shaft spinning within a rotary bearing. Even though just a simple loop or a single cable tied to each cable shaft 934 could be used, in each of these two cases there is inevitably rubbing between the cable and cable shaft 934. In order prevent the two cog-end links 932 from moving sideways (into the paper) with respect to each other, simple stops can attached to each of these to prevent sideways relative motion. These are not shown, but obvious to one of ordinary skill in the art. However, for shaft-tie crossed loop 936 there is no rubbing because as the cable rotates with the shaft on the top side, the cable naturally rotates with shaft on the bottom side because the loop is crossed. Note that cable shafts 934 are fixably mounted in cog-end links 932. Also, as seen in loop slit depiction 926, loop slit 944 is required so that shaft-tie crossed loop 936 interleaves with the interleaved sections of cog-end link 932. This is only depicted in loop slit depiction 926, but it should be understood that loop slits 944 are required in all cog-end links 932. Also, the passing sides of shaft-tie crossed loop 936 must also in a sense be interleaved side by side to each other. Cog cap depiction 928 shows that cogs 931 can be mounted on the link as first cog cap 940 or as second cog cap 942. In this way the choice of optimal materials for the link and the cogs can be made, where the cogs are made of a harder yet heavier material. Stop and catch depiction 930 shows a way to lock tied cogged hinge 920 in a straight configuration. Here tied cogged hinge 920 is constrained to fold in only one direction. The stop feature is realized by noting then that cogs 931 are needed on only one side. The other side features, on both top and bottom links, are stops 929 which impinge each other to prevent folding in the other direction. In order lock the top and bottom cog-end links 932 to be directly opposing each other and fully unfolded, rotating catch arm 948 is fixably mounted to the lower cog-end link 932 so that when the unfolding is complete, rotating catch arm 948 rotates to engage rotating catch 946 which is fixably attached to the top cog-end link 932. Catch spring 950 biases this rotation to engage catch 946, as rotating catch arm 948 slides up catch 946 during the unfolding. It is a simple matter obvious to one of ordinary skill in the art to make this catch action releasable, or not. Impinger hinge depiction 924 shows how impinger link 938 can be designed to hingeably engage mirrored cog-end links 932 by incorporating two circular cog ends 933 on its other end. This version of hinge can be for impinger hinge 119 of FIG. 13 or for monolithic impinger hinge 181 of FIG. 15. Also, tied cogged hinge 920 can be used for corner hinge 120 of FIG. 13 or for monolithic corner hinge 182 of FIG. 15—as well as for many of the hinges for designs here—such as for the parallelogram linkages—where it is undesirable to use conventional shafts and rotary bearings for the linkage hinges. Note also and well, that the hinge of stop and catch depiction 930 can be used for arm hinge 514 of FIG. 27 herein. This combination would be particularly attractive for foldable arrays to be deployed via rocket to space because the force of folding of folded tensioned links rotating arms curved spring 502 of FIG. 27 goes to zero at complete folding. The other advantages are first that tied cogged hinge 920 is optimally simple yet robust, and second the array will remain locked in the fully unfolded position by rotating catch arm 948. Finally, the width of the elements of tied cogged hinge 920 can be varied.

Basically, cog-end link 932 can be a plate of any width, with cogs 931 on the rounded end. One can then incorporate as many interleaved loop slits 944 as the design may require.

FIG. 48 shows schematic top views of cross synchronized pulley actuated gear changer 960, located on both sides of foot 418—with synchronizing lines extending under foot 418. This is the most viable gear changer because it simply engages spring slices 768 instead of utilizing the attractive yet more complicated precise gear change mechanism of FIGS. 37 and 38 herein. It also extends the idea of pulley actuation of FIG. 46 herein not only to actuate the gear change but also to synchronize the gear change on both sides of the foot. Since it is possible to have many gears by having many spring slices 768, it is possible to approach the ideal precise gear change of FIGS. 37 and 38. Also, it is now possible to change directly to the desired gear by selecting any number of spring slices 768—from step to step. Accordingly, cross synchronized pulley actuated gear changer 960 is depicted as 1st gear configuration 962 on the left—where no spring slices 768 are engaged- and as 3rd gear configuration 964 on the right—where three spring slices 768 are engaged. Synchronize motor 977 is attached on the outside of the foot to groundplate 5 (not shown but in a similar manner to that shown in FIG. 46 for actuator motor 912). And, its motor shaft 913 is fixably attached to synchronize pulley 974. Synchronize pulley line 988 extends around synchronize pulley 974, and on the bottom side it extends forward to second pulley (outside horizontal) 978. In this initial line section outside line catch 984 connects synchronize pulley line 988 to the rear end of rear ladder link 972. This is how the spring slice 768 engagement is actuated, since the front end of rear ladder link 972 is then pushed out sideways. The bottom side of synchronize pulley line 988 continues around second pulley (outside horizontal) 978 to be redirected to pass just barely under footplate 3 and rearward—to then be redirected forward by third pulley (inside horizontal) 980 to continue to pass around forth pulley (inside horizontal) 982, which redirects it back rearward, across, and barely below footplate 3—to be redirected directly rearward by fifth pulley (outside horizontal) 983, after which is redirected upward by sixth pulley (raise line) 976 so that it can raise and wind around the top of synchronize pulley 974—to finally complete the circuit. Note that in the section, between third pulley (inside horizontal) 980 and forth pulley (inside horizontal) 982, inside line catch 986 connects the rear end of rear ladder link 972 to synchronize pulley line 988. Note also that this underfoot crossing ensures that the forward motion of outside line catch 984 is synchronized with the forward motion of outside line catch 984. This is how the inside gear change is synchronized with the outside gear change. The free underfoot motion of synchronize pulley line 988 is ensured with spaghetti tubing or grooves in the bottom of footplate 3.

The 3rd gear configuration 964 shows the action of outside ladder linkage 973 and inside ladder linkage 975. Front ladder link 970 and rear ladder link 972 are hingeably connected by ladder hinge 971. The motion of the ends of front ladder link 970 and rear ladder link 972 is constrained by sideways guide 966 and frontways guide 968 in such a manner that ladder hinge 971 extends outwards toward the side as synchronize pulley line 988 moves outside line catch 984 and inside line catch 986 forward. Front ladder link 970 and rear ladder link 972 are structurally reinforced so that they are strong enough to compress spring slices 768. Also, a stiff plate can be incorporated at the top of spring slices 768 so that their top (center) sections are compressed. Note that the design of outside ladder linkage 973 now does not require that an engage bolt extend under footplate 3. This reduces the width of the various side assemblies. It also permits the use of spring slices 768 to extend above the level of footplate 3 (with some obvious framework if one desires that the side springs be taller). Note also that only one synchronize motor 977 is required on the outside of the foot, which reduces the device width on the inside of the foot. Of course, a separate gear changer with its own synchronize motor 977 could be used (without the pulley lines crossing underfoot), but that would be disadvantageous. As was the case for the precise gear change, the same or equivalent electronic parts are used. Now a position sensor reads the position of outside line catch 984 and force sensor 486 tells microprocessor 484 how many spring slices 768 need to be engaged for the next step. And the actuation of synchronize motor 977 then moves outside line catch 984 (via synchronize pulley line 988) the desired position. There are a number of miniature motor choices for synchronize motor 977—from motors to stepper motors to servo motors (with increasing prices). However, since the requirements for accuracy of position are not very demanding, it is possible to get by with a cheaper solution. For example, a cheap motor could be used provided the real time update of position allows the signal from microprocessor 484 to stop the motion of outside line catch 984 at the desired position. The determination of the optimal motor can be done in a manner obvious to one of ordinary skill in the art. Note that cross synchronized pulley actuated gear changer 960 can easily be adapted to the rotating arms design of FIG. 27, as was mentioned in that discussion. Instead of the gear changer elements being mounted on either sides of the foot, they are now mounted on either sides of the rotating arms—and these elements would function in an entirely equivalent manner. This idea is developed in the next paragraph. The applications for prostheses, orthotics, and robotics are obvious. And, this changing of the effective spring strength resisting rotations of the arms about the hinge is entirely analogous to how human muscle strength changes, for example in running or lifting.

FIG. 49 shows schematic side and top views for an assembly for rotating limbs with optimal spring and gear change. Assembly for rotating links with optimal spring and gear change 979 is shown in the bottom right in a folded configuration, and unfolded assembly for rotating links with optimal spring and gear change 969 shows it in an unfolded configuration (straight). Gear change assembly 994 is shown in the top right view. It is rotated to show that it is attached to the top of rotating upper link plate 983 which is oriented at the same angle. Finally, the left view shows changing gear optimal spring knee brace 996, which application follows very nicely because the gear change capability allows one, not only to change gears, but also to switch off the spring resistance in swing phase so a runner can freely bend her knees. Of course, the invention of FIG. 49 applies to any joint with rotating arms in industrial mechanisms and in orthotic or robotic applications. Again, from the thorough discussion of the rotating arms joint of FIG. 27, the torque level is minimized due to the constant torque curve. This reduces the wear and tear and energy costs for human users and for machine users such as robots. The goal here is to incorporate the gear changer of FIGS. 46 and 48 into the optimal rotating arms joint of FIG. 27. The question is where to put the gear change elements and where to load the springs. The answer is to put the gear changer elements on the top of rotating upper link plate 983 so that we can move movable impinger plate 981 sideways to engage a variable number of unstretched sliced curved spring 993. Note before starting that the link elements are called plates because they have to be wide enough to accommodate the unstretched sliced curved springs 993 which are positioned side by said across the width of the assembly. Accordingly, rotating upper link plate 983 and rotating lower link plate 985 fold about rotating impinger hinge 987. This folding is resisted by the following linkage. Rotating upper link plate 983 and rotating lower link plate 985 hingeably connect with each other and with movable impinger plate 981—via rotating impinger hinge 987—which impinges upper and a lower ones of unstretched sliced curved springs 993. These are configured as the right half of a ring spring such as that shown for internal linkage mirrored arch spring 107—as revised in FIG. 32 with more flexible wrap-around impinger section 566—for the hinge between the top and bottom halves (of the half ring spring). The other ends of rotating upper link plate 983 and rotating lower link plate 985 hingeably connect to top limb plate 988 and to bottom limb plate 989—a short distance from limb hinge 990—at the same hinge location where the upper and lower ends of unstretched sliced curved springs 993 connect. The goal is for this linkage to impinge the center ring of the de facto half ring spring so as to stretch out straight the upper and lower halves of these springs, which are now designated as stretched sliced curved springs 992. Note that the usual characteristic of the linkage-spread curved springs herein is that the curve for the torque about limb hinge 990 first increases, and the it bends over and goes to zero at full folding when all linkage and spring elements are straight and aligned. In order to achieve a constant torque curve, center adjust spring 991 begins to resist folding as this torque curve bends over and starts to decrease—so that the combined torque curve becomes approximately constant as full folding (spring compression) is approached. Thus, center adjust spring 991 is dimensioned and positioned so that it begins to resist foldable at partial folding. Note that two stretched sliced curved springs 992 in assembly for rotating links with optimal spring and gear change 979 have been selected to be engaged by gear change assembly 994, while one stretched sliced curved spring 992 has not been engaged—in which case they simply rotate and fold without resisting folding. These are shown as dashed lines.

Gear change assembly 994 is fixably attached to the top of rotating upper link plate 983, and it includes movable impinger plate 981 to which it is hingeably connected via rotating impinger hinge 987 which incorporates impinger shaft 959. And, movable impinger plate 981 slides along impinger shaft 959 to change gears—as was done in a simple manner as for FIGS. 46 and 48. Actuator motor 912 is mounted on the top of rotating upper link plate 983, and its motor shaft 913 is fixably attached to motor pull pulley 902—which utilizes actuator pulley line 914 to move line/impinger attachment 995—which is fixably attached to actuator pulley line 914. Cross plate redirect pulleys 997 position line/impinger attachment 995 in the right position to move movable impinger plate 981 back and forth along impinger shaft 959 to engage and disengage stretched sliced curved springs 992 and unstretched sliced curved spring 993. Changing gear optimal spring knee brace 996 shows the application of a knee brace for running or walking. The thigh serves as top limb plate 988, the lower leg serves as bottom limb plate 989, and the runner's knee serves as limb hinge 990. Padded limb cuffs 998 serve to attach rotating upper link plate 983 and rotating lower link plate 985 to the upper and lower limbs of simple leg 965. Note that assembly for rotating links with optimal spring and gear change 979 can as well be positioned beside simple leg 965 instead of behind it. An optional front knee band 963 prevents the padded limb cuffs 998 from sliding away from the runner's knee, which also makes the force of the cuff more normal to the surface of simple leg 965, and which adds to the resistance to folding. Auxiliary limb linkage 999 comprises rigid links, and it has the same links and knee hinge that the runner's leg has. It is supported at the bottom by simple foot 967. As such, it prevents the lower padded limb cuff 998 from sliding down via cuff support 961—which fixably attaches the lower padded limb cuff 998 to the lower section of auxiliary limb linkage 999. This also decreases the load on the runner's knee. The same electronic components as in FIGS. 46 and 48 serve to select the right number of unstretched sliced curved springs 993—to ensure that the right amount of folding is achieved as the load force changes. These include a microprocessor, a force sensor (or even an accelerometer instead), a circuit, a lookup table to choose the proper number of such springs to be engaged on the next step, a power source, and a battery. The main difference from the shoe application is that all such springs must be disengaged during swing phase when the runner's foot is in the air. Accordingly, the force sensor signals the microprocessor to disengage all such springs as soon as the foot is in the air. Now, using the data on how long the foot is in the air, the microprocessor then instructs the right number of such springs to be engaged just before foot impact. Very notably, this just described smart knee brace can and should be used with the optimized, gear-changed, impact-charged shoe, enhanced heel-lift shoe of FIGS. 48 and 7-9. It is conceivable that each of these two enhancements (the enhanced shoe and the enhanced knee brace) can each provide a 25% reduction in the metabolic energy cost of running. Thus, their combined energy return can be 50%. Also, the impact charger of FIG. 44 can provide power for actuator motor 912 of FIG. 49. One drawback of this design is that the runner's leg must extend fairly straight during take-off for its springs to disengage. A solution for this is to dimension the components so that the spring force is zero when the knees are somewhat bent. Also, the springs can be attached so that they extend to the sides rather that backwards—to make it easier to sit.

It makes sense to put together the favorite combination of the various capabilities for the shoe of the future—out of all the many design variations herein. The importance of gear change leads to the choice of the heel-pop shoe of FIGS. 7, 8, and 9. The gear changer eliminates the need for 3rd anti-toe-sink mechanism 8. Now, the favorite for hinges 34 and for the other hinges of this design is tied cogged hinge 920 of FIG. 47. These are robust and cheap and easy to manufacture, and they avoid steel shafts and bearings. A second choice is the narrowed down pivots such as top rear mono pivot 13, top front mono pivot 14, bottom front mono pivot 15, and bottom rear mono pivot 16. The equivalent narrowed down hinges for front parallelogram 6 can also be used. The difficulty with this solution is that the proper material must be developed to achieve a high fatigue duty cycle capability for hinge flexing. Finally, conventional hinges with steel shafts and bearings are a possibility because the force on these parallelogram hinges is minimal when the shoe springs are acting between the top and bottom sides of the parallelogram, namely footplate 3 and groundplate 5. Or, we can use tied cogged hinges of FIG. 47, which do not appear to have any down side. So we have the basic parallelogram shoe. The favorite spring is the revised linkage-spread spring of FIG. 32, which is an optimal low impact spring when used with auxiliary springs to achieve a constant force curve. This revised linkage-spread spring will feature a rounded top and bottom so that it can tilt forward as footplate 3 translates forward with respect to groundplate 5 during sole compression. The automatic gear changer is used for the anti-toe-sink capability. Remember that optimal sole compression requires just barely full compression. This is needed for optimal compliance and for optimal energy return. The choice for gear changer is cross synchronized pulley actuated gear changer 960 of FIG. 48 which is simple and viable and which can achieve full sole compression within one step. A second choice could be precise electro auto gear changer of FIGS. 2 37 and 38, although this makes the design more complicated. These gear changers require springs on the outside and the inside of the shoe. In order to reduce the width of these side assemblies, the springs must be very strong. The discussions of Table 1-4 report that ring springs herein can be plenty strong enough even using fiberglass, but they are stronger using spectra shield and six times stronger using Kevlar. The discovery and awareness herein of such strong springs is novel. Since these gear changers are electronic, they require either a battery or a foot impact charger. FIG. 44 shows optimal designs: simple integral impact charger 869 and enhanced integral impact charger 844 (if you want as much as an order of magnitude more electrical power generated). Notably, the width and weight of both the favorite gear changer and the favorite impact charger is small enough to fit them together on the sides of the foot. Also notably, all of these components are simple, inexpensive, light, and easy to assemble. Thus, the overall design of the futuristic shoe is viable in the marketplace.

With reference to the earlier discussion of spring strength for Tables 1, 2, 3, and 4 herein, a non-linear fea (finite element analysis) study showed the following comparison of spring strengths. First, note that Table 4 was not in the parent USPTO utility patent application Ser. No. 14/545,274 patent of the instant patent. In Table 1, Fiberglass (E-glass) was the strongest with a spring strength of 92 lbs for a ring spring of thickness 2". This corresponds to the first part of Table 1 with a total spring thickness, d, of 2"—although there is a small 3% adjustment when you take into account that the spring arm thickness subtracts from the spring thickness. Note that this strength value is doubled for ring springs because the curly spring model is equivalent to only half of a mirrored arch (ring spring) configuration. Referring to Table 1, the ratio of springs for the other three materials are: 0.10 for carbon fiber, 0.11 for titanium, and 0.06 for PEBAXX 5533. That is, the fiberglass spring is ten to sixteen times stronger. Just before the submission of the instant patent, another non-linear fea study was made for the additional three materials: Kevlar 29 composite, spectra shield, and stainless steel 301 (full hard, basis B)—with very interesting results. Referring to Table 4, the Kevlar 29 spring strength is 6.2 times stronger than the fiberglass spring strength. The comparison for Spectra Shield is 1.45 time as strong as for fiberglass—and the comparison for stainless steel is 0.03 as strong as fiberglass. Kevlar is the clear winner, so the possible composite materials for the optimal springs of the instant invention include Kevlar, spectra shield, and fiberglass. However, these studies point to the importance of elongation limit in the spring strengths of the optimal springs of the instant invention. In that case, there are some carbon fiber and carbon nanotube materials being reported, as well as spider silk materials—with high values of elongation limit that could possibly be used. Although, these exotic materials cannot yet be produced in bulk and at a reasonable cost. Note in the comparison between Kevlar and Spectra Shield, the main difference is that Kevlar's modulus is much smaller (10.2 msi as compared to 17.4 msi). Thus, another factor in the choice of spring material is that the modulus should be lower—given that the tensile strain values are comparable. Metals are clearly not appropriate, and injection moldable materials such as PEBAXX 5533 almost as bad. Notably, these injection moldable materials are the material of choice for shoe springs in the prior art. Thus, the choice herein of Kevlar, Spectra Shield and fiberglass is novel and patentable. This knowledge is the result of a non-linear finite element analysis, and, hence, not obvious. Nor is it mentioned in the prior art. Other novel materials with the appropriate values of modulus, tensile strength, and tensile strain (elongation limit) will also be appropriate. Such candidate materials as carbon fiber composite and carbon nanotube composite or silk composite materials with high values of elongation limit—will also be appropriate and patentable for the optimal springs of the instant invention.

Finally, the merging arms structures of FIGS. 33-36 herein are serious candidates for the optimal springs herein.

In summary, the optimized shoe invention herein comprises a number of capabilities needed for a truly futuristic shoe. These capabilities include energy return of perhaps 20% due to enhanced heel-lift, an optimal spring system which reduces the maximum shoe impact force by as much as 40% with 1% hysteresis energy loss. There are multiple designs for the enhanced heel-lift idea and for preventing excessive toe sink. These require linkages with hinges. There are two basic kinds of novel hinges which do not require conventional shafts and rotary bearings. The first kind features enhanced novel natural hinges which address the issue of composite brittleness with more flexible matrix materials. The second kind features tied cogged hinges which do not utilize natural hinges, but which can still be inexpensively manufactured—even at the small linkage sizes required in the shoe. Notably, this tied cogged hinge can be used with the optimal spring for the rotating arms of FIG. 27—to provide an optimally simple, yet robust hinge for folded arrays to be deployed in outer space. There is a shoe automatic electronic gear changer that is precise over its range and that is optimized for every step—to ensure that the energy return is always maximized. And, there is an automatic cross synchronized pulley actuated gear changer that synchronizes the gear change of the two sides and which approaches the precision of the completely precise gear changer. Notably, this last gear changer is simple, inexpensive, and practical to manufacture. These gear change designs can also be applied to rotating limbs about a knee or elbow joint, and they lead to a smart energy return knee brace. There is also a novel pulley actuator which is lighter, cheaper, simpler, and faster than those of that prior art. There are novel more powerful shoe impact chargers for enhanced heel-lift energy return shoes and for conventional shoes (i.e. for all shoes). These can power the electronic actuators of the gear changer or they can charge other portable devices such a cell phones or laptops, etc. As a spin-off from the spring innovations herein, there are novel enhanced springs and structural elements which are both flexible and strong. These are remarkably tough in terms of how much energy is absorbed before breaking, and these are several times stronger at full compression. Finally, these products are very light, and their designs are sufficiently simple so that they can be produced
inexpensively. Also, the lightweight and simple low-impact springs have wide applications in industry, and their spin-off idea of flex/strong structures has potential applications in industrial sectors such as aerospace and body armor. For ankle and knee joints there is a rotating-arms enhanced optimal spring. Taken in total, these novel capabilities promise utility in a wide range of additional
applications such as robotics, prosthetics, orthotics, springs, aerospace,
automobiles, body armor, earthquake retrofitting.

There are also two methods to optimize the performance and the comfort of footwear for walking and running for people and for robotic, prosthetic, and orthotic applications. There is an optimal force curve method to minimize foot impact which requires optimal springs with a pre-loaded constant force curve and a means to calculate, measure, and adjust the optimal total sole energy for a particular user for a particular type of running or walking. The shoe tuning method provides for a scientific analysis based on theory and experiment to determine the optimal energy to absorbed by a shoe sole. Based on the fact that the shoe impact energy absorbed at full deflection by the optimized springs of the instant invention is linearly proportional to the sole thickness, precise slicing of 2D sole springs during the manufacture of shoes makes it possible to provide the shoe springs for this precisely calculated impact energy in shoes for a particular individual. Finally, the various designs of the invention disclosed herein can be combined or varied to encompass many variations which are obvious to one of ordinary skill in the many arts covered in the instant patent.

TABLE 1

Comparison of Spring Strength vs Deflection for Various Materials
d = deflection in inches; f = load force in lbs; t = thickness in inches Assumes a spring width of one inch.
First Part for the Curly V-spring
Fiberglass Carbon Fiber PEBAX 5533 Titanium
d f t 1 d f t d f t 1 d f t
.5 23 .012 1 .5 2.2 .004 .5 1.44 .031 1 −5 2.5 .004
1 46 .024 1 1 4.4 .008 1 2.88 .061 1 1 5 .009
2 92 .048 1 2 8.8 .015 2 5.73 .123 1 2 9.9 .018
5 230 .121 1 5 22 .038 5 14.3 .31 1 5 24.9 .044
20 920 .484 1 20 87.8 .154 20 57.3 1.2 1 20 99.5 .177
50 2300 1.21 1 50 220 .384 50 143 3.1 1 50 249 .443
100 4600 2.42 1 100 439 .769 100 287 6.1 1 100 497 .885
Second Part: for the Curved Spring (the bottom half of the Curly V-Spring)

TABLE 1-continued

Comparison of Spring Strength vs Deflection for Various Materials
d = deflection in inches; f = load force in lbs; t = thickness in inches Fiberglass Carbon Fiber PEBAX 5533 Titanium L
d f t 1 d f t 1 d f t 1 d t t
.5 46 .024 1 −5 4.4 .008 1 −5 2.88 .061 1 −5 5 .009
1 92 .048 1 1 8.8 .015 1 1 5.73 .123 1 1 9.9 .018
2 184 .096 1 2 17.6 .030 1 2 11.5 .24 1 2 19.8 .036
5 460 .242 1 5 44 .076 1 5 28.6 .61 1 5 49.7 .089
10 920 .484 1 10 87.8 .154 1 10 57.3 1.2 1 10 99.5 .177
20 1840 .968 1 20 176 .308 1 20 115 2.4 1 20 199 .354
50 4600 2.42 1 50 439 .769 1 50 287 6.1 1 50 497 .885
100 9200 4.84 1 100 878 1.538 | 100 574 12.2 1 100 995 1.77

TABLE 2

Summary of Spring
Strengths for Heel Pop Shoes
and for Conventional Shoes
% Available % Available
Strength Strength
Underfoot for Gear Change
Curved-Spring 280% 240%
Heel-Pop Shoes 560% 480%
(with nesting)
Parallelogram 220% 180%
Heel-Pup Shoes 440% 360%
(with nesting)
Conventional 300% 4U %
Shoes 600% 480%
(with nesting)
This assumes a 150 lb runner and 3 gees (450 lbs) as the maximum ground reaction force; the spring material is fiberglass. The sole deflection is a nominal 2 inches.

TABLE 3

Calculation of Spring Strengths for Heel-Pop Shoes
and for Conventional Shoes

Underfoot springs must support 450 lbs
for curved-spring heel-pop shoes
one-sided arch springs 1" > 180 lbs 7" > F = 1260 lbs
% = 1260/450 = 280%
for parallelogram heel-pop shoes
curly v-springs 1" > 90 lbs 11" > F = 990 lbs
% = 990/450 F = 220%
tor conventional shoes
Mirrored arch springs 1" > 180 lbs 4" > F = 720 lbs
(at forefoot section)
& curly v-springs 1" > 90 lbs 7" > F = 630 lbs
(at toe & heel sections) Sum = 1350 lbs
% = 1350/450 = 300%
Willi g cii change, side springs must support 300 lbs
for curved-spring heel-μυμ bl iDes
one-sided arch springs 1" > 180 lbs 4" > F = 720 lbs
% = 720/300 − 210%
for parallelogram heel-pop shoes
curly v-springs 1" > 90 lbs 6" > F = 540 lbs
% = 540/300 = 180%
for conventional shoes
Mirrored arch springs 1" > 180 lbs 2" > F = 360 lbs
(at forefoot section)
& curly v-springs 1" > 90 lbs 4" > F = 360 lbs
(at toe & heel sections) Sum = 720 lbs
% = 720/300 = 240%
This assumes a 150 lb runner and 3 gees (450 lbs) as the maximum ground reaction force; the spring material is fiberglass. The sole deflection is a nominal 2 inches.

TABLE 4

Material Mechanical Parameters Used in Non-Linear Finite Element

Analysis for Mirrored Curly Spring at Full Compression.
{This reports how thick the spring arms can be with full flattening of the spring, and it gives the spring strength at full compression. Table 1 gives these results for fiberglass, carbon fiber, PEBAXX 5533, and titanium.}
The spring strength ratio for three materials is for the same height (d).
tensile compressive
modulus strength strength tensile Poisson Spring Strength
msi ksi ksi strain % Ratio % Ratio to fiberglas
fiber glass 6.93 255 172 3.68 .29 1
composite
carbon fiber 21.6 350 167 1.36 .40 0.10 composite
PEBAXX 0.024 6.38 6.38 500 .30 0.06
5533
Titanium 16.0 1G0 1G0 5 .31 0.11
6-AI-4V
Stainless 27.0 186 186 8 .30 0.03
SLeel 301
Kevlar 29 10.2 424 424 4.2 .36 6.35
Spectra 17.4 372 372 3.5 .35 1.49
Shield S1UUU Inspection of Table 1 shows that the spring strength, F, results scale linearly with spring height, d, and with spring arm thickness, t. Thus, if you know d, t, and F for one set of these values, you can calculate these strength values for any value of {d,t} That is, simply multiple the ratio of an unknown t value over a known t value times the known F—to get the unknown F. Likewise for d (the mirrored curly spring thickness, d=2r where r is the radius of the quarter circle curly spring. Note also that a hinged ring is equivalent to two mirrored curly springs, so its spring strength is twice that shown in Table 1 for a mirrored curly spring.
The following sets of values, {d,t,F} were calculated for the three new materials.

|     |     |     |     |
| --- | --- | --- | --- |
| for stainless steel | {d = 2"} | t = 0.01" | F = 3 lbs} |
| for Kevlar 29 | {d = 2"} | t = 0.078" | F = 585 lbs} |
| for Spectra Shield | {d = 2"} | t = .041" | F = 137 lbs> |

Having thus described the invention, what is claimed as new and described to be secured by Letters Patent is:

1. An energy-return shoe, comprising:
a monolithic, compressible, linkage sole, including:
a single forward leaning toe parallelogram linkage structure disposed in a toe portion of a shoe, and extending from a top to a bottom of the compressible sole;
a single forward leaning rear parallelogram linkage structure disposed in a mid and rear portion of the shoe, and extending from the top to the bottom of the compressible sole;
the toe parallelogram linkage structure having:
top and bottom plates, and a left side linkage structure, and a shared side linkage structure shared with the rear parallelogram linkage structure;
the rear parallelogram linkage structure having:
top and bottom plates, and a right side linkage structure, and the shared linkage structure shared with the toe parallelogram linkage structure;
the toe parallelogram linkage structure having:
a first hinge mechanism movably connecting the top plate of the toe parallelogram linkage structure to the left side linkage structure of the toe parallelogram linkage structure,
a second hinge mechanism movably connecting the left side linkage structure of the toe parallelogram linkage structure to the bottom plate of the toe parallelogram linkage structure,
a first shared hinge mechanism movably connecting the top plates of the first and rear parallelogram linkage structures and a top of the shared side linkage structure, and
a second shared hinge mechanism movably connecting the bottom plates of the first and rear parallelogram linkage structures and a bottom of the shared side linkage structure;
the rear parallelogram linkage structure having:
a third hinge mechanism movably connecting the top plate of the rear parallelogram linkage structure to the right side linkage structure of the rear parallelogram linkage structure,
a fourth hinge mechanism movably connecting the right side linkage structure of the rear parallelogram linkage structure to the bottom plate of the rear parallelogram linkage structure;
and
a spring mechanism disposed between the top and bottom plates of the rear parallelogram linkage structure and configured to provide a spring force therebetween,
wherein virtually all impact energy of a foot of a wearer is captured and stored during an impact period and returned via enhanced heel-lift during and throughout a heel-lift period.

2. The energy-return shoe of claim 1, further comprising:
an anti-toe-sink mechanism disposed near a front of the toe parallelogram linkage structure having variable height ladder stops and configured to prevent toe-sink when the toe parallelogram linkage structure moves forward during sole compression.

* * * * *